United States Patent [19]

Kamen

[11] Patent Number: 5,794,730
[45] Date of Patent: Aug. 18, 1998

[54] INDICATION SYSTEM FOR VEHICLE

[75] Inventor: Dean L. Kamen, Bedford, N.H.

[73] Assignee: DEKA Products Limited Partnership, Manchester, N.H.

[21] Appl. No.: 880,574

[22] Filed: Jun. 23, 1997

Related U.S. Application Data

[63] Continuation of Ser. No. 474,313, Jun. 7, 1995, abandoned, which is a continuation of Ser. No. 384,705, Feb. 3, 1995, which is a continuation of Ser. No. 250,693, May 27, 1994, Pat. No. 5,701,965, which is a continuation-in-part of Ser. No. 21,789, Feb. 24, 1993, abandoned.

[51] Int. Cl.⁶ ..................................... B62D 61/12
[52] U.S. Cl. .................. 180/7.1; 180/8.2; 180/65.1; 180/907; 340/441; 340/459; 340/407.1; 340/384.5; 364/176
[58] Field of Search ................... 180/7.1, 8.2, 8.3, 180/8.5, 8.6, 65.1, 65.8, 907, 118, 6.48, 6.5, 6.54, 41, 21; 280/5.2, 5.26, 5.28, 5.31, 6.1, 205, DIG. 10; 340/441, 459, 407.1, 466, 460, 474, 432, 384.5; 318/611, 648, 649; 901/1; 395/80; 364/176, 463, 424.05, 424.06

[56] References Cited

U.S. PATENT DOCUMENTS

| | | | |
|---|---|---|---|
| 1,257,416 | 2/1918 | Sperry | 180/218 |
| 1,989,685 | 2/1935 | Cummins | 340/441 |
| 3,157,853 | 11/1964 | Hirsch | 340/965 |
| 3,495,679 | 2/1970 | Cockerell | 180/118 |
| 3,823,383 | 7/1974 | Mallinger | 340/441 |
| 4,109,741 | 8/1978 | Gariel | 180/21 |
| 4,143,352 | 3/1979 | Jarmotz | 340/441 |
| 4,192,395 | 3/1980 | Barber | 180/6.5 |
| 4,709,772 | 12/1987 | Brunet | 280/5.26 |
| 4,790,548 | 12/1988 | Decelles | 280/5.26 |
| 4,794,999 | 1/1989 | Hester | 280/5.26 |
| 4,932,913 | 6/1990 | Raviv et al. | 446/7 |
| 5,012,221 | 4/1991 | Neuhaus et al. | 340/692 |
| 5,221,883 | 6/1993 | Takenaka et al. | 180/8.6 |
| 5,248,007 | 9/1993 | Watkins et al. | 280/DIG. 10 |
| 5,314,034 | 5/1994 | Chittal | 280/205 |

FOREIGN PATENT DOCUMENTS

| | | | |
|---|---|---|---|
| 0980237 | 5/1951 | France | 280/DIG. 10 |
| 0255580 | 12/1985 | Japan | 180/8.6 |

*Primary Examiner*—Anne Marie Boehler
*Attorney, Agent, or Firm*—Bromberg & Sunstein LLP

[57] ABSTRACT

There is provided, in a preferred embodiment, a transportation vehicle for transporting an individual over ground having a surface that may be irregular. This embodiment has a support for supporting the subject. A ground-contacting module, movably attached to the support, serves to suspend the subject in the support over the surface. The orientation of the ground-contacting module defines fore-aft and lateral planes intersecting one another at a vertical. The support and the ground-contacting module are components of an assembly. A motorized drive, mounted to the assembly and coupled to the ground-contacting module, causes locomotion of the assembly and the subject therewith over the surface. Finally, the embodiment has a control loop, in which the motorized drive is included, for dynamically enhancing stability in the fore-aft plane by operation of the motorized drive in connection with the ground-contacting module. The ground contacting module may be realized as a pair of ground-contacting members, laterally disposed with respect to one another. The ground-contacting members may be wheels. Alternatively, each ground-contacting member may include a cluster of wheels. In another embodiment, each ground-contacting member includes a pair of axially adjacent and rotatably mounted arcuate element pairs. Related methods are also provided, including an indication system which modulates the pitch and repetition rate of an audible or tactile signal in accordance with speed and orientation of the vehicle.

11 Claims, 40 Drawing Sheets

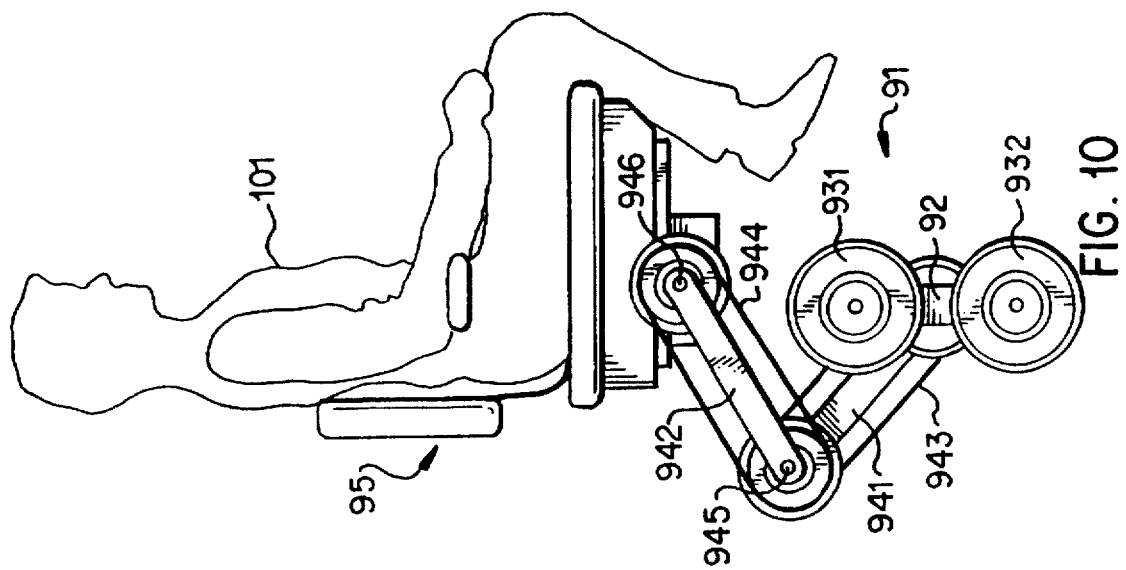
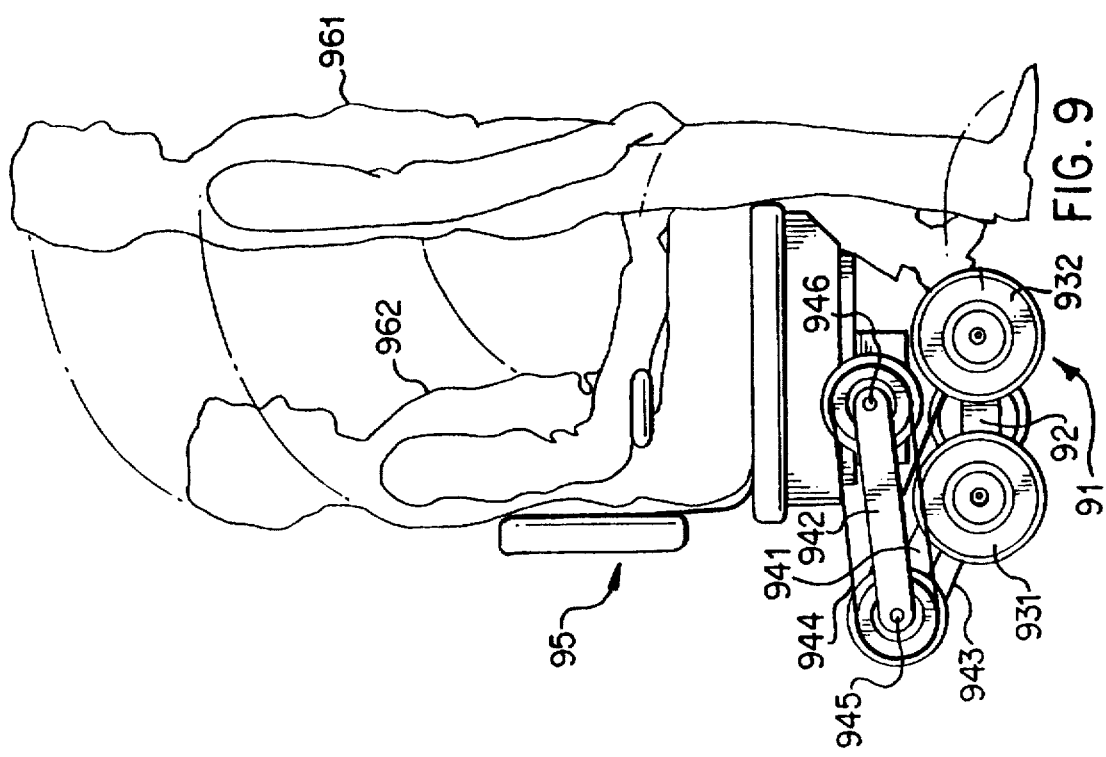

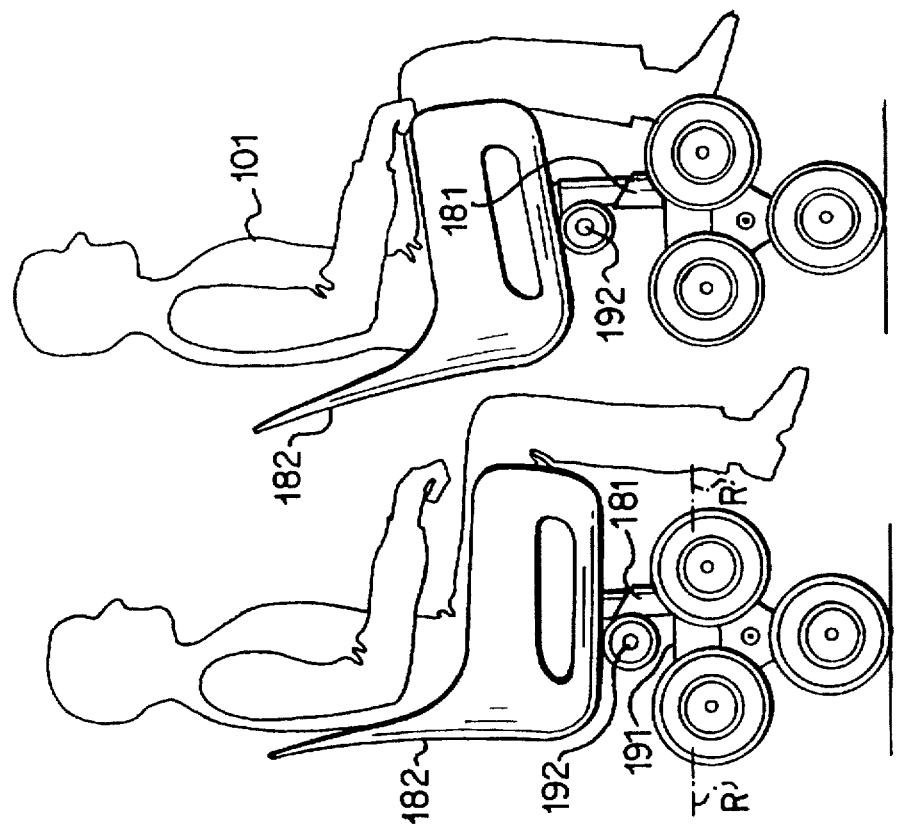
FIG. 20
FIG. 19
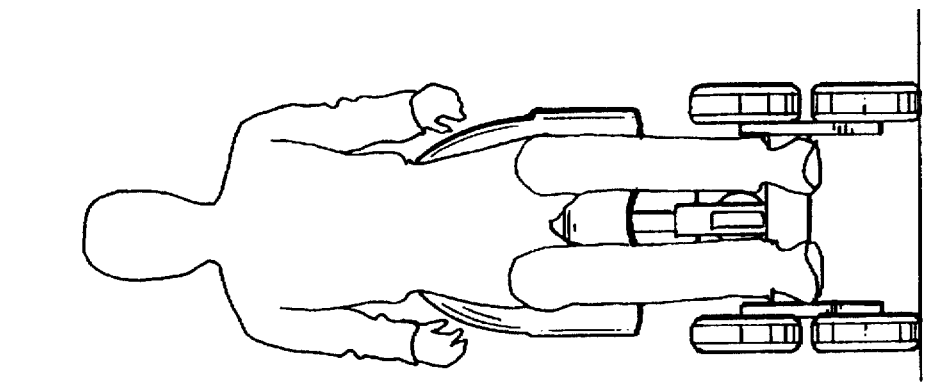
FIG. 18A
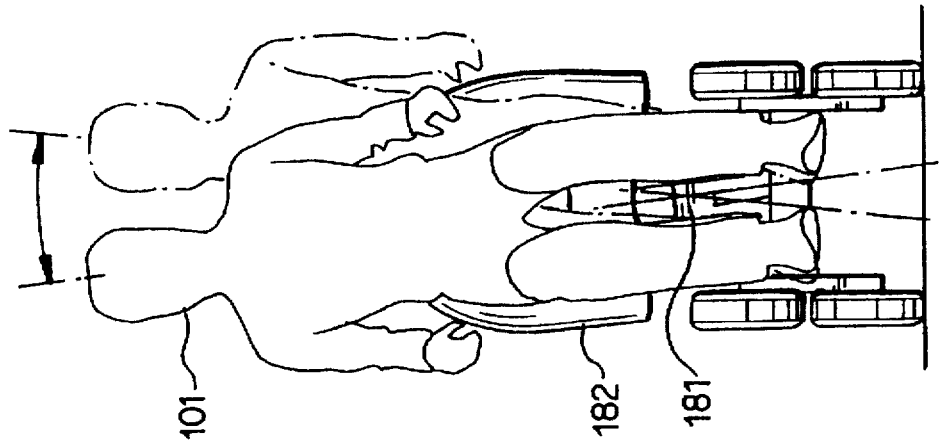
FIG. 18

5,794,730

INDICATION SYSTEM FOR VEHICLE

This is a continuation of application Ser. No. 08/474,313, filed Jun. 7, 1995, now abandoned which is a continuation of pending application Ser. No. 08/384,705, filed Feb. 3, 1995, which is a continuation of Ser. No. 08/250,693, filed May 27, 1994, now U.S. Pat. No. 5,701,965, which is a continuation-in-part of Ser. No. 08/021,789, filed Feb. 24, 1993, now abandoned.

TECHNICAL FIELD

The present invention pertains to vehicles and methods for transporting individuals, and more particularly to vehicles and methods for transporting individuals over ground having a surface that may be irregular.

BACKGROUND ART

A wide range of vehicles and methods are known for transporting human subjects. The design of these vehicles has generally resulted from a compromise that favors stability over maneuverability. It becomes difficult, for example, to provide a self-propelled user-guidable vehicle for transporting persons over ground having a surface that may be irregular, while still permitting convenient locomotion over ground having a surface that is relatively flat. Vehicles that achieve locomotion over irregular surfaces tend to be complex, heavy, and difficult for ordinary locomotion.

SUMMARY OF THE INVENTION

The invention provides, in a preferred embodiment, a vehicle for transporting a human subject over ground having a surface that may be irregular. This embodiment has a support for supporting the subject. A ground-contacting module, movably attached to the support, serves to suspend the subject in the support over the surface. The orientation of the ground-contacting module defines fore-aft and lateral planes intersecting one another at a vertical. The support and the ground-contacting module are components of an assembly. A motorized drive, mounted to the assembly and coupled to the ground-contacting module, causes locomotion of the assembly and the subject therewith over the surface. Finally, the embodiment has a control loop, in which the motorized drive is included, for dynamically enhancing stability in the fore-aft plane by operation of the motorized drive in correction with the ground-contacting module.

In a further embodiment, the ground contacting module is realized as a pair of ground-contacting members, laterally disposed with respect to one another. The ground-contacting members may be wheels. Alternatively, each ground-contacting member may include a cluster of wheels, each cluster being rotatably mounted on and motor-driven about a common laterally disposed central axis; each of the wheels in each cluster may be rotatably mounted about an axis parallel to the central axis so that the distance from the central axis through a diameter of each wheel is approximately the same for each of the wheels in the cluster. The wheels are motor-driven independently of the cluster.

In yet another embodiment, each ground-contacting member includes a pair of axially adjacent and rotatably mounted arcuate element pairs. The arcuate elements of each element pair are disposed transversely at opposing ends of a support strut that is rotatably mounted at its midpoint. Each support strut is motor-driven.

BRIEF DESCRIPTION OF THE DRAWINGS

The invention will be more readily understood by reference to the following description, taken with the accompanying drawings, in which:

FIGS. 9–21 illustrate embodiments of the invention utilizing a pair of wheel clusters as the ground-contacting members;

FIGS. 9–10 show use of a two-wheel cluster design in various positions;

FIGS. 11–21 show use of a three-wheel cluster design in various positions and configurations;

FIG. 36 is a schematic for the control arrangement for the cluster motors in the first embodiment permitting climbing, here employing a lean mode;

FIG. 37 is a schematic for the control arrangement for the wheel motors in the first embodiment permitting climbing;

FIG. 38 is a block diagram of the state of the vehicle, utilizing the first embodiment permitting climbing, for moving among idle, lean, and balance modes;

FIGS. 39A and 39B illustrate orientation of the cluster in the sequence of starting stair climbing in accordance with the second climbing embodiment;

FIGS. 40A and 40B illustrate orientation of the cluster in the sequence of resetting the angle origins in this embodiment;

FIGS. 41A and 41B illustrate orientation of the cluster in the sequence of transferring weight in this embodiment;

FIGS. 42A, 42B, and 42C illustrate orientation of the cluster in the sequence of climbing in this embodiment;

DETAILED DESCRIPTION OF SPECIFIC EMBODIMENTS

The invention may be implemented in a wide range of embodiments. A characteristic of many of these embodiments is the use of a pair of laterally disposed ground-contacting members to suspend the subject over the surface with respect to which the subject is being transported. The ground-contacting members are motor-driven. In many embodiments, the configuration in which the subject is suspended during locomotion lacks inherent stability at least a portion of the time with respect to a vertical in the fore-aft plane but is relatively stable with respect to a vertical in the lateral plane. Fore-aft stability is achieved by providing a control loop, in which the motor is included, for operation of the motor in connection with the ground-contacting members. As described below, the pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain the center of mass of the vehicle above the point of contact of the ground-contacting members with the ground, regardless of disturbances and forces operative on the vehicle.

Figure 1:
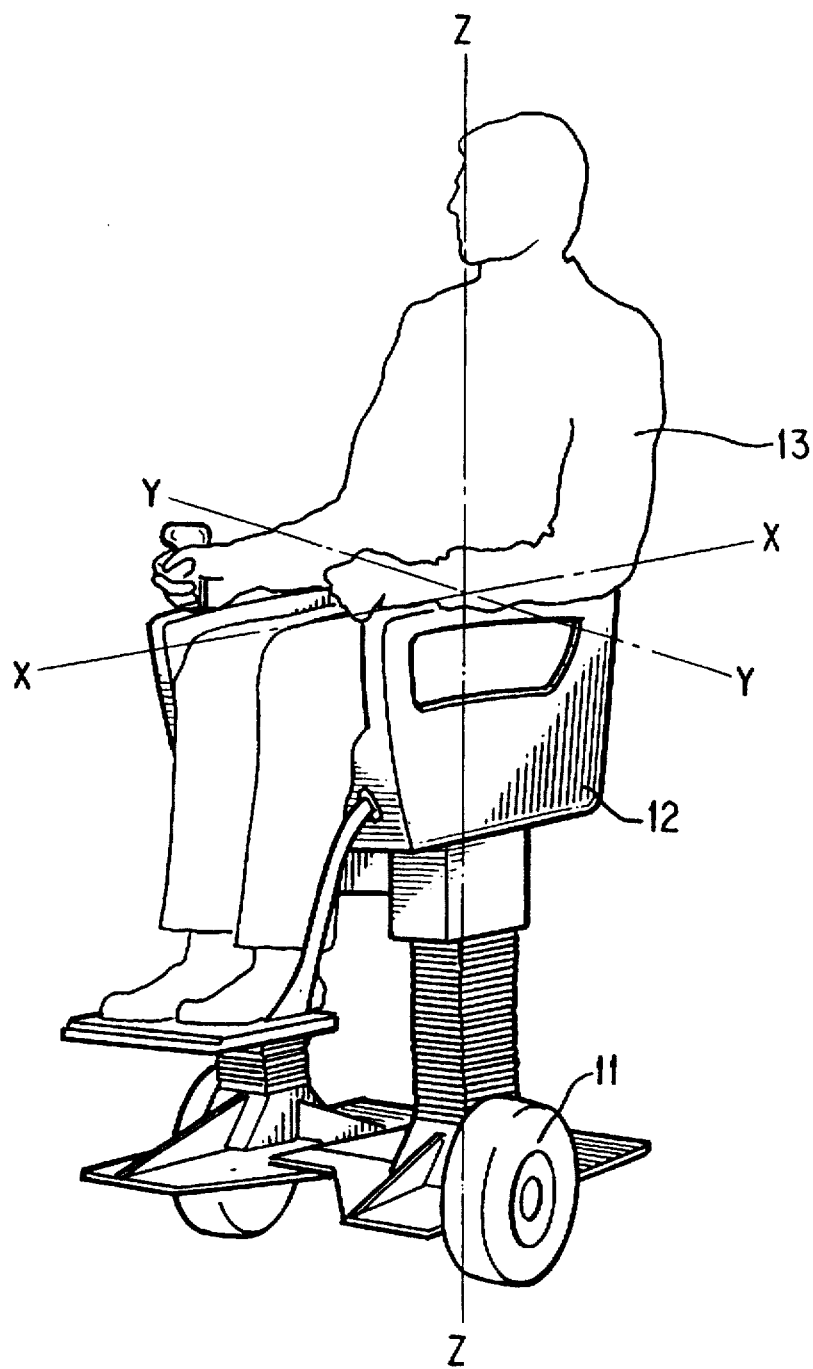
FIG. 1 is a perspective view of a simplified embodiment of the present invention, showing a subject seated thereon.

In FIG. 1 is shown a simplified embodiment of the invention in which the principal ground-contacting members are a pair of wheels and in which supplemental ground-contacting members are used in stair climbing and descending. (As will be shown below, stair climbing and descent and flat-terrain locomotion may both be achieved with a single set of ground-contacting members, when such members are the wheel clusters or the arcuate elements referred to above.)

The embodiment shown in FIG. 1 includes a support arrangement 12, embodied here as a chair, on which a subject 13 may be seated. The vehicle is provided with a pair of wheels 11 disposed laterally with respect to one another. The wheels help to define a series of axes including the vertical axis Z—Z, a lateral axis Y—Y parallel to the axis of the wheels, and a fore-aft axis X—X perpendicular to the wheel axis. The plane defined by the vertical axis Z—Z and the lateral axis Y—Y will sometimes be referred to as the "lateral plane", and the plane defined by the fore-aft axis X—X and the vertical axis Z—Z will sometimes be referred to as the "fore-aft plane". Directions parallel to the axes X—X and Y—Y are called the fore-aft and lateral directions respectively. It can be seen that the vehicle, when relying on the pair of wheels 11 for contacting the ground, is inherently unstable with respect to a vertical in the fore-aft direction, but is relatively stable with respect to a vertical in the lateral direction.

Figure 2:
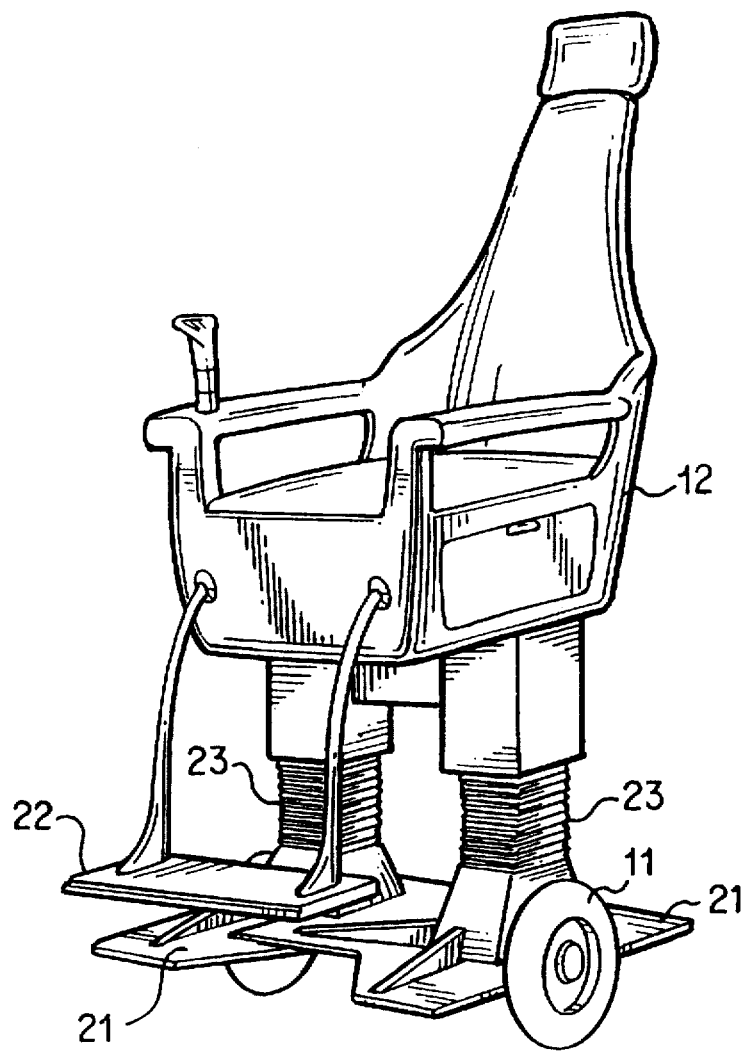
FIG. 2 another perspective view of the embodiment of FIG. 1, showing further details of the embodiment.

In FIG. 2 it can be seen that in addition to wheels 11, the vehicle is provided with a pair of laterally disposed feet 21 capable of being extended in the vertical direction by controllable amounts, and a footrest 22. The footrests are here provided with sensors for determining the height of objects such as stairs over which they may be disposed. The feet 21 are disposed on a pair of corresponding extendable legs 23. In a preferred embodiment, the vehicle is stable in the fore-aft direction as well as the lateral direction when both feet are in contact with the ground, but lateral stability may be sacrificed when one foot is in contact with the ground.

Figure 3:
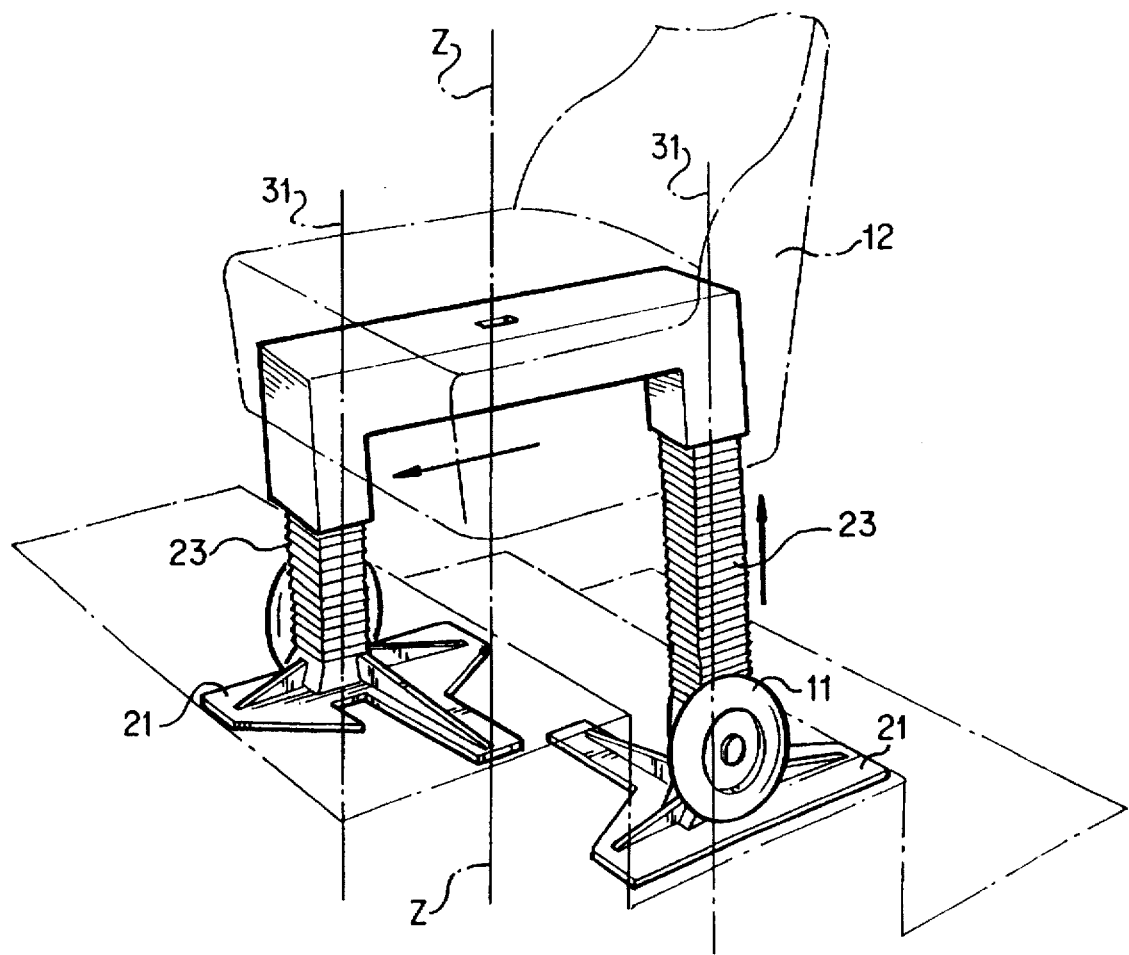
FIG. 3 is a schematic view of the embodiment of FIG. 1, showing the swivel arrangement of this embodiment.

In FIG. 3 is shown an arrangement of the embodiment of of FIGS. 1 and 2 permitting swivel of the chair 12 with respect to the suspension system, including feet 21 and related legs 23. The swivel operates in a plane that is approximately horizontal. The swivel arrangement, in combination with the ability to extend and retract each leg, permits motion of the vehicle up and down stairs in a mainer analogous to human locomotion on stairs. Each leg 23, when serving as the weight-bearing leg, permits rotation of the remainder of the vehicle about the leg's vertical axis in the course of a swivel. In achieving the swivel, the chair pivots about a vertical axis disposed centrally between the legs 23 to maintain the chair's forward-facing direction. Additionally, the non-weight-bearing leg 23 is rotated about its vertical axis in the course of a swivel to maintain its related foot 21 in a forward-facing direction.

Figure 4:
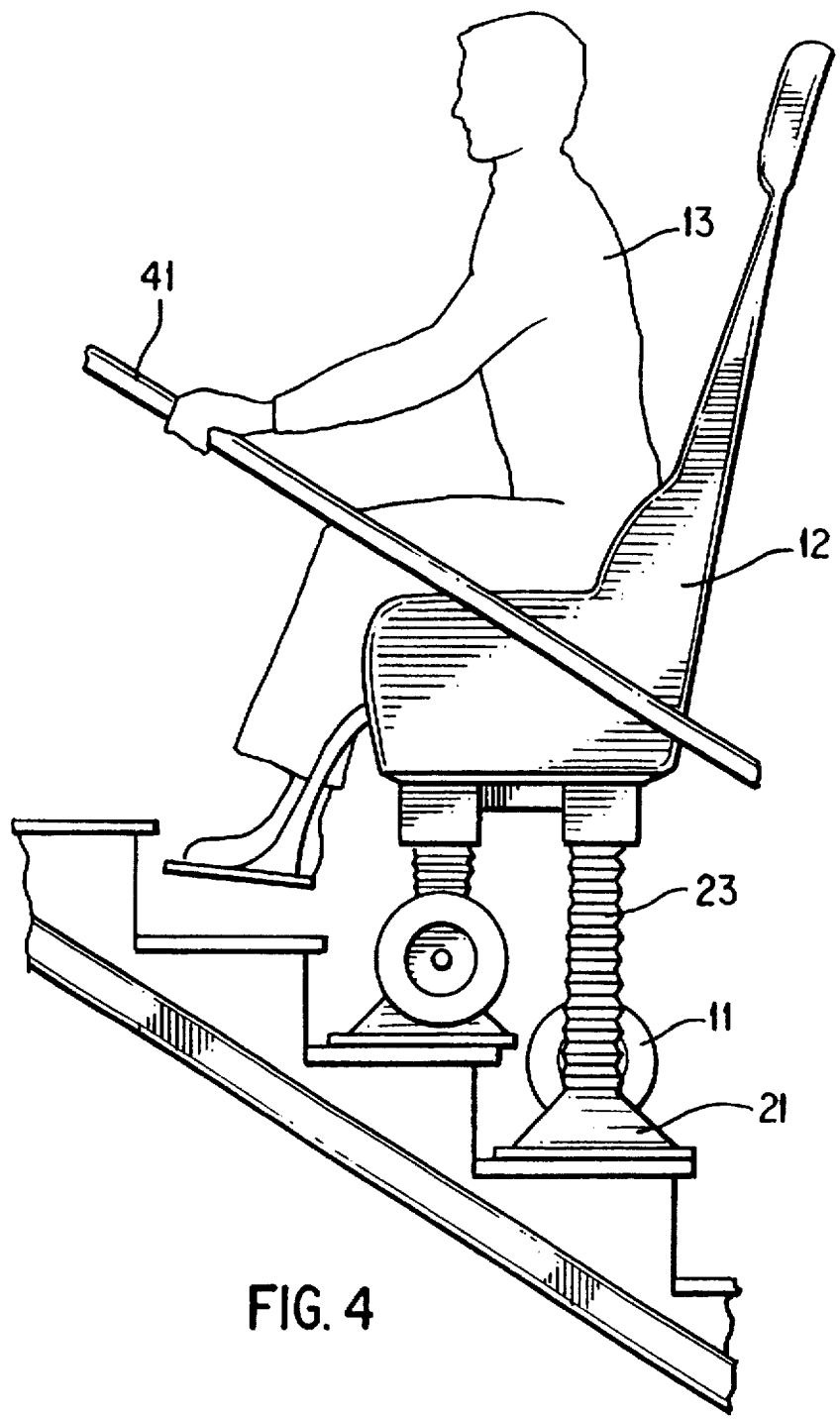
FIG. 4 is a side elevation of the embodiment of FIG. 1 as used for climbing stairs.

It can be seen that the embodiment described in FIGS. 1–3 sacrifices inherent fore-aft stability in order to achieve relative mobility. For generally gradual surface changes, the balance mode involves providing fore-aft stability to an otherwise inherently unstable system. For more irregular surfaces, such as stairs, this embodiment has a separate "step mode" used for climbing or descending stairs. Stability may be regained in climbing or descending stairs, for example, by using a hand to grab an ordinary handrail 41, as shown in FIG. 4, or even contacting an available wall near the stairs.

In addition, a variety of strategies may be used to reduce the risk of injury arising from a fall. In one arrangement, in the event that a fall is determined to be about to occur, the vehicle may enter a squat mode in which it controllably and quickly lowers the center of mass of the combination of vehicle and human subject. A lowering of the center of mass may be achieved, for example, by hinging or separating the suspension system in such a manner as to cause the height of the chair from the surface to be reduced. A squat mode could also have the beneficial effects of dissipating energy before imparting it to the subject, placing the subject in a position so as to reduce the subject's vulnerability, and putting the subject in a position that is lower so as to reduce the energy transferred to the person in case of impact.

Figure 5:
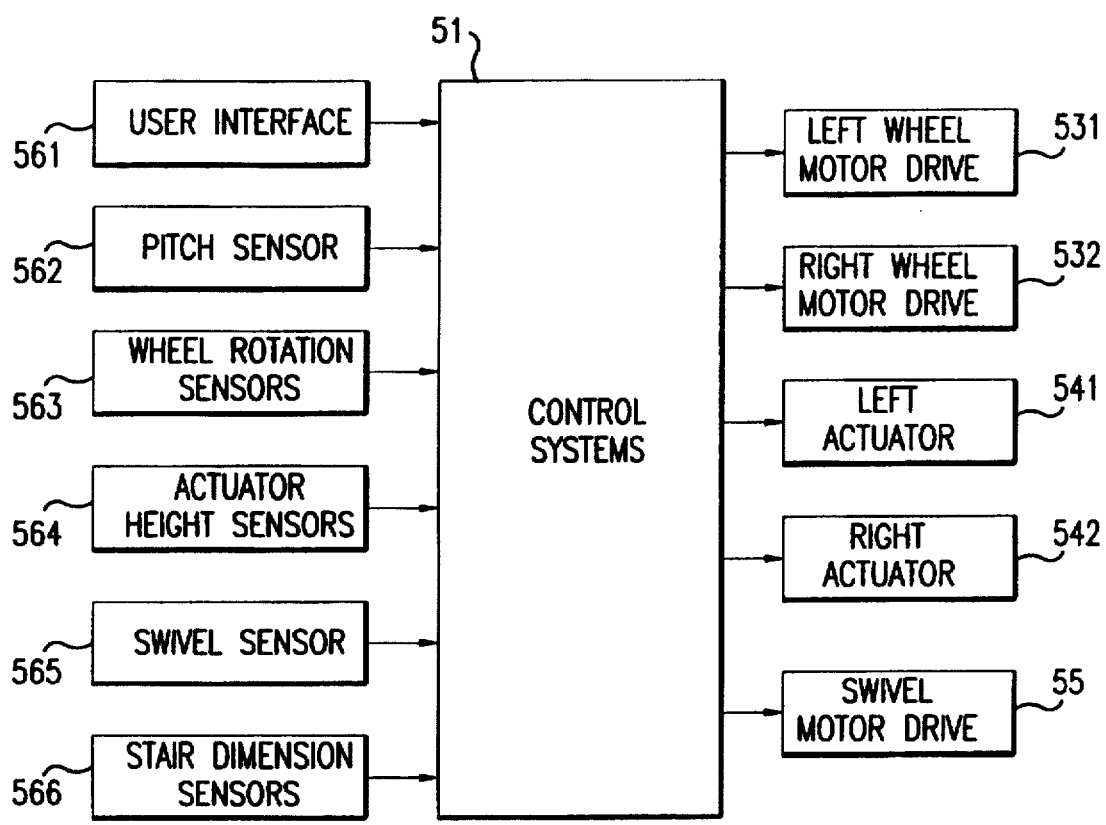
FIG. 5 is a block diagram showing generally the nature of power and control with the embodiment of FIG. 1.

In the block diagram of FIG. 5 it can be seen that a control system 51 is used to control the motor drives and actuators of the embodiment of FIGS. 1–4 to achieve locomotion and balance. These include motor drives 531 and 532 for left and right wheels respectively, actuators 541 and 542 for left and right legs respectively, and swivel motor drive 55. The control system has data inputs including user interface 561, pitch sensor 562 for sensing fore-aft pitch, wheel rotation sensors 563, actuator height sensor 564, swivel sensor 565, and stair dimension sensor 566.

Figure 6:
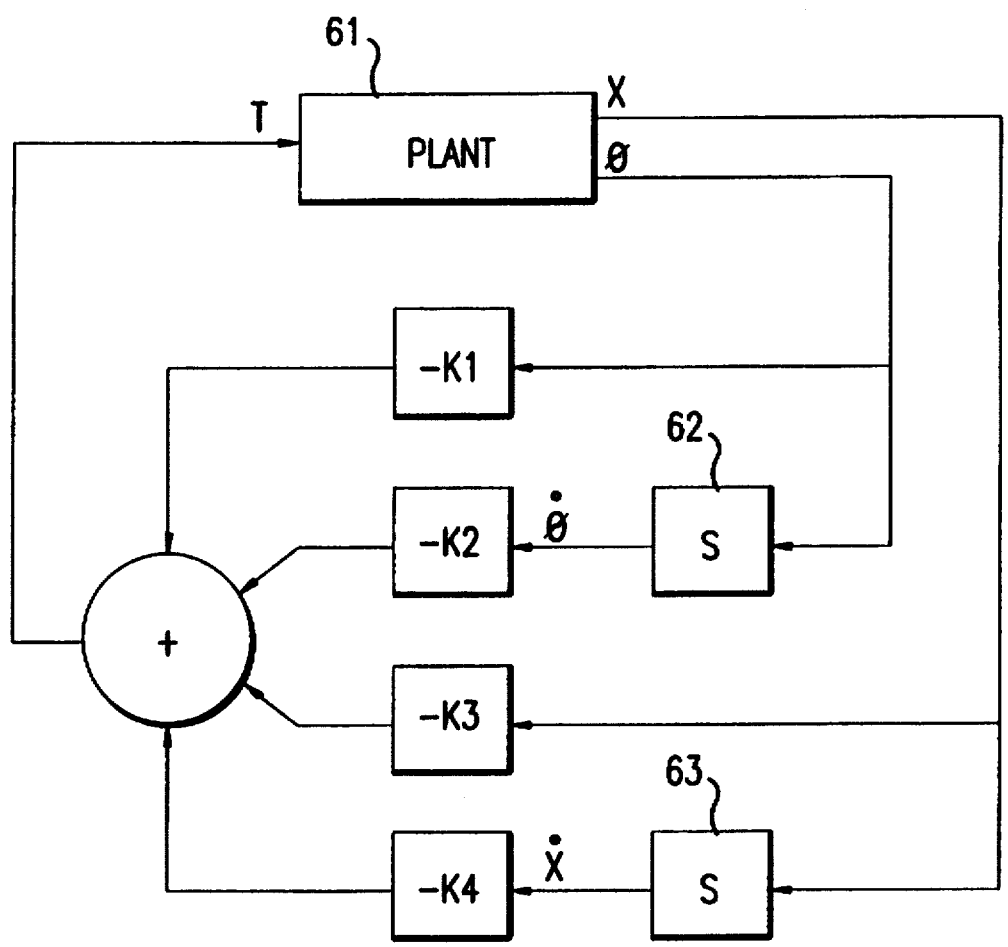
FIG. 6 illustrates the control strategy for a simplified version of FIG. 1 to achieve balance using wheel torque.

A simplified control algorithm for achieving balance in the embodiment of the invention according to FIG. 1 when the wheels are active for locomotion is shown in the block diagram of FIG. 6. The plant 61 is equivalent to the equations of motion of a system with a ground contacting module driven by a single motor, before the control loop is applied. T identifies the wheel torque. The character $\theta$ identifies the fore-aft inclination (the pitch angle of the vehicle with respect to gravity, i.e., the vertical). X identifies the fore-aft displacement along the surface relative to the reference point, and the dot over a character denotes a variable differentiated with respect to time. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is set to satisfy the following equation:

$$T=K_1\theta+K_2\dot{\theta}+K_3X+K_4\dot{X}$$

The gains $K_1$, $K_2$, $K_3$, and $K_4$ are dependent upon the physical parameters of the system and other effects such as gravity. The simplified control algorithm of FIG. 6 maintains balance and also proximity to the reference point on the surface in the presence of disturbances such as changes to the system's center of mass with respect to the reference point on the surface due to body motion of the subject or contact with other persons or objects.

In order to accommodate two wheels instead of the one-wheel system illustrated in FIG. 6, the torque desired from the left motor and the torque desired from the right motor can be calculated separately in the general manner described below in connection with FIG. 33. Additionally, tracking both the left wheel motion and the right wheel motion permits adjustments to be made to prevent unwanted turning of the vehicle and to account for performance variations between the two drive motors.

Figure 7:
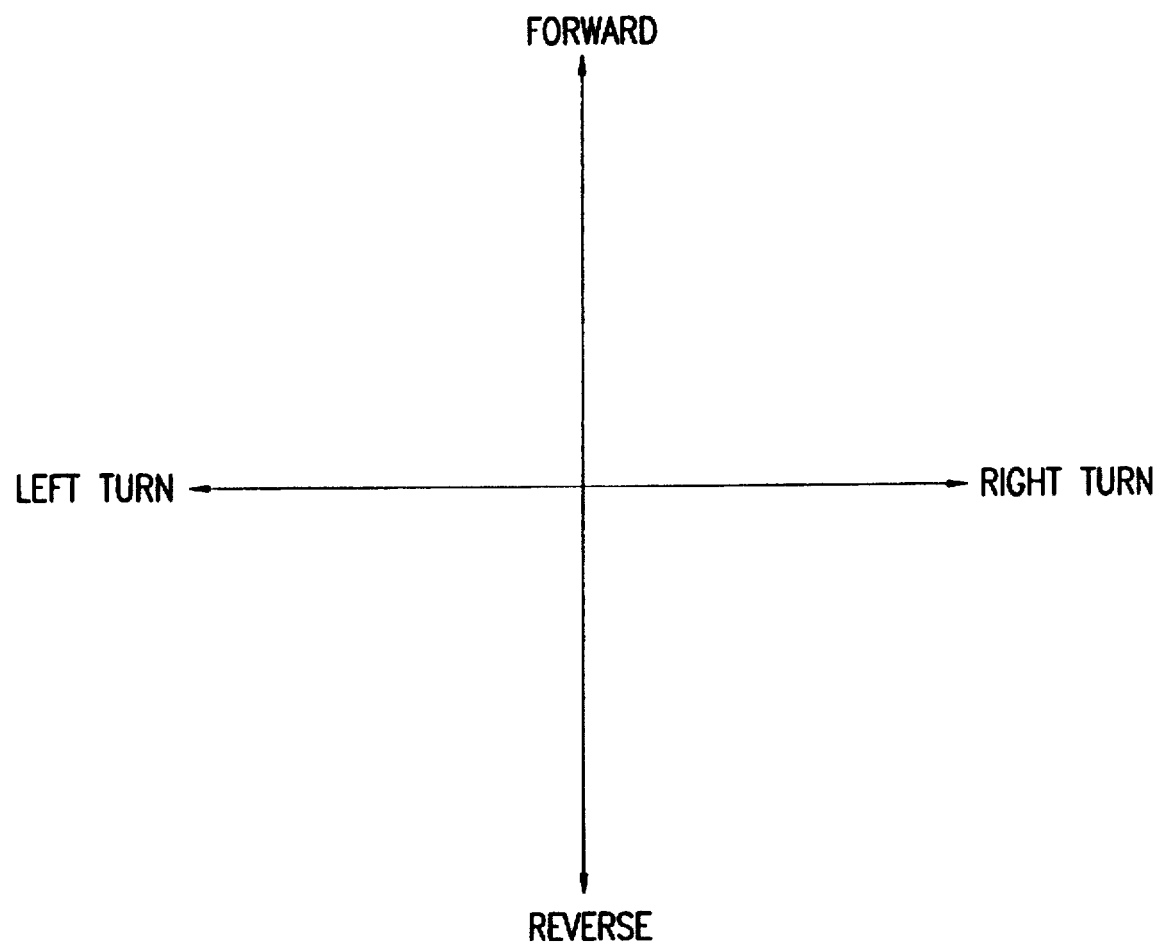
FIG. 7 illustrates diagrammatically the operation of joystick control of the wheels of the embodiments of FIG. 1.

A manual interface such as a joystick is used to adjust the torques of each motor. The joystick has axes indicated in FIG. 7. In operation of this embodiment, forward motions of the joystick is used to cause forward motion of the vehicle, and reverse motion of the joystick causes backward motion of the vehicle. A left turn similarly is accomplished by leftward motion of the joystick. For a right turn, the joystick is moved to the right. The configuration used here permits the vehicle to turn in place when the joystick is moved to the left or to the right. With respect to forward and reverse motion an alternative to the joystick is simply leaning forward or backward, since the pitch sensor (measuring $\theta$) would identify a pitch change that the system would try to compensate for, leading to forward or reverse motion, depending on the direction of lean. Alternatively, control strategies based on fuzzy logic can be implemented.

It can be seen that the approach of adjusting motor torques when in the balance mode permits fore-aft stability to be achieved without the necessity of additional stabilizing wheels or struts (although such aids to stability may also be provided). In other words, stability is achieved dynamically, by motion of the components of the vehicle (in this case constituting the entire vehicle) relative to the ground.

Stair-Climbing with Legs

Figure 8:
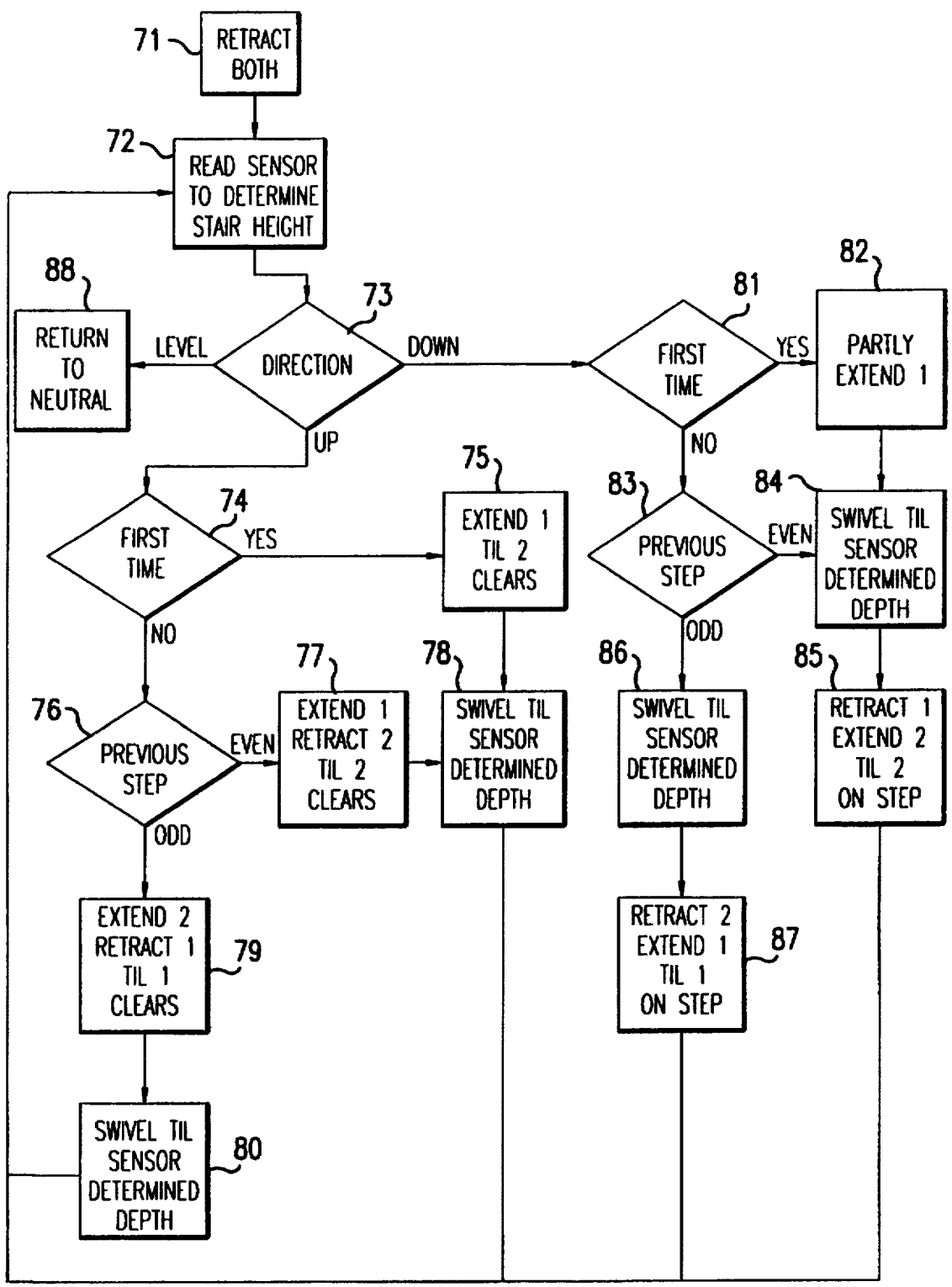
FIG. 8 illustrates the procedures utilized by the embodiment of FIG. 1 to ascend and descend stairs.

FIG. 8 shows one manner of stair climbing and stair descending with the embodiment of FIG. 1. In confronting a stair, initially both legs are retracted (shown in block 71), and then the height of the first step is measured (block 72). A determination is made whether stair ascent or descent is to occur (73). (At this point, it is helpful, to achieve stability, for the subject to hold an available handrail.)

Thereafter, in the first stage of stair ascent (shown in block 74), a first leg is extended until the second leg clears the step (75). The vehicle then swivels until the second leg is over the step it has just cleared (78). (In implementing this stage, it is possible to use a sensor to determine how far to swivel based on the step depth. Alternatively, the swivel can be over a specified angle, such as 90 degrees.) The sensor is then checked to measure the height of the next step (72). If a step is determined to be present (73), and the previous step was odd (76), the process is continued by extending the second leg and retracting the first leg until the first leg clears the next step (79). Next, the vehicle swivels until the first leg is over the cleared step (80). The sensor is then checked to measure the height of the next step (72). If a step is determined to be present (73), and the previous step was even (76), the process is continued by extending the first leg and retracting the second leg until the second leg clears the next step (78). The process is repeated beginning at block 72. If no step is detected, if the previous step was odd, it is completed by slightly extending the second leg, fully retracting the first leg, swiveling until both legs face forward, and then retracting the second leg to stand on both feet. If no step is detected, if the previous step was even, it is completed by slightly extending the first leg, fully retracting the second leg, swiveling until both legs face forward, and then retracting the first leg to stand on both feet (88).

An analogous procedure is followed for descending stairs. In the first stage of stair descent (shown in block 81), the first leg is slightly extended to clear the second leg (block 82). Thereafter, the vehicle swivels until the second leg is over the step onto which it is going to descend (84), the first leg is retracted and the second leg is extended until the second leg is on the step (85). The sensor is then checked to measure the height of the next step (72). If a step is determined to be present (73), and the previous step was odd, the process is continued by swiveling until the first leg is over the step onto which it is going to extend (86). The second leg is then retracted and the first leg extended until the first leg is on the step (block 87). The sensor is then checked to measure the height of the next step (72). If a step is determined to be present (73), and the previous step was even, the process is continued (84), and then repeated beginning at block 72. If no step is detected, descent is completed by swiveling until both legs face forward, and then retracting both legs to stand on both feet (88).

In lieu of the swivel arrangement discussed above, in a further embodiment, relative motion of the legs may be achieved by causing each leg to be mounted in a manner as to permit it to slide in an approximately horizontal plane in the fore and aft directions. Alternatively, the legs may utilize joints analogous to knee and hip joints of human subjects.

Stair-Climbing with Clusters

Whereas the embodiment of FIG. 1 requires different ground-contacting members for stair-climbing and for level terrain navigation, the embodiments of the invention shown in FIGS. 9–21 successfully utilize the same set of ground-contacting members for both stair-climbing and for level terrain navigation. FIGS. 9–18 illustrate embodiments of the invention utilizing a pair of wheel clusters as the ground-contacting members in lieu of the pair of wheels used in the embodiment of FIG. 1.

In FIG. 9, there is shown a side view of an embodiment utilizing a two-wheel cluster design. The subject 962 is shown supported on the seat 95 of this embodiment. In view is the right-hand cluster 91 with a pair of wheels 931 and 932 in radially symmetric locations about the cluster's axis 92 of rotation. A similar left-hand cluster is also employed. Each cluster has its own separately controlled motor to drive it about its axis of rotation 92. Each pair of wheels (here, 931 and 932) is also driven by a separately controlled motor about its own axis of rotation, but the wheels of a cluster are coupled to rotate synchronously.

It can be seen in FIG. 9 that the cluster 91 is positioned so that both wheels 931 and 932 may be in contact with the ground. When the cluster 91 (along with the left-hand cluster) is in this position, the vehicle of this embodiment is relatively stable in the fore-aft plane, thereby permitting a subject 961 shown standing) to assume rapidly a comfortable seated position 962 on the vehicle or, for example, a handicapped person to transfer from another chair.

The cluster 91, however, may be rotated about its axis 92 until only wheel 932 of each cluster is in contact with the ground as shown in FIG. 10. When the cluster 91 (along with the left-hand cluster) is in this position, the vehicle has the same inherent fore-aft instability as discussed above in connection with the embodiment of FIG. 1. The same equations governing the system may be used as discussed above in order to drive the wheels to create fore-aft stability dynamically. Also as shown in FIGS. 9 and 10, the chair 95 may be linked to the ground-contacting members via an articulated arm having segments 941 and 942 that may be adjusted in angle with respect to each other and the seat 95. The adjustments are achieved by motorized drives disposed at hubs 945 and 946. (Such drives may, for example, be harmonic drives.) As a result of these adjustments (in addition to the effect of rotating the clusters), the height of the seat 95, among other things, may be changed; it can be seen that the subject 101 may achieve a height while seated on the vehicle comparable to (or even greater than) a standing subject 961. This is desirable, since seated subjects, in wheel chairs, for example, are commonly dwarfed by standing subjects. As will be discussed in further detail below, the foregoing adjustments also permit adjustment of the fore-aft tilt of the seat.

Figure 11:
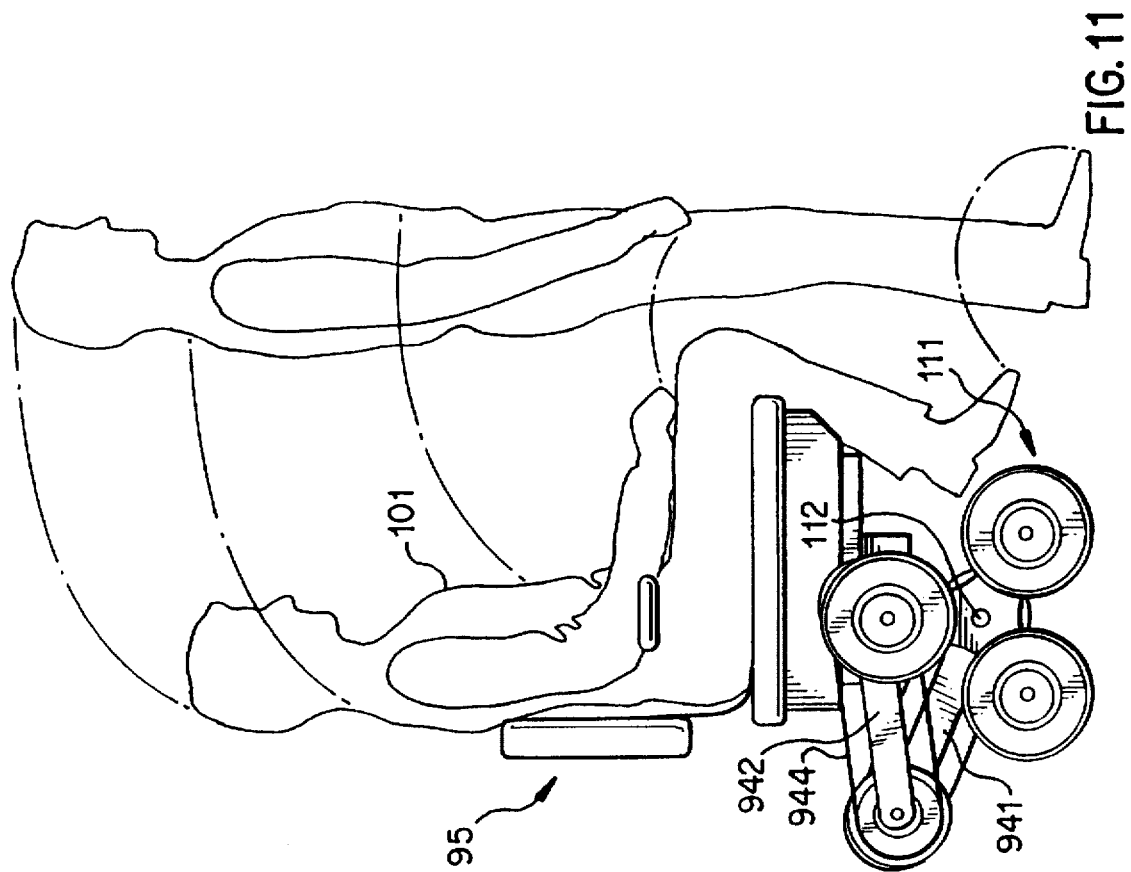

FIGS. 11–18 show use of a three-wheel cluster design in various modes and configurations. FIGS. 11 (showing stable rest position) and 12 (showing balancing position for travel) for three-wheel clusters correspond to FIGS. 9 and 10 for two-wheel clusters. Each three-wheel cluster (right-hand cluster 111 is shown here) is rotatably mounted and motor-driven about axis 112, using separately controllable motors. As in the case of the two-wheel cluster design, the wheels of each cluster are separately driven and controlled, but run synchronously in each cluster.

It should be noted that although many of the embodiments described herein utilize separate motors individually controlled, a common motor may be used for a number of functions, and the separate control may be achieved by appropriate clutch or other power transmission arrangement, such as a differential drive. The term "motorized drive" as used in this description and the following claims means any vehicle that produces mechanical power regardless of means, and therefore includes a motor that is electric, hydraulic, pneumatic, or thermodynamic (the latter including an internal combustion or an external combustion engine) together with any appropriate arrangement for transmission of such mechanical power; or a thrust-producing device such as a turbojet engine or a motor-driven propeller.

Figure 12:
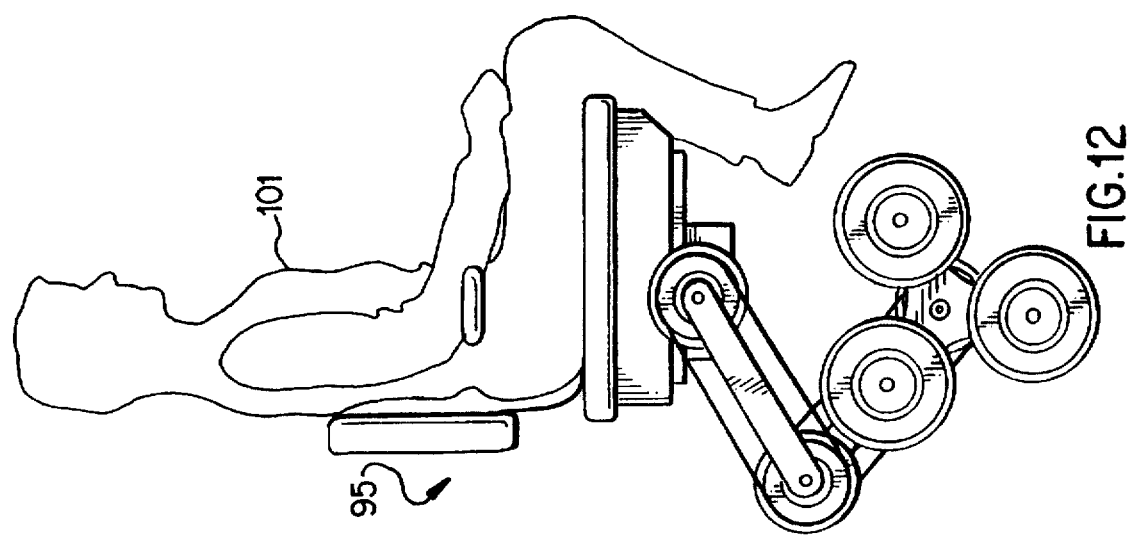
Figure 13:
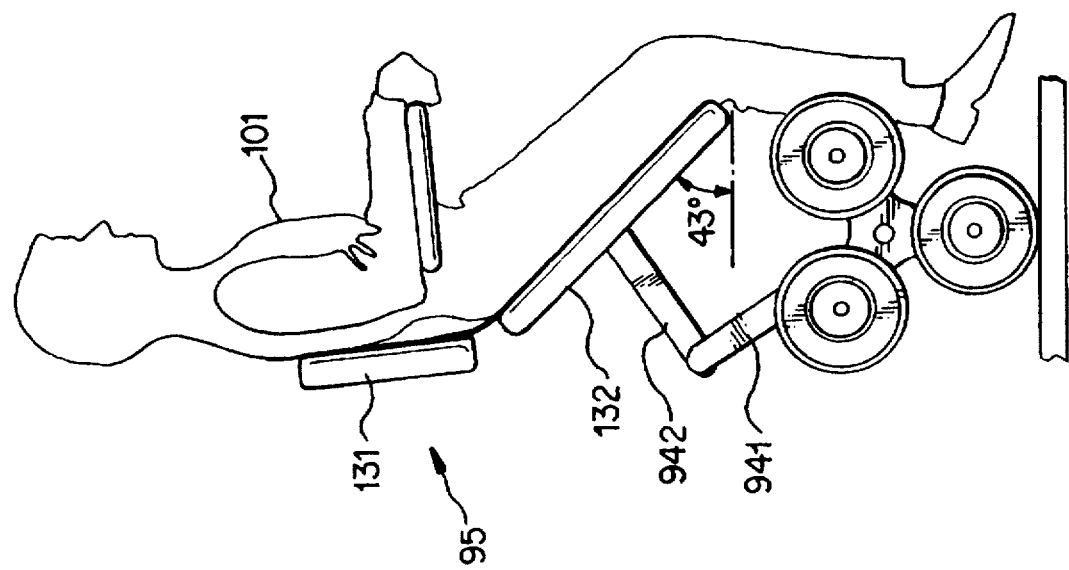

FIG. 13 is similar to FIG. 12, but here the chair 95 is shown having a back 131 and a seat 132. The angle of back 131 relative to the seat 132 and the angle of the seat 132 relative to the horizontal may be adjusted so that with the back 131 in a generally vertical orientation, the seat 132 may be tilted toward the vertical to permit the user to assume a more nearly standing position.

Figure 14:
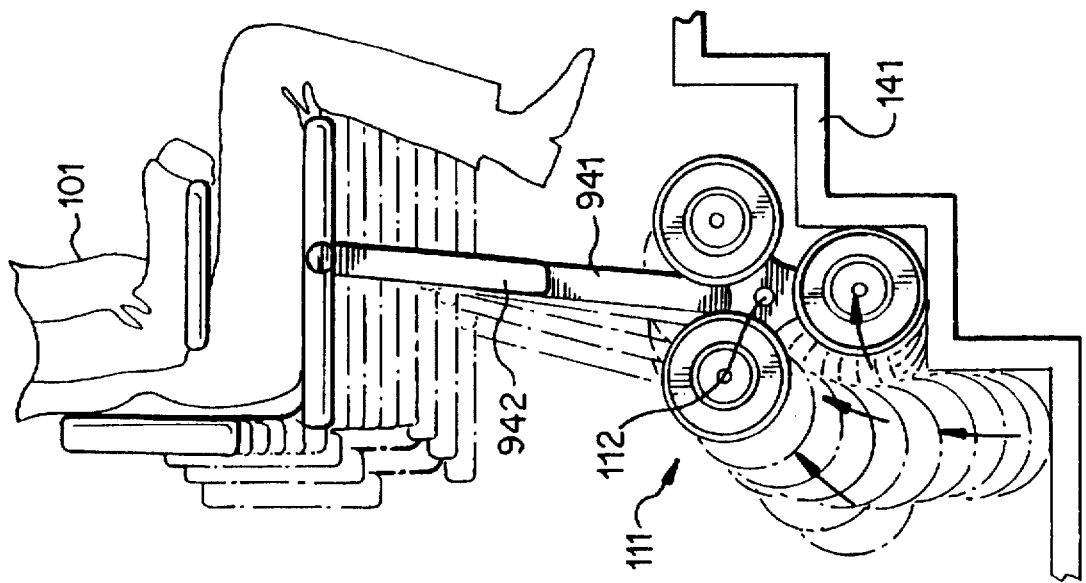

In FIG. 14, the embodiment is shown climbing stairs. The articulated arm segments 941 and 942 are here in the extended position to provide maximum height, so that the feet of the subject 101 to clear the stairs 141. Stair climbing is achieved by rotation of each of the right cluster 1 11 and left cluster (not shown) about central axis 112 and coordinated rotation of the wheels. The actual modes and control arrangements for achieving stair climbing are described below in connection with FIG. 27 et seq.

Figure 17:
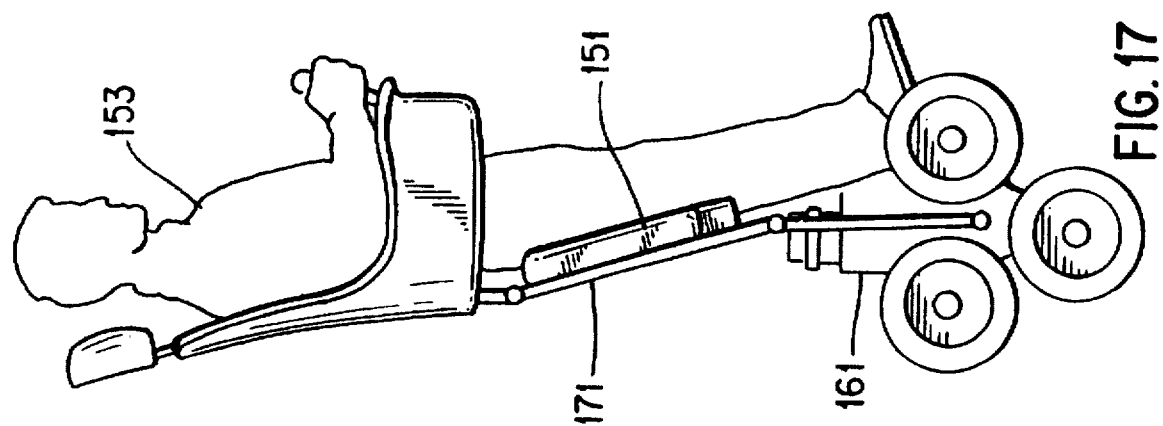
Figure 16:
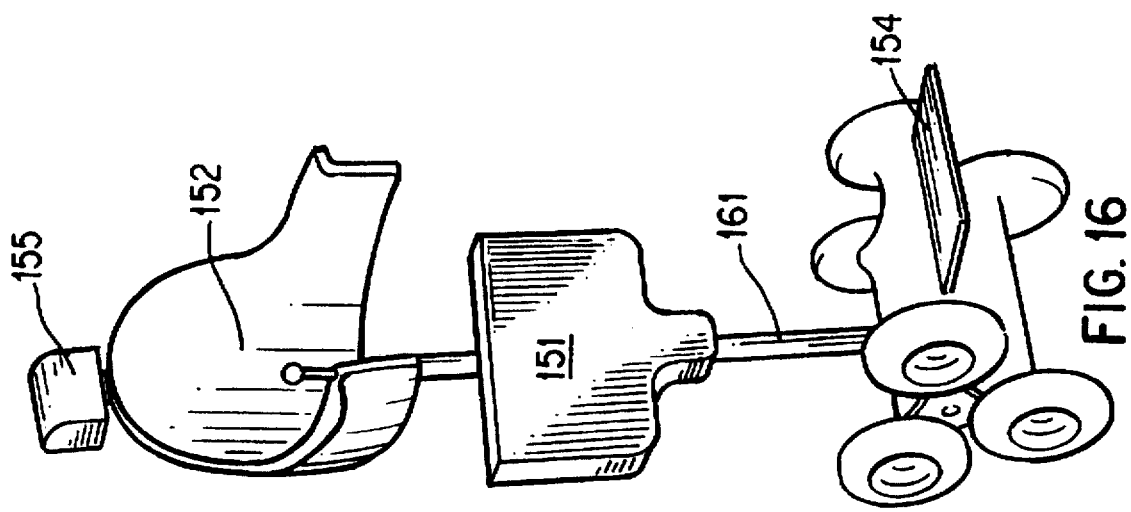
Figure 15:
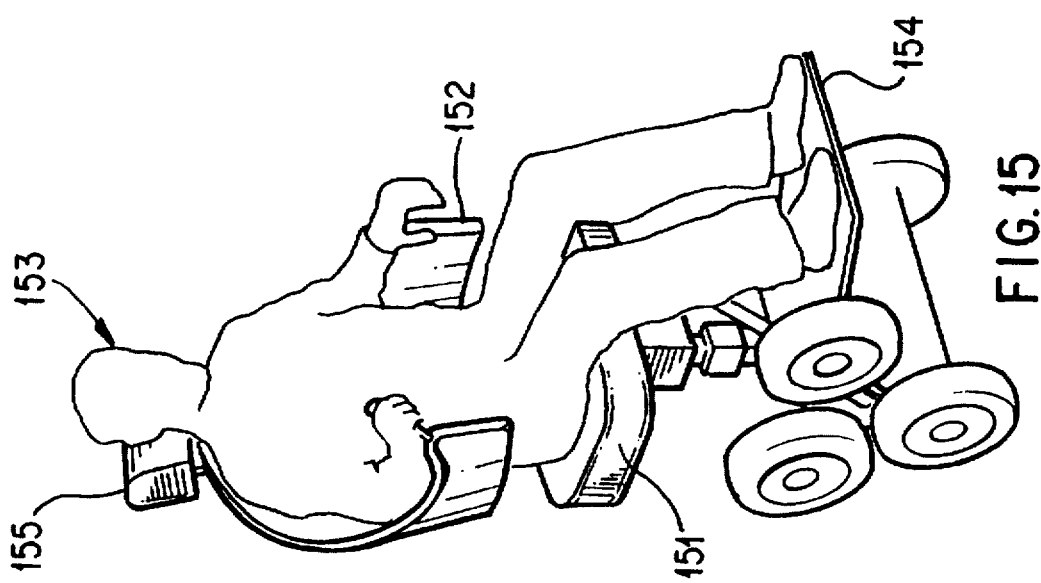

FIGS. 15–17 are views of an embodiment similar to that of FIGS. 11 and 12, but in which one of the segments 161 and 171 of the articulated arm, in this case segment 171, actually carries seat 151 of the body support combination comprising seat 151 and surround 152. Surround 152 is here provided with headrest 155. When the segment 171 is oriented in a near-vertical position, the seat 151 moves out of the way, permitting the subject 153 to assume a standing position supported by seat 151, surround 152, and footrest 154.

FIGS. 18–20 illustrate an embodiment, similar to that of FIGS. 11–14, in which the height of subject 101 can be adjusted by telescoping member 181, the extension of which is under separate motor control. In addition, the roll angle of the subject, about an axis R-R in FIG. 19, is adjustable as shown in FIG. 18, via separately controlled motor unit 191 of FIG. 19. Furthermore, the fore-aft tilt of chair 181, shown in two different positions in FIGS. 19 and 20, is adjustable via separately controlled motor unit 192. Although the roll and tilt adjustments are here implemented with a pivot and a motorized drive, each of these adjustments could also be implemented, for example, by a four-bar or other linkage arrangement coupled to a motorized drive.

Figure 21:
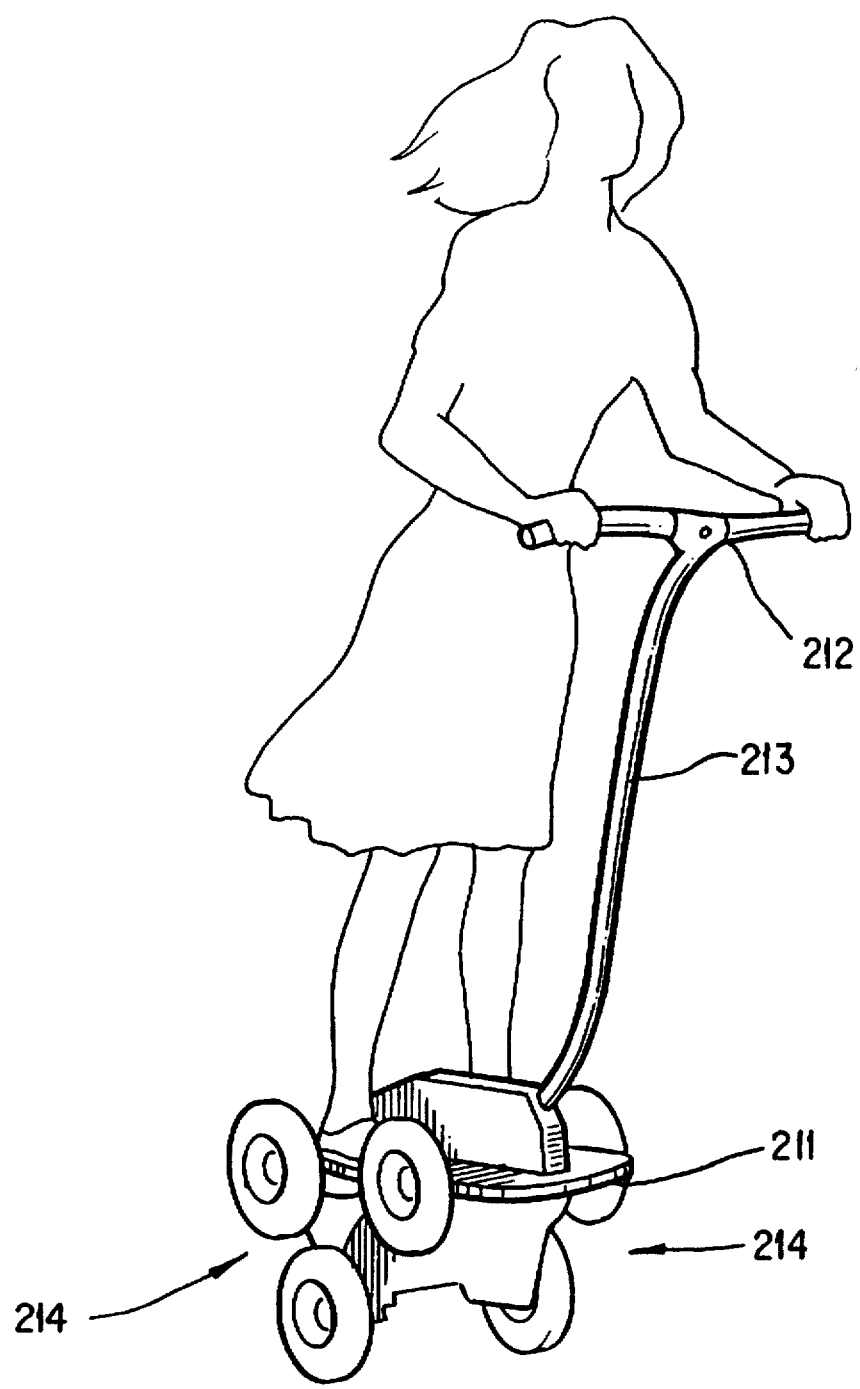

In FIG. 21, it can be seen that a vehicle can be made in accordance with the present invention without providing a chair. The subject stands on a platform 211 and holds a grip 212 on handle 213 attached to the platform 211, so that the vehicle of this embodiment may be operated in a manner analogous to a scooter. The grip 212 may be conveniently provided with a thumb-operated joystick for directional control, although other methods of control may also be used. For example, the handle 213 and grip 212 may be avoided altogether, and the platform 211 may be equipped with sensors to detect leaning of the subject. Indeed, as described in connection with FIG. 5 and as further described below, the pitch of the vehicle is sensed and compensated for in the control loop, so that if the subject leans forward, the vehicle will move forward to maintain vertical stability. Accordingly, a forward lean will cause forward movement; a backward lean will cause backward movement. Appropriate force transducers may be provided to sense leftward and rightward leaning and related controls provided to cause left and right turning as a result of the sensed leaning. The leaning may also be detected using proximity sensors. Similarly, the vehicle of this embodiment may be equipped with a foot- (or force-) actuated switch to activate the vehicle, in such a manner that the switch is closed so as to power the vehicle automatically when the subject stands on the platform 211. Although this embodiment is shown with left and right wheel clusters 214 operated in the manner of the clusters of FIGS. 13–20, the vehicle may be alternatively provided with other ground-contacting members, such as with a transversely disposed single pair of wheels in the manner of FIG. 1 (but without legs) or with left and right pairs of axially adjacent and rotatably mounted arcuate element pairs in a fashion similar to that of FIGS. 22–24 described below.

Stair-Climbing Using Arcuate Elements

Figure 23:
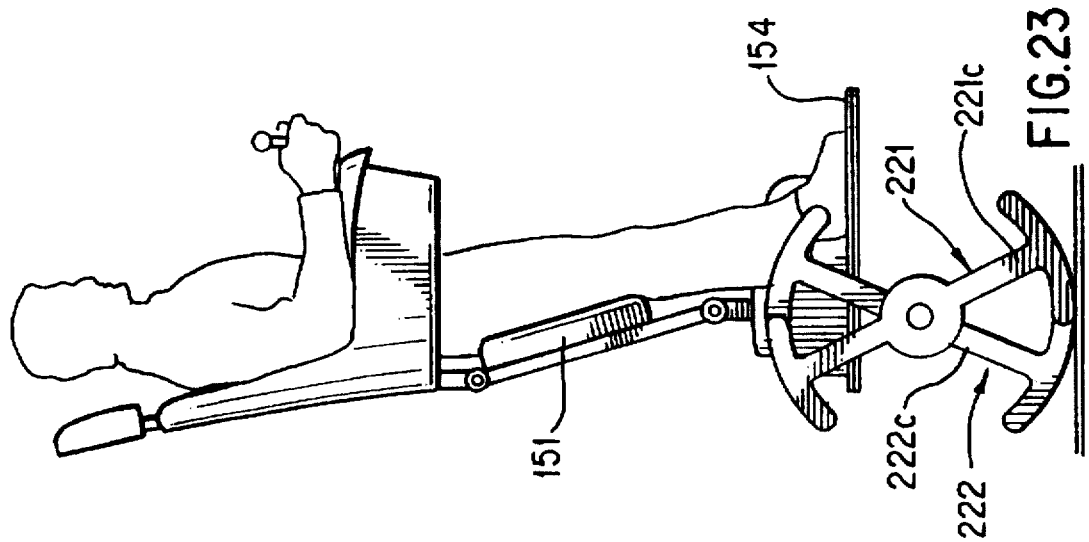
FIGS. 22–24 illustrate an embodiment wherein each ground-contacting member is realized as a plurality of axially adjacent and rotatably mounted arcuate element groups.
Figure 22:
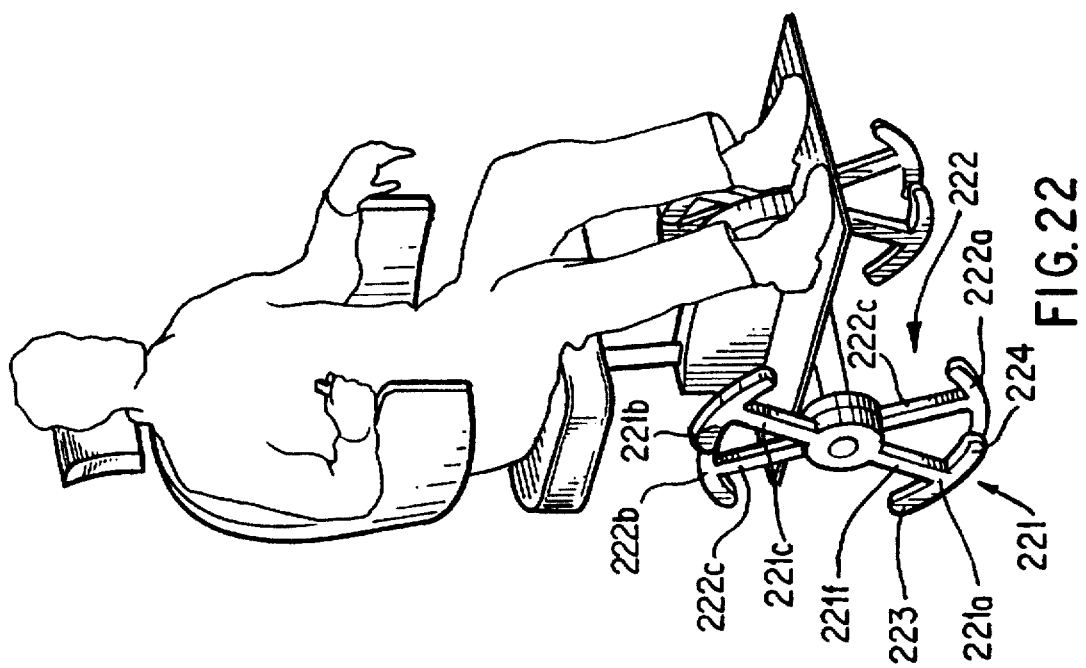
Figure 24:
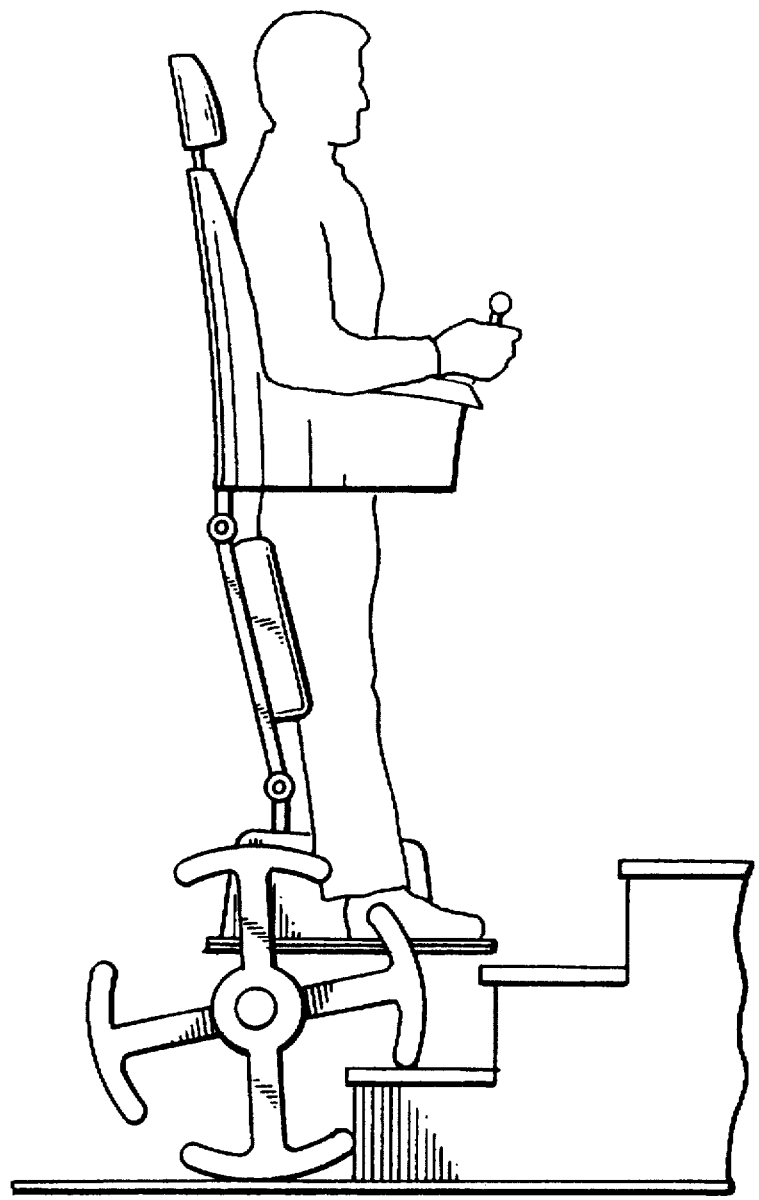

FIGS. 22–24 illustrate an embodiment wherein each ground-contacting member is realized as a plurality (here a pair) of axially adjacent, rotatably mounted arcuate element groups. For example, in FIG. 22, which corresponds generally to the cluster-propelled embodiment of FIG. 15, the right-hand ground-contacting member is realized as arcuate pair 221 and 222. The arcuate elements items 221a–221b and items 222a–222b) of each pair 221 and 222 are transversely disposed at opposing ends of a support strut (items 221c and 222c respectively) that is rotatably mounted at its midpoint. Each support strut 221c and 222c is motor driven and is controllable independently of the other. In operation, during normal locomotion, the arcuate elements of each pair approximate action of a wheel. When, for example, during such locomotion, arcuate element 221a is about to lose contact with the ground, element 222a has been rotated so as to arrive at the position shown to permit the roll established by the shape of the arcuate elements to continue. In this fashion, there is a substantially continuous rolling motion of the vehicle along the arcuate elements. Thus the motion of each of the arcuate elements about its axis of rotation is not generally at constant angular velocity. Typically each arcuate element pair moves at a greater angular rate when neither element of the pair is in contact with the ground. However, when one element of the pair is in contact with the ground, the angular velocity of the pair (and therefore of the ground-contacting element) is controlled to match the desired ground velocity of the vehicle, so that constant ground velocity can be achieved when desired.

An effect resulting from changes in angular velocity of the arcuate elements to permit constant ground velocity is the presence of a reactive torque on the frame that would tend to cause undesired vehicle accelerations. One solution is to design the vehicle so that the reactive torque of the motor drive is equal and opposite to the reactive of the arcuate element it drives, expressed as follows:

$$I_R \dot\omega_R + I_L \dot\omega_L = 0,$$

where I is the moment of inertia, and subscript L denotes the arcuate element system and subscript R denotes the rotor system. This equation can be rewritten as $$\dot\omega_R / \dot\omega_L = I_L / I_R.$$

The gear ratios $N_g$ may be substituted for the ratio of the angular accelerations, as follows:

$$N_g = I_L / I_R.$$

By satisfying this equation for $N_g$, which can be accomplished by suitable configuration of the gear ratio and the inertias, the reactive torques will be in balance and the vehicle will proceed smoothly.

Preferably the radially outermost extent of each arcuate element has a generally constant main radius of curvature that conforms generally with that of a circle having a radius of length equal to the distance of that extent. Each arcuate element has a leading portion, which approaches the ground first in forward motion of the vehicle, and a trailing portion, which leaves the ground last in forward motion of the vehicle. The leading portion of arcuate element 221a, for example, is identified as item 223 and the trailing portion of arcuate element 221a is identified as item 224. To permit successive arcuate elements to contact the ground smoothly in the course of forward motion, it is preferable that the radius of curvature of each arcuate element near the tip of its leading portion should be somewhat smaller than such element's main radius of curvature. Similarly, to permit successive arcuate elements to contact the ground smoothly in the course of rearward motion, it is preferable that the radius of curvature of each arcuate element near the tip of its trailing portion should be somewhat smaller than such element's main radius of curvature. Alternatively, or in addition, the radius of curvature near the tips of the leading portion and trailing portion may adjusted in other ways to facilitate the transfer of load from one arcuate member of the group to the next. It may be desirable, for example, in some embodiments to cause the tip radius of curvature to be greater than the main radius of curvature. In other embodiments, the tip may be deflectably mounted and is coupled to a deflection arrangement, so that on actuation the local radius of curvature may be modified.

It should be noted that, when desired, the vehicle of this embodiment may be placed in a rest position, by scissoring struts 221c and 222c to such an angle (approaching π radians) that the leading portion of one arcuate element is in contact with the ground, the trailing portion of another arcuate element is in contact with the ground, and the points of contact are spaced apart from one another. Such a position also reduces the overall height of the vehicle and facilitates compact storage or transport of the vehicle.

In FIG. 23, which corresponds generally to the cluster-propelled embodiment of FIG. 17, the vehicle of FIG. 22 is shown with the subject standing on platform 154 with the seat 151 oriented vertically.

In FIG. 24, the embodiment of FIG. 22 is shown climbing stairs. The struts are moved in such a way that successive arcuate elements land on successive stairs.

Details of Cluster Implementation

Figure 25:
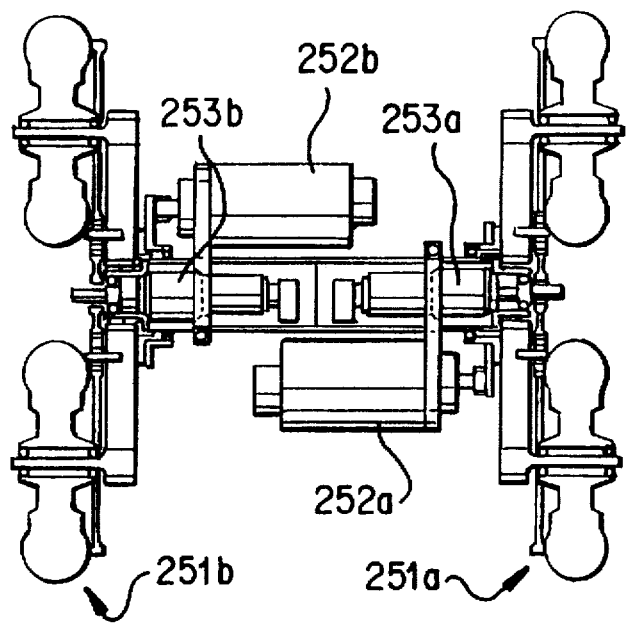
FIGS. 25–26 provide mechanical detail of a three-wheel cluster design for use in the embodiment of FIGS. 18–20.
Figure 26:
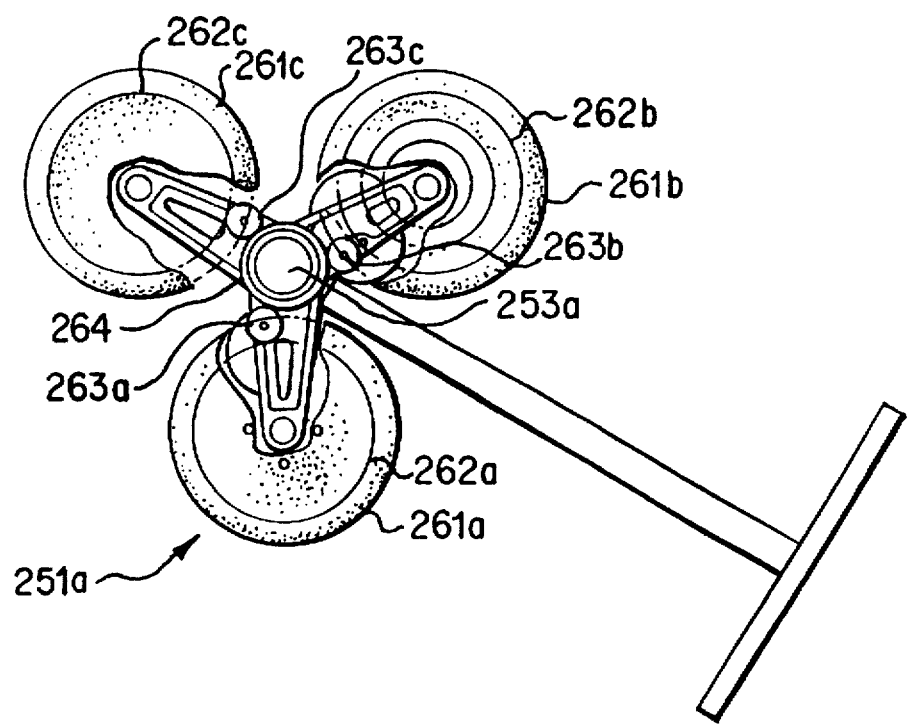

FIGS. 25–26 provide detail of a three-wheel cluster design for the embodiment of FIGS. 18–20. Each cluster 251a and 251b has its own drive motor 252a and 252b, which drives the cluster through a gear train. The wheels of each cluster are powered separately by a motor 253a for cluster 251a and by a motor 253b for cluster 251b. The wheels within a given cluster 251a or 251b are driven synchronously by such cluster's motor 253a or 253b, as the case may be, through a radially disposed gear arrangement. A side view of the cluster 251a in FIG. 26 shows wheels 261a, 261b, and 261c with associated drive gears 262a, 262b, and 262c, driven by respective idler gears 263a, 263b, and 263c, which in turn are driven by power gear 264, which is turned by the shaft of motor 253a.

Figure 27:
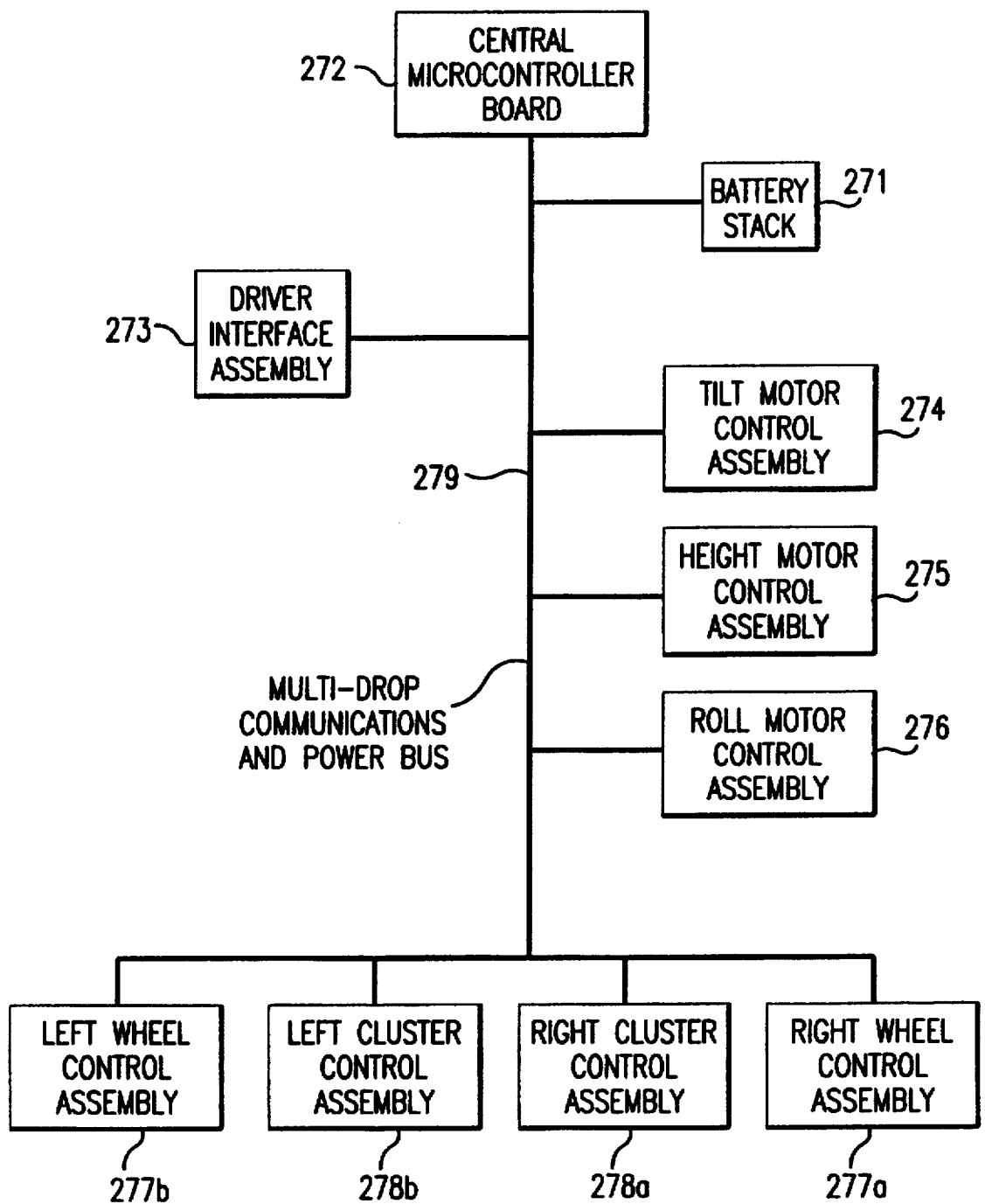
FIG. 27 is a block diagram showing communication among the control assemblies used in the embodiment of FIGS. 18–20.

FIG. 27 is a block diagram showing communication among the control assemblies used in a vehicle according to the embodiment of FIGS. 18–20. A similar set of assemblies may be used for any of the other embodiments described herein. The vehicle is powered by battery stack 271. Bus 279 provides communications (here implemented serially) among and power to the various assemblies. Overall system control of the vehicle is provided by central micro controller board 272. Inputs, derived from sources such as the joystick and inclinometer, to the central micro controller board 272 that establish the basis for system control are provided by the driver interface assembly 273, which is described below in connection with FIG. 29. The tilt, height, and roll of the chair 182 of FIG. 18 are adjusted by tilt motor control assembly 274, height motor control assembly 275, and roll motor control assembly 276 respectively. Rotation of the right and left clusters is controlled by right cluster control assembly 278a and left cluster control assembly 278b respectively. Rotation of the wheels in the right cluster and in the left cluster is controlled by right wheel control assembly 277a and left wheel control assembly 277b.

Figure 28:
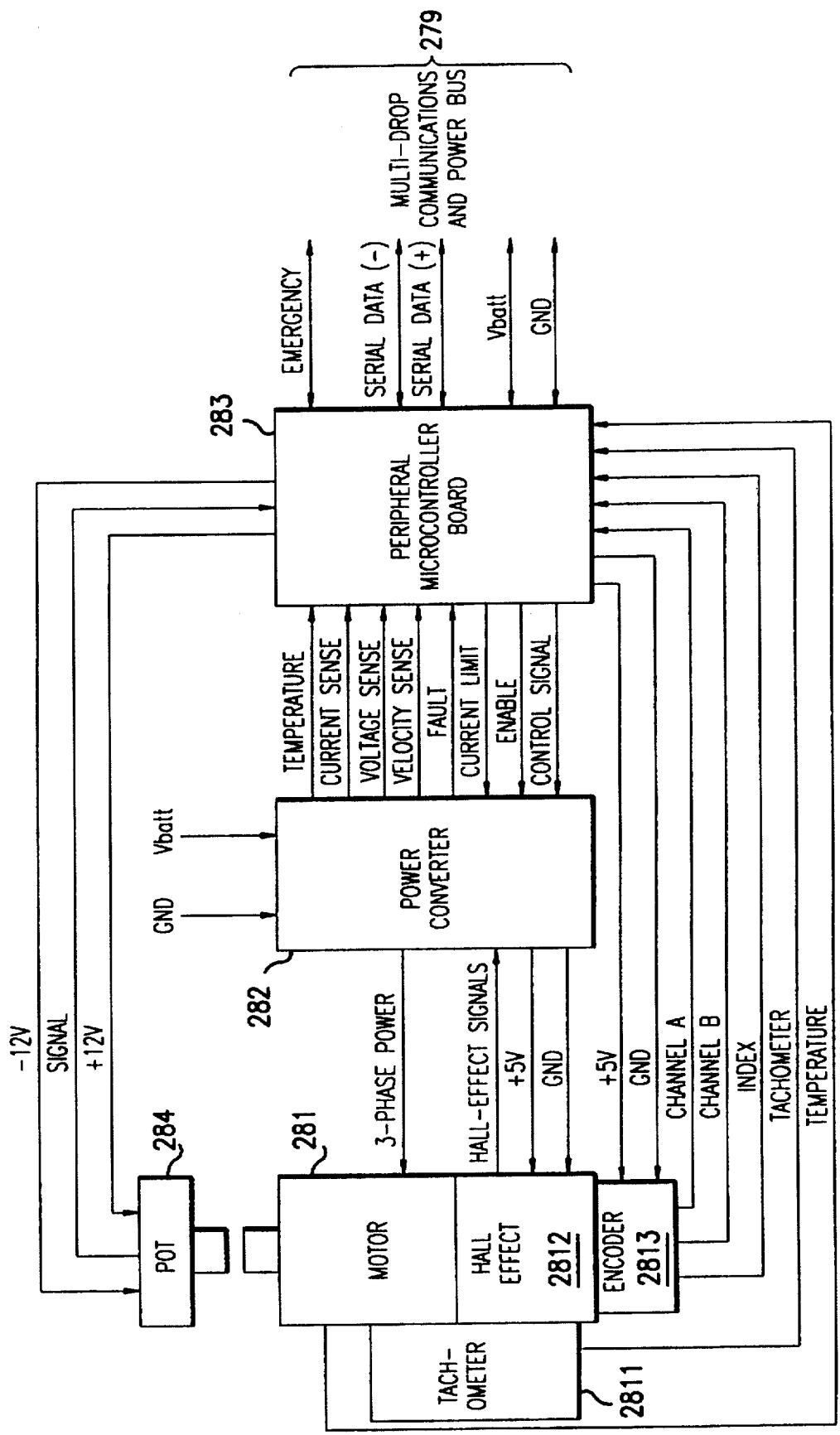
FIG. 28 is a block diagram showing the structure of a generic control assembly of the type used in the embodiment of FIG. 27.

The general structure of each of the control assemblies, identified in FIG. 27, used for the chair position and wheels and clusters is shown in FIG. 28. A motor 281 receives 3-phase power from power converter 282. Output from Hall effect detector 2812 provides information signals to the power converter 282 to control the phase of power to the motor. Information signals relating to the shaft rotation of the motor or of the position of mechanical systems powered by the motor may be provided by one or more of potentiometer 284, tachometer 2811, or incremental encoder 2813. (Alternatively, the Hall effect detector 2812 may itself be utilized.) These signals are fed to peripheral micro controller board 283. Additionally temperature outputs associated with power converter 282 and motor 281 provide input signals to the peripheral micro controller board 283. The peripheral micro controller board 283 is in turn in communication with the central micro controller board 272 over bus 279.

Figure 29:
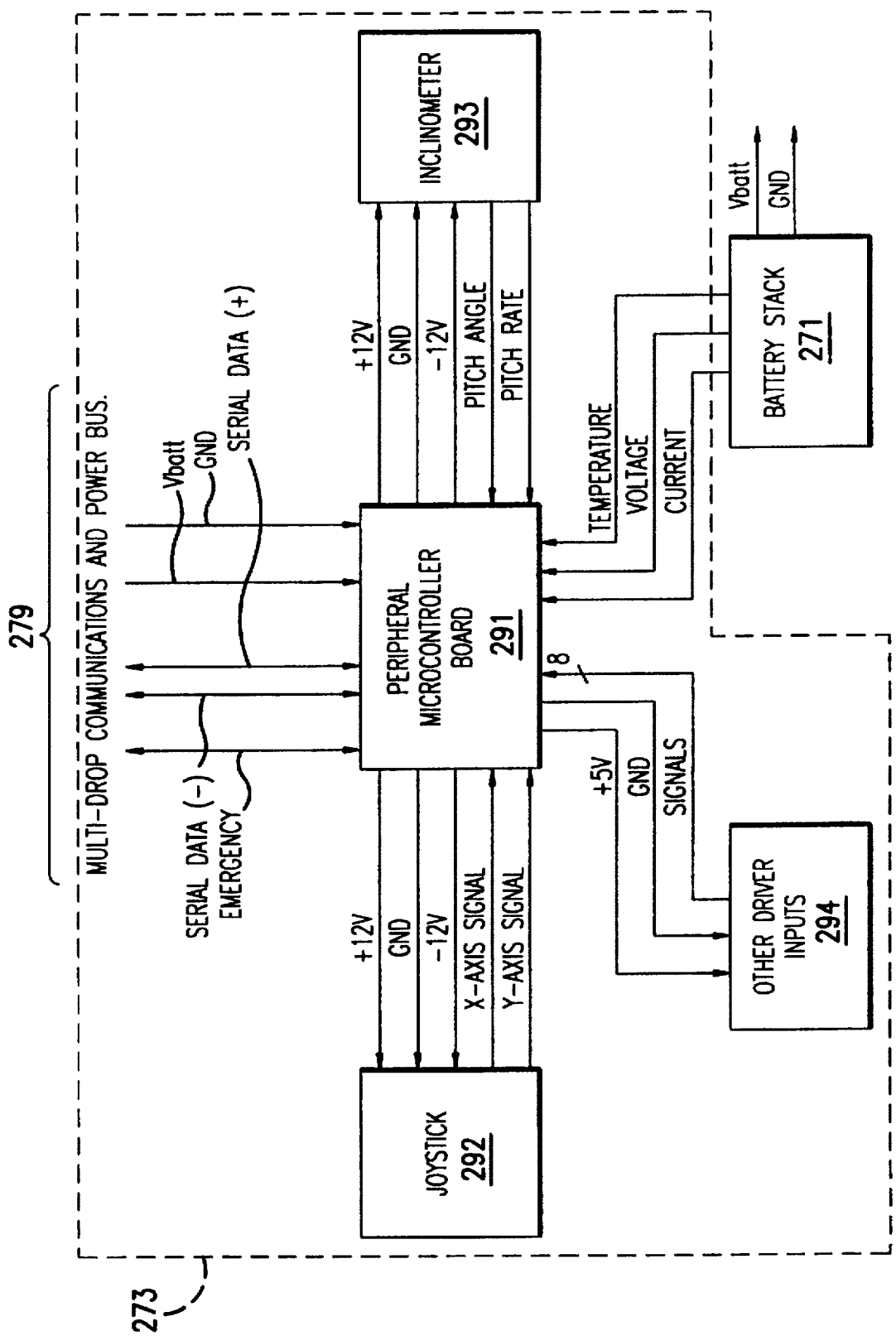
FIG. 29 is a block diagram providing detail of the driver interface assembly 273 of FIG. 27.

FIG. 29 is a block diagram providing detail of the driver interface assembly 273 of FIG. 27. A peripheral microcomputer board 291 receives an input from joystick 292 as well as from inclinometer 293. The inclinometer provides information signals as to pitch and pitch rate. (The term "inclinometer" as used in this context throughout this description and in the accompanying claims means any device providing an output indicative of pitch or pitch rate, regardless of the arrangement used to achieve the output; if only one of the pitch and pitch rate variables is provided as an output, the other variable can be obtained by suitable differentiation or integration with respect to time.) To permit controlled banking into turns by the vehicle (thereby to increase stability while turning) it is also feasible to utilize a second inclinometer to provide information as to roll and roll rate or, alternatively, the resultant of system weight and centrifugal force. Other inputs 294 may also be desirably provided as an input to the peripheral micro controller board 291. Such other inputs may include signals gated by switches (knobs and buttons) for chair adjustment and for determining the mode of operation (such as lean mode or balance mode described below). The peripheral micro controller board 291 also has inputs for receiving signals from the battery stack 271 as to battery voltage, battery current, and battery temperature. The peripheral micro controller board 291 is in communication over bus 279 with the central micro controller board 272.

Figure 30:
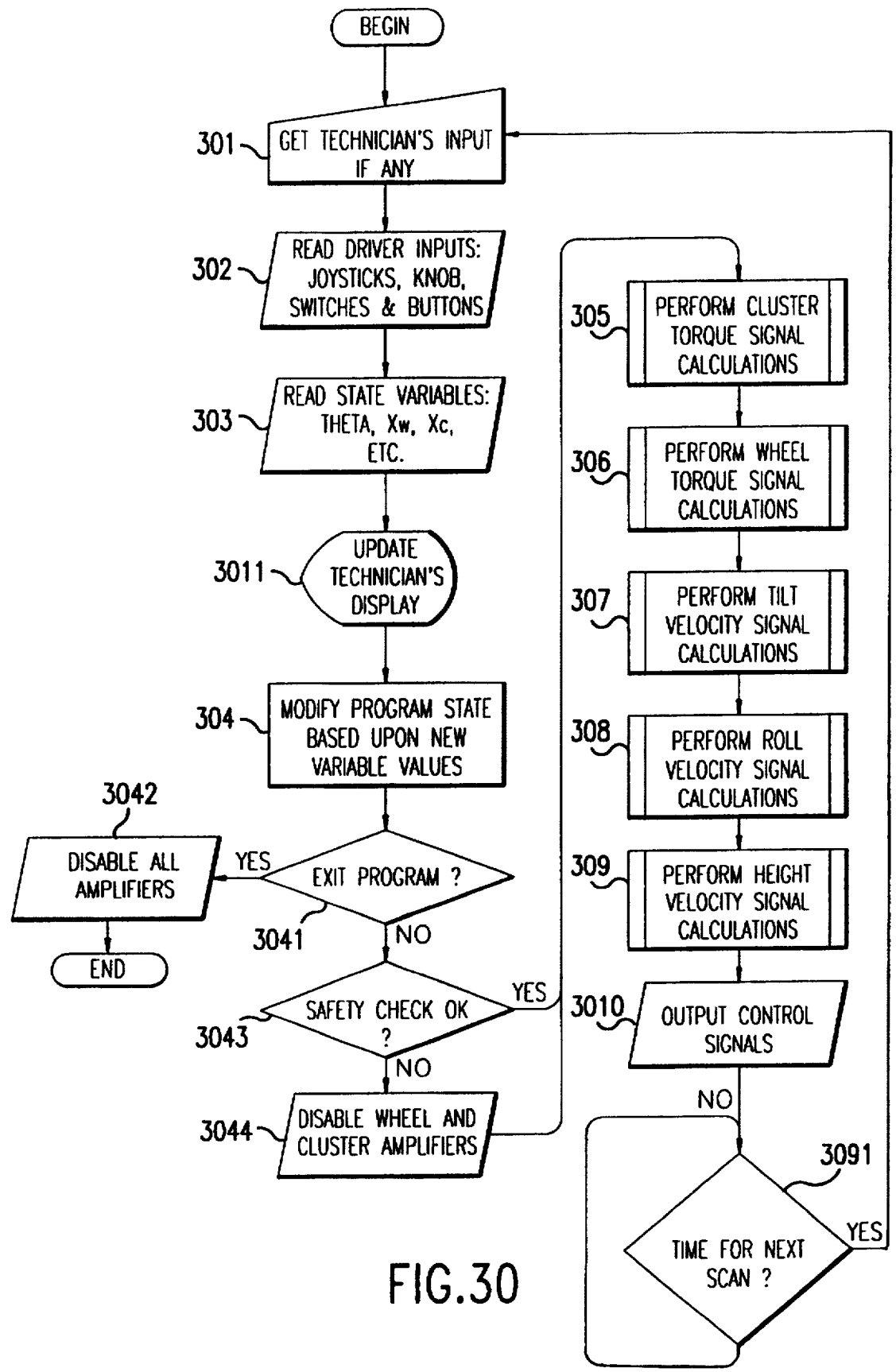
FIG. 30 is a logical flow diagram followed by the central micro controller board 272 of FIG. 27 in the course of one control cycle.

FIG. 30 is a logical flow diagram followed by the central micro controller board 272 of FIG. 27 in the course of one control cycle. For diagnostic purposes, the cycle begins at step 301, checking for the presence of any input from the technician. The next step, 302, is to read the driver's inputs from the joystick, switches, knobs, and buttons. Next, in step 303, the state variables of the vehicle are read as inputs. Next, in step 3011, the technician's display is updated (in case of diagnostic use), and then, in step 304, the program state is modified based upon the input variables obtained in steps 301 through 303. A test is then made whether to exit the program (step 3041), and if the determination is yes, all of the motor amplifiers are disabled (step 3042), and the program is ended. Otherwise, a safety check is made (in step 3043) of pertinent variables (such as temperature, battery voltage, etc., and if the result is negative, the wheel and cluster motor amplifiers are disabled (step 3044), and the program state is then modified (step 3055). However, several levels of checking are suitably employed so that the motor amplifiers are disabled only after threshold alarm conditioners have been established. If the safety check in step 3043 is positive or after the program state is modified in step 3055, calculations are performed seriatim for the cluster torque signal (step 305), wheel torque signal (step 306), tilt velocity signal (step 307), roll velocity signal (step 308), and height velocity signal (309). The results of these calculations are then provided as an output to their respective vehicles in step 3010. Under step 3091, the program waits for the next timing signal to begin the control cycle again. The frequency of the control cycles in this embodiment is in the range of 200–400 Hz., which provides satisfactory control responsiveness and stability.

Figure 31:
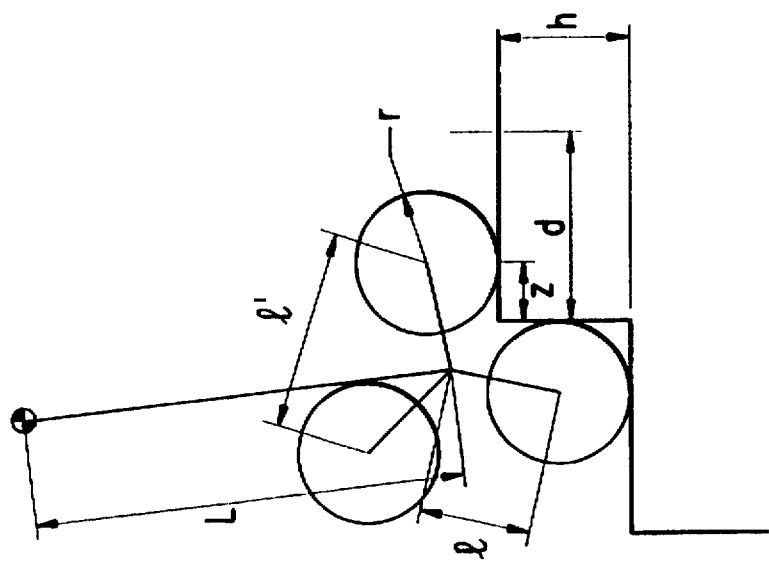
FIG. 31 illustrates variables defining the dimensions of the cluster design of FIGS. 11–26 and of a hypothetical stair with respect to which the cluster design will be used for ascent or descent.

FIG. 31 illustrates variables defining the dimensions of the cluster design of FIGS. 11–26 and of a hypothetical stair with respect to which the cluster design can be used for ascent or descent. Set forth in the following table are variables used to identify these dimensions shown in FIG. 31. "Nominal size" means typical dimensions of these items, in connection with which the embodiment of FIGS. 18–20 has been implemented and functions.

TABLE 1

Dimension Variables

| Variable | Description | Nominal Size |
|---|---|---|
| L | Distance from cluster center to center of mass of system | 21.0" |
| l | Distance from cluster center to wheel center | 5.581" |
| r | Distance from wheel center to wheel center | 9.667" |
| d | Depth of stair | 10.9" |
| h | Height of stair | 6.85" |
| z | Distance between the edge of the riser and the wheel contact point when four wheels are in contact with the stairs and the lower wheels are against the riser. This | 3.011" |

TABLE 1-continued

| | Dimension Variables | |
|---|---|---|
| Variable | Description | Nominal Size |
| | can be calculated using $z = (l^2 - h^2)^{1/2} - r$. | |
| r | Radius of the wheel | 3.81" |

The following conventions have been employed in using these variables and those in Table 2 below in connection with the description below:
1. Variables defined in world coordinates are named using a single subscript in capital letters. World coordinates are coordinates fixed to the earth (inertial).
2. Variables defined in relative coordinates are named with a dual subscript. The subscripts indicate the endpoints of the variable. The order of the subscripts indicates the sign of the variable. For example, $\theta_{PC}$ is the angle between the post and the cluster leg where clockwise rotation from the cluster post is positive (see note 4). A cluster's "leg" is the line segment from the center of the cluster to the center of the wheel that is currently being balanced on. A cluster's "post" is the line segment from the system's center of mass to the center of the cluster.
3. Lower case subscripts are used to indicate other attributes, e.g., right/left, etc.: r=right; l=left; ref= reference; f=finish; s=start.
4. All angles are positive in the clockwise direction, where positive travel is in the positive×direction.
5. A dot over a variable indicates differentiation in time, e.g., $\dot{\theta}$.

Figure 32:
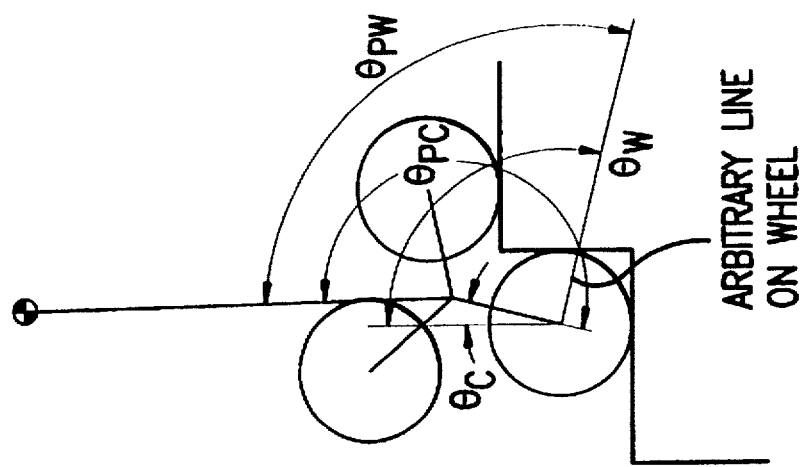
FIG. 32 illustrates angle variables pertinent to defining orientation of the cluster in relation to the vehicle and to the world.

FIG. 32 illustrates angle and motion variables pertinent to defining orientation of the cluster in relation to the vehicle and to the world. These variables are defined as set forth in the following table.

TABLE 2

| | Angle and Motion Variables. | |
|---|---|---|
| Variable | Name | Description |
| $\theta_C$ | Theta Cluster | The angle between vertical and the line from the wheel that is currently being balanced on to the cluster hub. |
| $\theta_W$ | Theta Wheel | The angle between vertical and an arbitrary radial line on the wheel. |
| $\theta_{PC}$ | Theta Post-Cluster | The angle centered at the cluster hub that starts at the post and ends at the leg being balanced on. ($\theta_{PC} = 180°$ when balanced on one wheel with the leg vertical.) |
| $\theta_{PW}$ | Theta Post-Wheel | The angle between the post and the arbitrary line on the wheel. |
| x | x | The linear position of the wheel center along the floor in reference coordinates. |
| $\theta_I$ | Theta Inclinometer | The angle of the inclinometer with respect to gravity. |
| $\theta$ | Theta (Pitch Angle) | The actual angle between center of mass of the vehicle and the wheel center. This is derived by compensating inclinometer angle $\theta_I$ for $\theta_C$ and $\theta_{PC}$. |
| $\psi$ | Yaw Angle | The angle between the X axis of the vehicle and the x-axis of the reference frame. |

Figure 33:
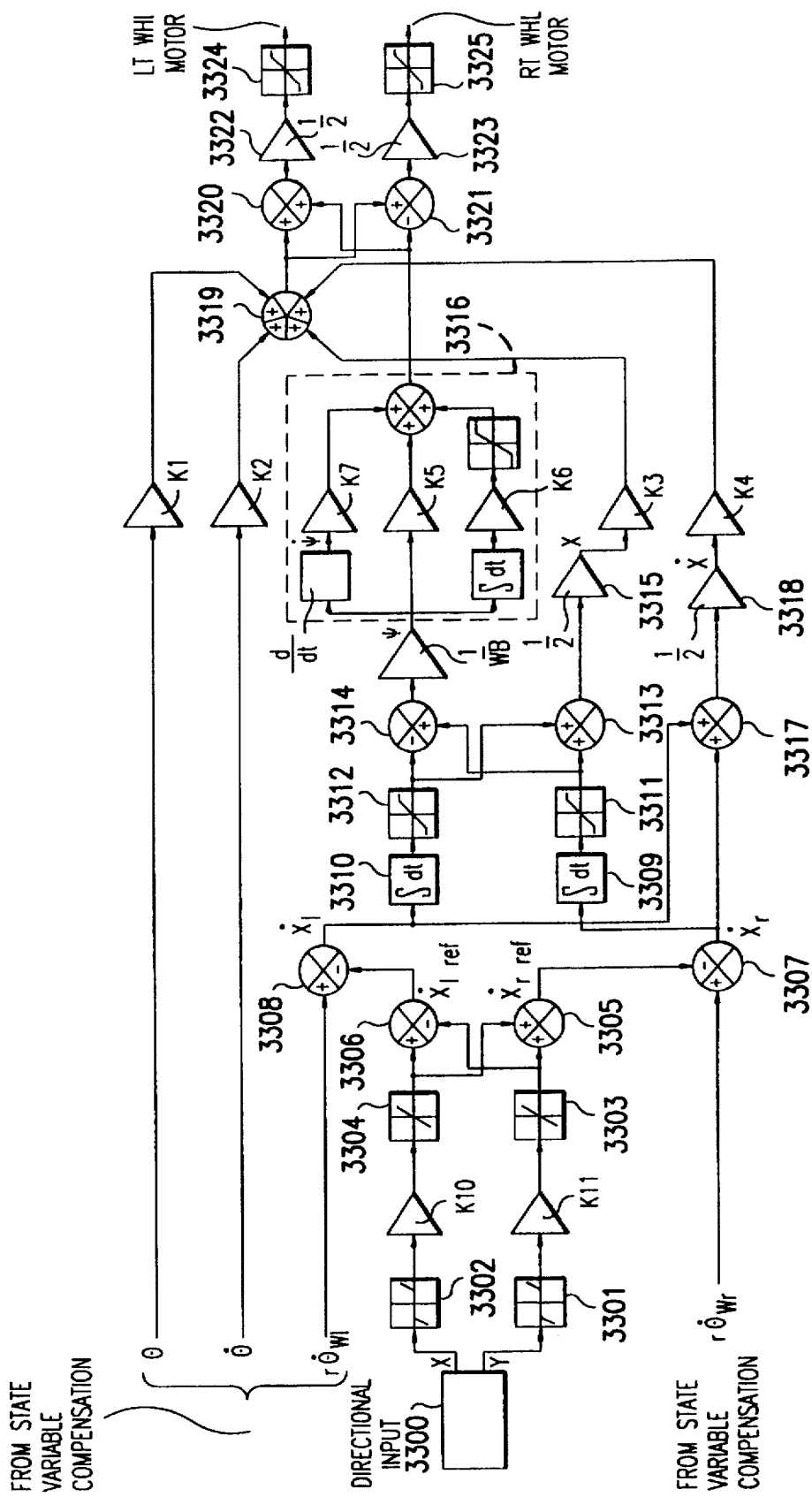
FIG. 33 is a schematic of the wheel motor control during balancing and normal locomotion.
Figure 34:
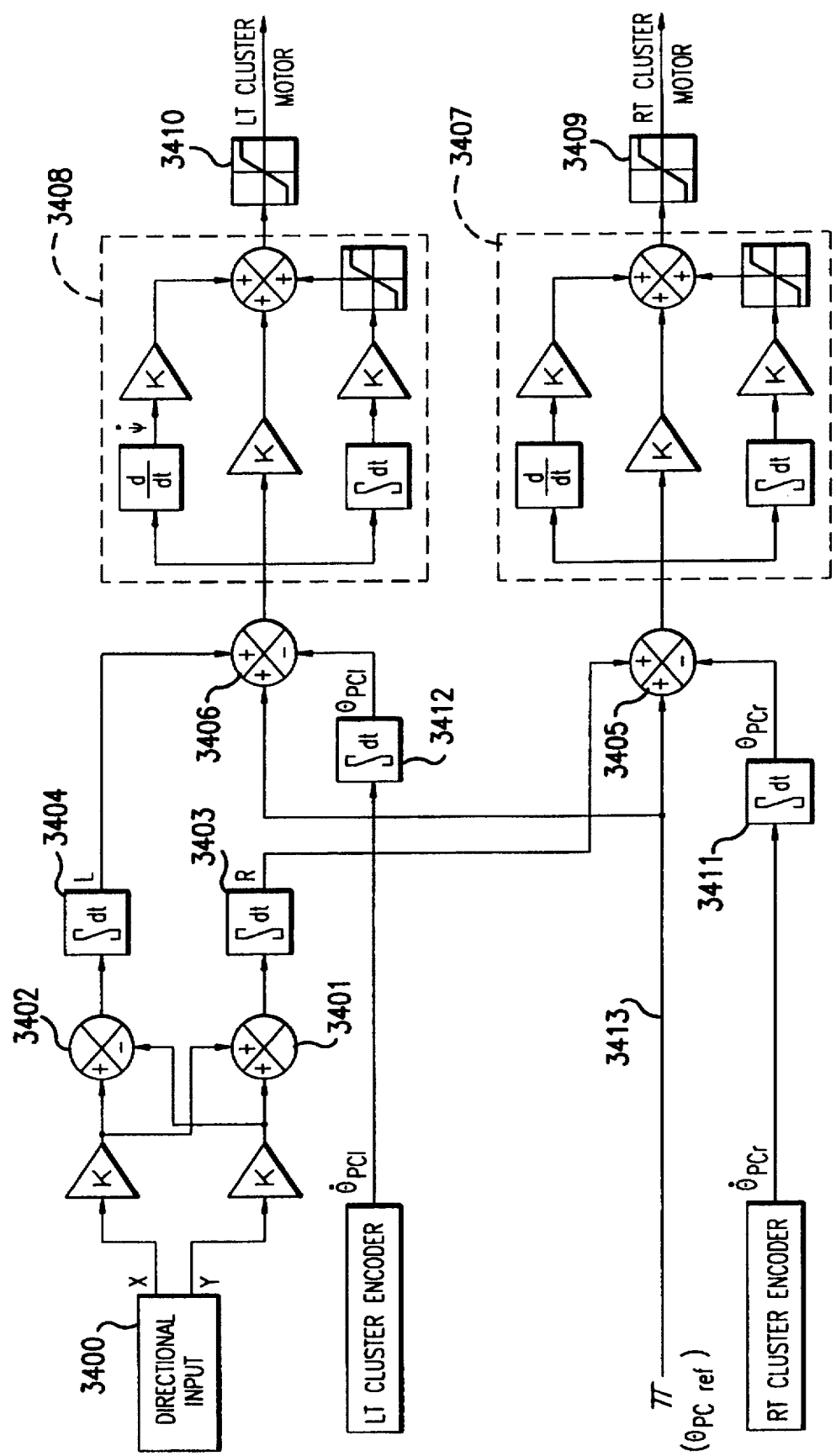
FIG. 34 is a schematic of the cluster control arrangement during balancing and normal locomotion.
Figure 35:
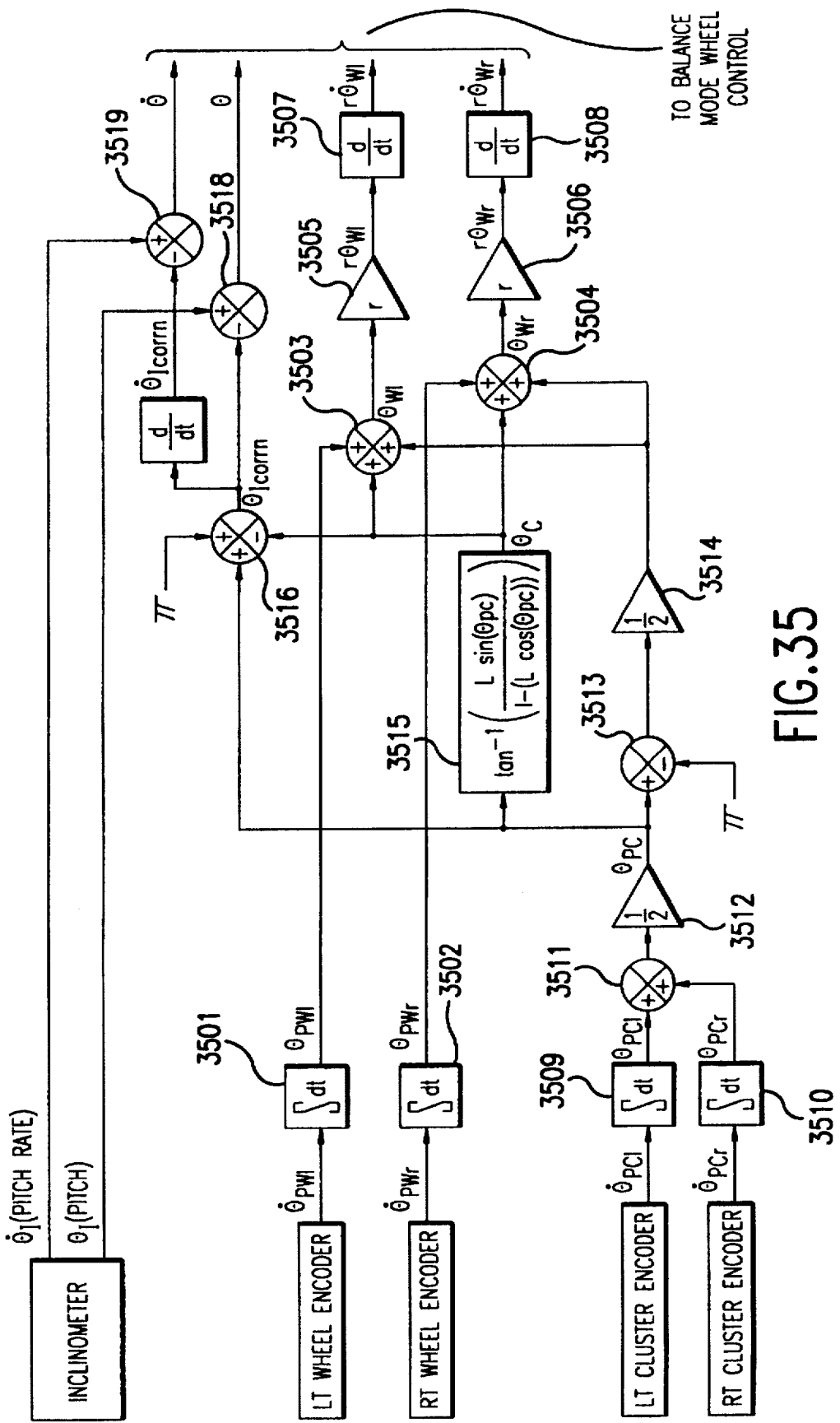
FIG. 35 is a schematic, relating to FIG. 33, showing the arrangement by which the state variables indicating wheel position are determined so as to compensate for the effects of cluster rotation.

FIGS. 33–35 are block diagrams showing control algorithms, suitable for use in conjunction with the control assemblies of FIG. 27, to provide stability for a vehicle according to the embodiment of FIGS. 11–21 when balanced on a pair of wheels, both during locomotion and in a fixed position.

FIG. 33 shows the control arrangement for the motors of the right and left wheels (corresponding to items 252a and 252b of FIG. 25). The arrangement has inputs of $\theta$, $\dot{\theta}$, r$\dot{\theta}_{wl}$ (linear velocity of the left wheel relative to the world coordinate system) and r74$_{wr}$ (linear velocity of the right wheel), in addition to directional inputs 3300 determined by joystick position along X and Y axes of a reference coordinate system. Inputs $\theta$, $\dot{\theta}$, and error signals x and $\dot{x}$ (described below), subject to gains K1, K2, K3, and K4 respectively, become inputs to summer 3319, which produces the basic balancing torque command for the wheels, in the general manner described above in connection with FIG. 6 above. The output of summer 3319 is combined with the output of yaw PID loop 3316 (described below) in summer 3320, then divided in divider 3322 and limited in saturation limiter 3324, to produce the left wheel torque command. Similarly, the output of summer 3319 is combined with the output of PID loop 3316 in summer 3321, then divided in divider 3323 and limited in saturation limiter 3325, to produce the right wheel torque command.

In FIG. 33, a directional input along the X axis moves the reference coordinate system along its X axis relative to the world coordinate system (which represents the traveled surface), at a velocity proportional to the displacement of the joystick. A directional input along the Y axis rotates the reference coordinate system about its Z axis at an angular velocity proportional to the displacement of the joystick. It will be appreciated that motion of the joystick in the positive X direction is here interpreted to mean forward motion; motion of the joystick in the negative X direction means reverse motion. Similarly, motion of the joystick in the positive Y direction means leftward turning, counter-clockwise as viewed from above; motion of the joystick in the negative Y direction means rightward turning clockwise as viewed from above. Hence the directional inputs Y and X are given deadband via deadband blocks 3301 and 3302 respectively, to widen the neutral position of the joystick, then subject to gains K11 and K10, then rate-limited by limiters 3303 and 3304 respectively, which limit the angular and linear accelerations respectively of the reference coordinate system. The sum of these outputs achieved through summer 3305 becomes the reference velocity $\dot{x}_{r,ref}$ whereas the difference of these outputs achieved through summer 3306 becomes the reference velocity $\dot{x}_{l,ref}$. These reference velocities are subtracted in summers 3308 and 3307 from compensated linear velocity input signals r$\dot{\theta}_{wl}$ and r$\dot{\theta}_{wr}$ in left and right wheels (see description below in connection with FIG. 35 for these quantities) to obtain velocity error signals $\dot{x}_l$ and $\dot{x}_r$ for left and right wheels within the reference coordinate system. In turn the average of these signals, determined via summer 3317 and divider 3318, produces a linear velocity error signal $\dot{x}$. Displacement error signal x is derived by integrating r$\dot{\theta}_{wl}$ and r$\dot{\theta}_{wr}$ in integrators 3310 and 3309, limiting the results in saturation limiters 3312 and 3311, and then averaging their outputs via summer 3313 and divider 3315. The difference between these displacements, determined via summer 3314, produces the yaw error signal $\psi$.

The yaw error signal $\psi$ is run through a standard proportional-plus-integral-plus-derivative (PID) control loop 3316, the output of which is combined with the output of the basic balancing torque command of summer 3319, to produce the individual wheel torque commands, which cause the wheels to maintain fore-aft stability and also cause the vehicle to align itself with the axes of, and follow the origin of, the reference coordinate system as directed by directional input 3300.

FIG. 34 is a schematic of the cluster control arrangement. The orientation of the clusters can be controlled by directional inputs 3400. If desired, the same joystick as used to provide directional inputs 3300 to the wheels may be switched, by a separate switch, to be operative, in a separate mode, to provide the directional inputs 3400 specifying the orientation of the clusters. In a fashion generally analogous to the signal path through summers 3306 and 3305 of FIG. 33, here the joystick signals resulting from positive displacement in the X direction are added, and signals resulting from positive displacement in the Y direction are subtracted from one another, in summers 3402 and 3401 to provide left and right cluster rotation rate signals, which, after integration in integrators 3404 and 3403 respectively, provide desired cluster angle orientation information to left and right cluster summers 3406 and 3405 respectively.

Absent directional inputs 3400, the preferred cluster orientation, normally $\theta_{PC\,ref}=\pi$ radians, is provided over line 3413 of FIG. 34 to each of the summers 3406 and 3405, along with signals showing actual cluster orientation $\theta_{PCl}$ and $\zeta_{PCr}$ (derived by passing cluster angle rate signals from left and right cluster encoders through integrators 3412 and 3411 respectively). The outputs of the summers 3406 and 3405 are therefore cluster position error signals for the left and right clusters respectively. These signals are fed through PID control loops 3408 and 3407 and saturation limiters 3410 and 3409 to drive the left and right cluster motors.

FIG. 35 is a schematic, relating to FIG. 33, showing the arrangement by which the state variables indicating wheel position, pitch, and pitch rate are determined so as to compensate for the effects of cluster rotation. As mentioned in Table 2, the pitch angle θ is the actual angle between the center of mass of the vehicle and the center of the wheel that is currently being balanced on. The angle $\theta_I$ measured by the inclinometer is the angle of the post with respect to the vertical. Hence the actual pitch angle θ is based on $\theta_I$ from which a correction signal $\theta_{Icorr}$ is subtracted by summer 3518. The signal $\theta_{Icorr}$ is calculated in summer 3516 as $\theta_{PC}+\pi-\theta_C$. The signal $\theta_{PC}$ is determined as the average of the left and right post-to-cluster angles $\theta_{PCl}$ and $\theta_{PCr}$ obtained from integration in integrators 3509 and 3510 of left and right cluster encoder outputs; the average is obtained by using summer 3511 and divider 3512. Assuming that the vehicle is balanced, $\theta_C$ can be derived from $\theta_{PC}$ using the formula $$\theta_C = \tan^{-1}\left(\frac{L\sin\theta_{PC}}{1-L\cos\theta_{PC}}\right).$$

This calculation is achieved in section 3515. The $\theta_{Icorr}$ is differentiated by differentiator 3517 to provide a correction to pitch rate signal $\dot\theta_I$, which is supplied by summer 3519, yielding the corrected output $\dot\theta$.

Similarly, the linear left and right velocities $r\dot\theta_{wl}$ and $r\dot\theta_{wr}$ for left and right wheels are derived from differentiation by differentiators 3507 and 3508 of the derived linear left and right position signals $r\dot\theta_{wl}$ and $r\dot\theta_{wr}$. The position signals, in turn, are derived by multiplying by a gain of r in multipliers 3505 and 3504 the determined absolute angular positions $\theta_{Wl}$ and $\theta_{Wr}$ of the left and right wheels. The angular positions $\theta_{Wl}$ and $\theta_{Wr}$ are determined by first integrating the left and right wheel encoder signals $\dot\theta_{PWl}$ and $\dot\theta_{PWr}$ in integrators 3501 and 3502 to obtain $\theta_{PWl}$ and $\theta_{PWr}$. These signals are then fed into summers 3503 and 3504 where they are compensated for the effects of cluster rotation by the addition of $\theta_C$ and the quantity $\frac{1}{2}(\theta_{PC}-\pi)$ derived from summer 3513 and divider 3514.

Figure 36:
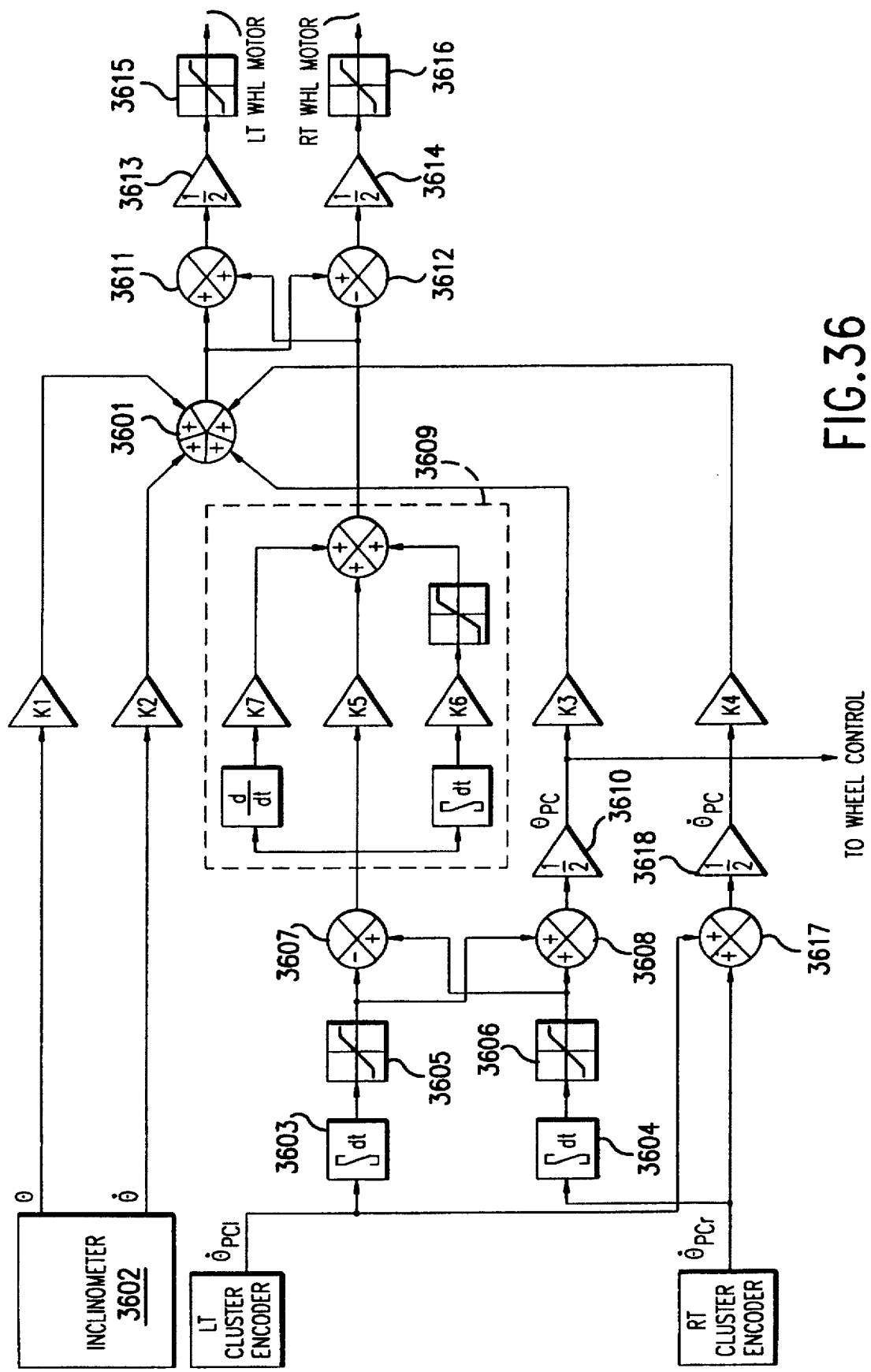
FIGS. 36–38 illustrate the control arrangement for stair-climbing and obstacle traversal achieved by the cluster design of FIGS. 11–26 in accordance with a first embodiment permitting climbing.
Figure 37:
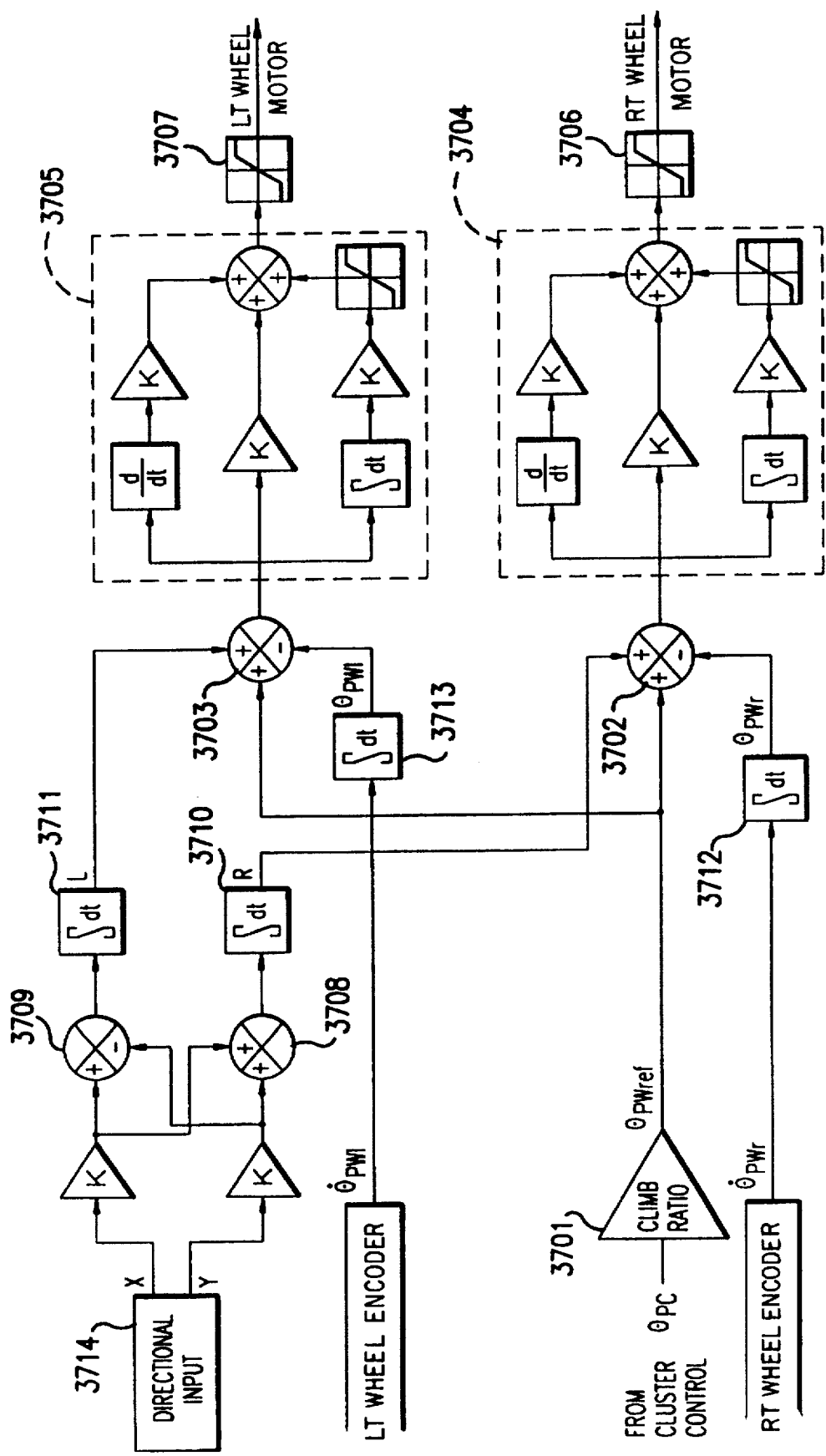

FIGS. 36 and 37 are block diagrams showing control algorithms, suitable for use in conjunction with the control assemblies of FIG. 27, to permit a vehicle according to the embodiment of FIGS. 11–21 to achieve stair-climbing and obstacle traversal in accordance with a first embodiment permitting climbing. In this embodiment the clusters are put in a lean mode, in which they are rotated to attempt to maintain balance in the same general manner as used in normally balancing by wheel rotation as shown in FIG. 33. The same basic equations are used. In FIG. 36, summer 3601 provides correction signals to drive the left and right clusters, derived, among other things, from inclinometer 3602, which provides pitch and pitch rate signals θ and $\dot\theta$ via gains K1 and K2 respectively. The encoder outputs from left and right clusters provide inputs of $\dot\theta_{PCl}$ and $\dot\theta_{PCr}$ which are integrated by integrators 3603 and 3604 respectively and saturation limited by limiters 3605 and 3606 respectively to produce $\theta_{PCl}$ and $\theta_{PCr}$. These values, when averaged via summer 3608 and divider 3610, result in angular displacement $\theta_{PC}$, which is provided through gain K3 as an additional input to summer 3601. The velocity $\dot\theta_{PC}$, determined as the average of $\dot\theta_{PCl}$ and $\dot\theta_{PCr}$ via summer 3617 and divider 3618, is a further input to summer 3601, this time via gain K4. The output of summer 3601 provides uniform drive of the left and right cluster motors via summers 3611 and 3612, dividers 3613 and 3614, and saturation limits 3615 and 3616 respectively. In addition, however, the twist signal, via PID control loop 3609, provides a differential drive through summers 3611 and 3612 to the left and right cluster motors. The twist signal is derived by using summer 3607 to subtract the signals $\theta_{PCl}$ and $\theta_{PCr}$ from one another.

When the clusters are in the lean mode, the wheels are in a slave mode, in which the wheels are driven as a function of the rotation of the clusters. This is shown in FIG. 37, where $\theta_{PC}$, derived from FIG. 36, as output from divider 3610, is multiplied by a climb ratio constant in gain 3701 to produce $\theta_{PWref}$ a signal that is fed to summers 3703 and 3702 to control the left and right wheel motors via PID control loops 3705 and 3704 and saturation limits 3707 and 3706 respectively. A comparison of FIGS. 37 and 34 show that the wheels are slaved to the clusters in FIG. 37 in the same manner that the clusters are slaved to the vertical (π radians) input 3413 in FIG. 34. In FIG. 37, the summers 3703 and 3702 have two other inputs each. One input is to track the results of directional inputs 3714 from the joystick, which, in a manner analogous to the processing in FIG. 34, via summers 3709 and 3708 and integrators 3711 and 3710, produces left and right control signals provided as inputs summers 3703 and 3702 respectively. Another input is to track the effects of wheel rotation, so $\theta_{PWl}$ and $\theta_{PWr}$ obtained by running the left and right wheel encoder outputs through integrators 3713 and 3712 are also subtracted by summers 3703 and 3702.

The use of the lean mode provides a powerful and stable method to achieve climbing over obstacles. The climb ratio is determined by the multiplier selected for gain 3701 of FIG. 37. Once this is determined (an item that can be selected manually or automatically determined following obstacle measurement using appropriate spatial sensors or determined in whole or in part empirically based on the state variables themselves) the vehicle can surmount obstacles by the subject's leaning or causing the vehicle to lean in the desired direction. The clusters rotate to maintain balance at the same time that they, with the wheels, are rotating over the obstacles. When the vehicle does not encounter obstacles, it may desirably be operated in the balance mode of FIGS. 33 and 34, with the clusters slaved to π radians and the wheels maintaining balance and causing desired locomotion.

Figure 38:
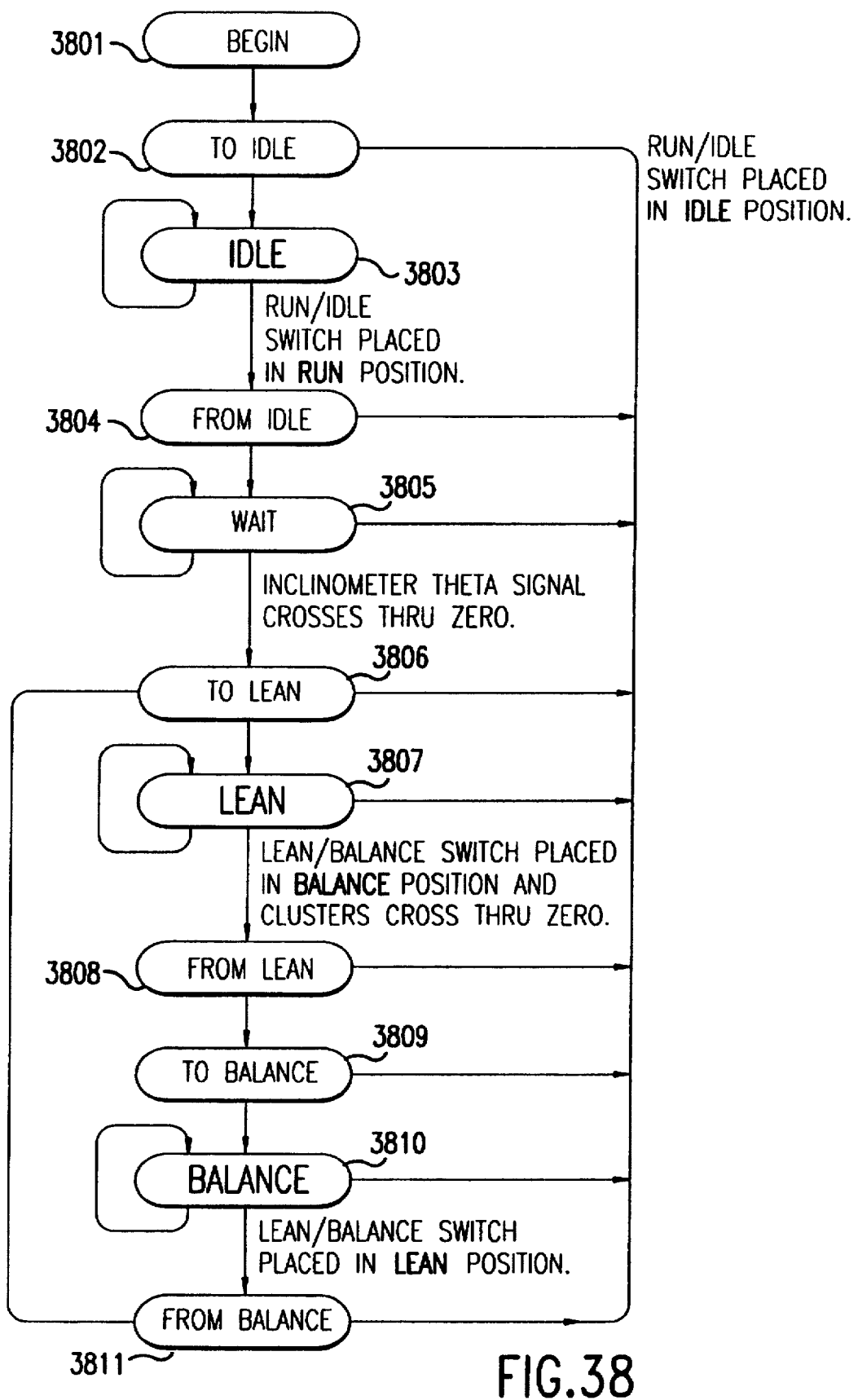

The transitions between wheel balancing mode and cluster lean mode are a matter requiring attention. FIG. 38 is a block diagram of the state of the vehicle, utilizing the embodiment of FIGS. 33–37, among idle, lean, and balance modes. At key times, there will be no state change until it is determined that $(\theta_{PC}-\pi) \bmod (2\pi/3)=0$. This is a point at which the center of mass is approximately above the ground contacting pair, and such a condition is referred to as a "zero crossing" below in this description and in the following claims. At the zero crossing, the cluster is in a position so that, for example, it can be slaved to the $\theta_{PC}=\pi$ position in the manner of FIG. 34. After beginning at block 3801, the vehicle's initial state is To Idle 3802, from which it enters and remains in Idle 3803, until the Run/Idle switch is moved into the Run position. Once in that position, the vehicle enters the From Idle state 3804. Because there is no absolute reference on either of the clusters, we assume that the vehicle is on flat, level ground at state "From Idle" 3804, where an absolute reference is established. All movement of the clusters determined by the incremental encoders is relative to this reference. At this point, or at any later point, if the Run/Idle switch is moved back to the Idle position, the state returns over path 3812 to the To Idle state 3802. Otherwise, the state becomes Wait 3805, and remains there, until it is determined that $\theta=0$, whereupon the state becomes To Lean 3806. To Lean then moves to Lean 3807, and remains there, unless a switch is moved. If the Lean/Balance switch is then placed in the Balance position and if the clusters experience a zero crossing, then the state moves successively to From Lean 3808, to To Balance 3809, and finally to Balance 3810. If the Lean/Balance switch is moved to the Lean position, the state moves to From Balance 3811 and back to To Lean 3806.

The Wait state allows a smooth startup of the wheel and cluster motors. Without it, the control loop would immediately attempt to compensate for a potentially large error signal from the inclinometer. By starting at a zero crossing, this is avoided. An additional technique of monitoring $\dot\theta$ and requiring it to be below a certain threshold at a zero crossing provides an even softer start.

Figure 39B:
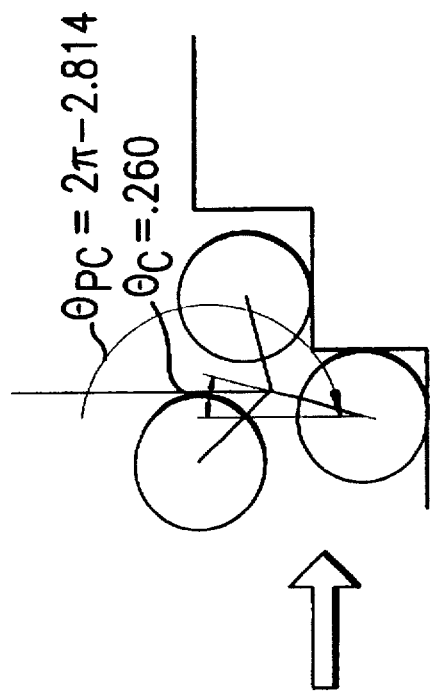
FIGS. 39A–B, 40A–B, 41A–B, and 42A–C illustrate stair-climbing achieved by the cluster design of FIGS. 11–26 in accordance a second embodiment permitting climbing.
Figure 39A:
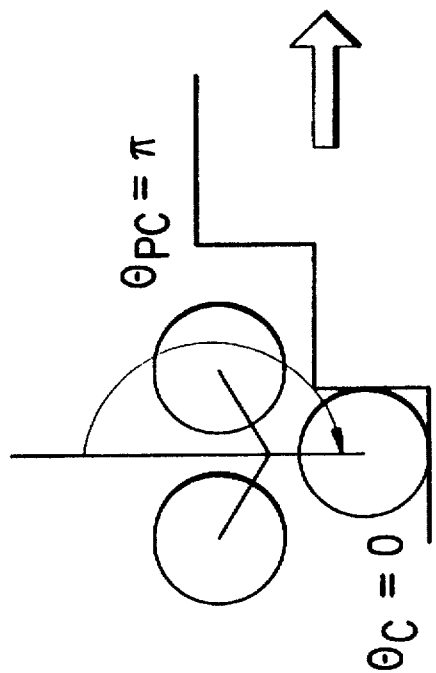

FIGS. 39A–B, 40A–B, 41A–B, and 42A–C illustrate the sequences in a control arrangement, to permit a vehicle according to the embodiment of FIGS. 11–21 to achieve stair climbing in accordance a second embodiment. Four basic sequences of operation are involved in this embodiment: start; reset angle origins; transfer weight; and climb. This embodiment, among others, may be conveniently implemented in the control arrangement of FIG. 27. Block diagrams showing control algorithms for achieving these four sequences are shown in FIGS. 43 (start), 44 (transfer weight), and 45 (climb). (No motion is involved in the reset angle origins sequence, so no control algorithm is shown for this sequence.) FIGS. 39A and 39B illustrate orientation of the cluster in the start sequence. In this sequence, the cluster moves from its normal balancing position on two wheels (FIG. 39A) to a position (shown in FIG. 39B) in which a first pair of wheels (one from each cluster) is on a first level and a second pair of wheels from each cluster is on the next stair. The angle values used in this description in connection with FIGS. 39A through 42C are those resulting from application of the nominal stair and cluster wheel sizes given in Table 1 above. In the start sequence, algorithm shown in FIG. 43, an input is provided of $\theta_{C\ ref}$ as a function of time to the cluster block 4301; the function varies smoothly from the start to the finishing values. Alternatively, an input of $\theta_{PC\ ref}$ can be provided in a similar fashion. Here the input of $\theta_{C\ ref}$ is run through processor 4302 to compute the quantity $$\sin^{-1}\left(\frac{L\sin\theta_C}{L}\right).$$

This quantity, along with $\theta_{C\ ref}$ itself and $\pi$ are provided as inputs to summer 4303, which computes $$\theta_{PCref}=\pi-\theta_{Cref}-\sin^{-1}\left(\frac{L\sin\theta_{Cref}}{L}\right),$$

and provides this quantity as the $\theta_{PC\ ref}$ input to cluster block 4301. The cluster block 4301 is configured as in FIG. 34, except that $\theta_{PC\ ref}$ is no longer fixed at $\pi$, but varies as just described. The balancing block 4304 is configured as in FIG. 33, but the joystick gains K10 and K11 are set to 0. The summer 4305 provides compensation to the pitch reading of the inclinometer in the same manner as described above in correction with FIG. 35, and the output of summer 4305 is differentiated by differentiator 4306 to provide correction of $\dot\theta_i$ in the manner described above in connection with FIG. 35, so corrected pitch inputs $\theta$ and $\dot\theta$ are provided to the wheel balancing algorithm 4304. The inputs $r\dot\theta_{wl}$ and $r\dot\theta_{wr}$ to balancing block are also derived in the same mainer as described above in connection with FIG. 35.

Figure 40A:
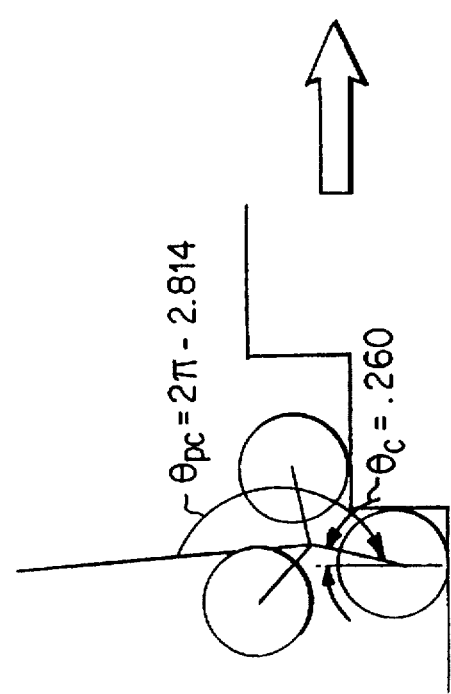
Figure 40B:
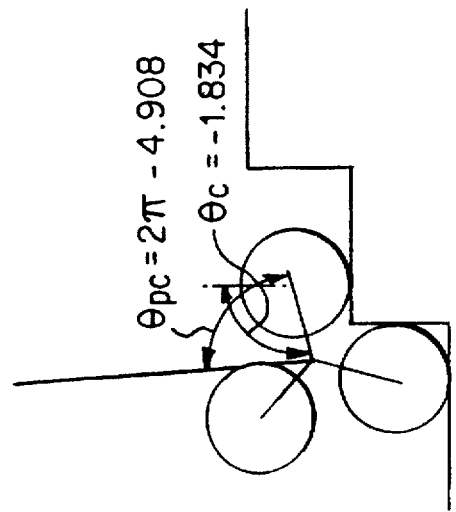

FIGS. 40A and 40B illustrate orientation of the cluster in the reset angle origins sequence. In this step, the system changes the identity of the "leg" (referred to in item 2 of the conventions discussed after Table 1), for the purpose measuring state variables, from that associated with the lower wheel to that associated with the wheel on the next stair. As a result, since there are three wheels in the cluster, and the total angular distance around the cluster's center is $2\pi$ radians, this step adds $2\pi/3$ radians to $\theta_{PC}$ and subtracts $2\pi/3$ radians from $\theta_C$. There is no motion associated with this step.

Figure 41A:
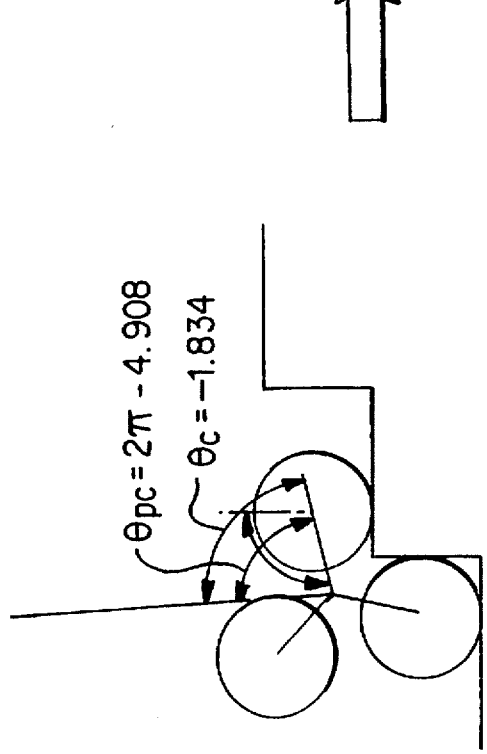
Figure 41B:
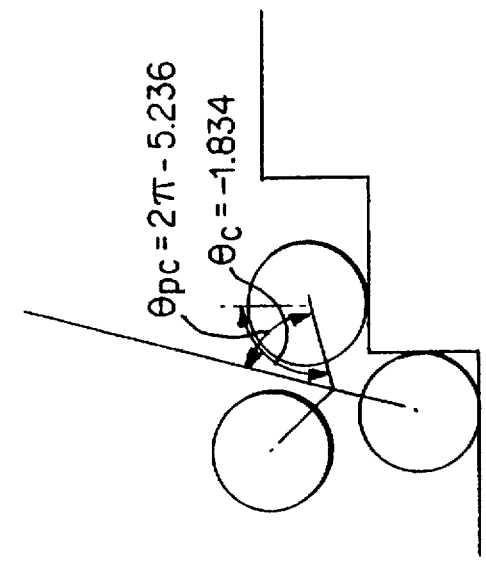
Figure 44:
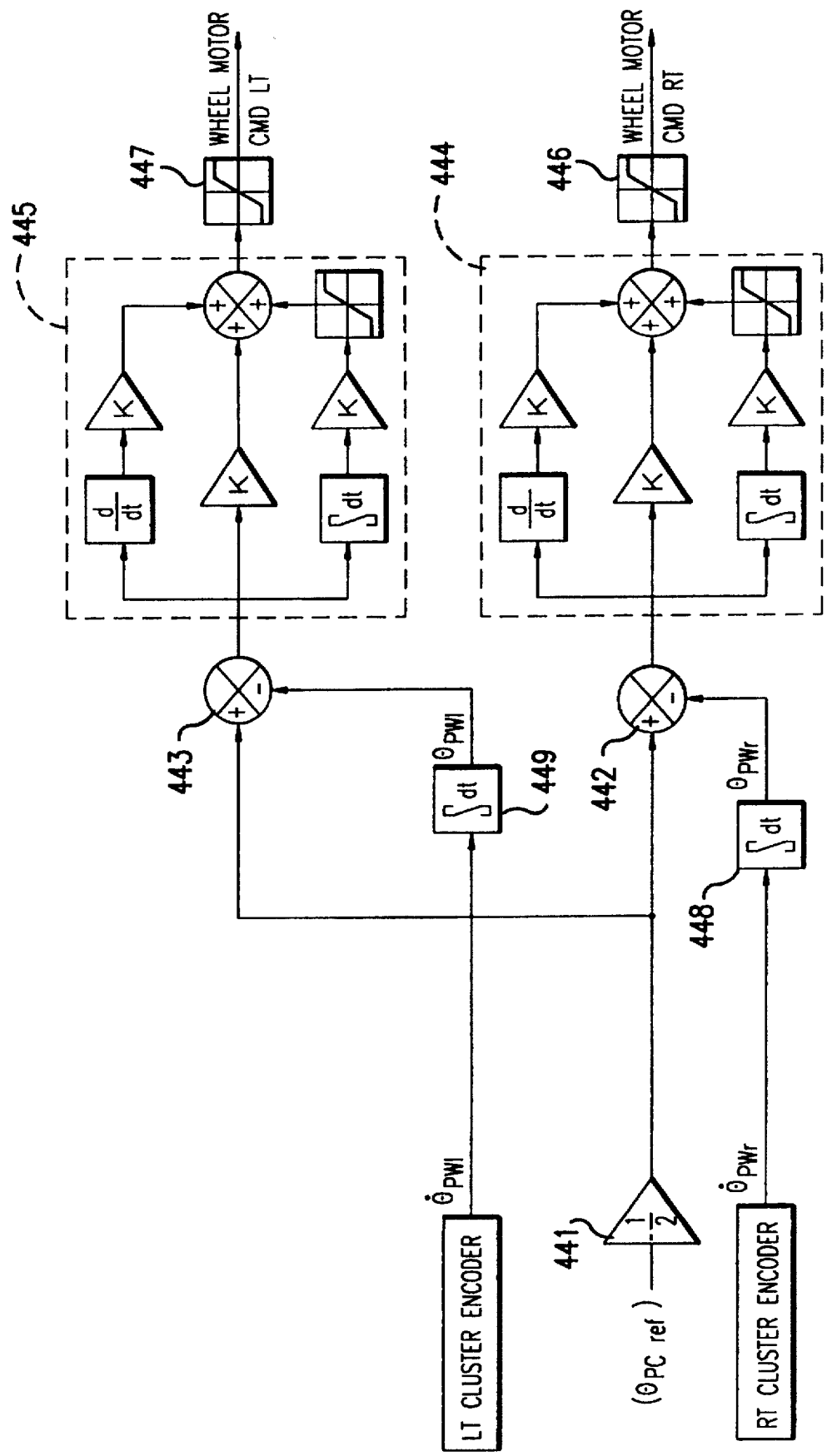
FIG. 44 is a schematic for the control arrangement for the wheel motors during the weight transfer sequence of FIGS. 41A and 41B.

FIGS. 41A and 41B illustrate orientation of the cluster in the transfer weight sequence. In this sequence, the weight of the vehicle and of the subject is transferred from the wheel on the lower stair to the wheel on the upper stair. It is here implemented as a pre-programmed operation based on the known geometry of the stairs and the cluster. The value of $\theta_C$ does not change during this sequence. The value of $\theta_{PC}$ must change to reflect the new location of the vehicle's center of mass. To achieve this result, an input of $\theta_{PC\ ref}$ as a function of time is provided on line 3413 to the cluster block shown in FIG. 34 and to the wheel block of FIG. 44. Because this sequence is programmed, the climb block of FIG. 45 and the wheel balance block of FIG. 33 are not active. In FIG. 44, the $\theta_{PC\ ref}$ input is run through divider 441 and then provided to summers 443 and 442 that provide control signals, via PID control loops 445 and 444 and saturation limits 447 and 446, to the left and right motor wheels respectively. The summers 443 and 442 also subtract the values of $\theta_{PWl}$ and $\theta_{PWr}$ derived by running the angular velocity information from left and right wheel encoders through integrators 448 and 449 respectively.

Figure 42C:
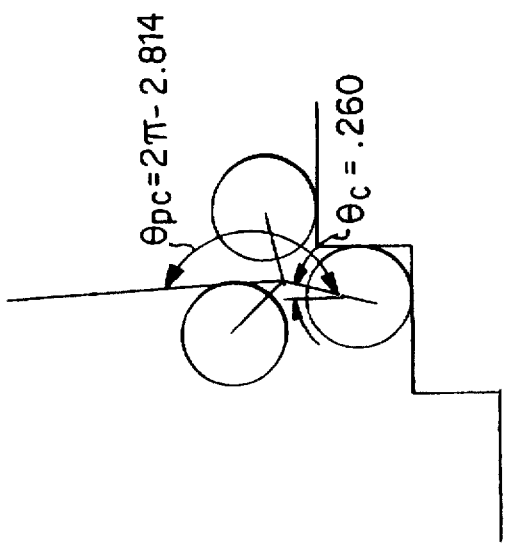
Figure 42B:
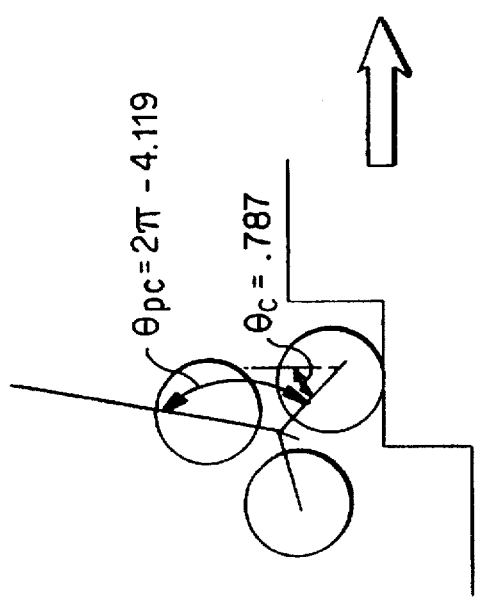
Figure 42A:
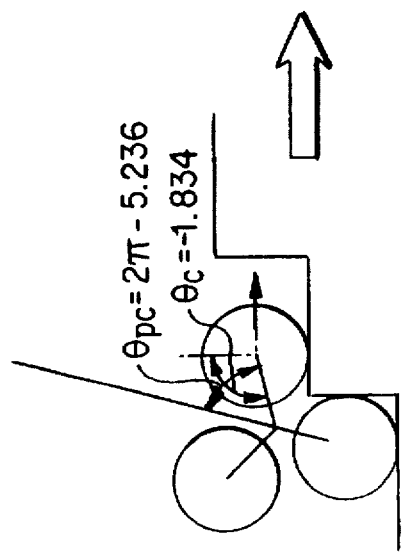
Figure 43:
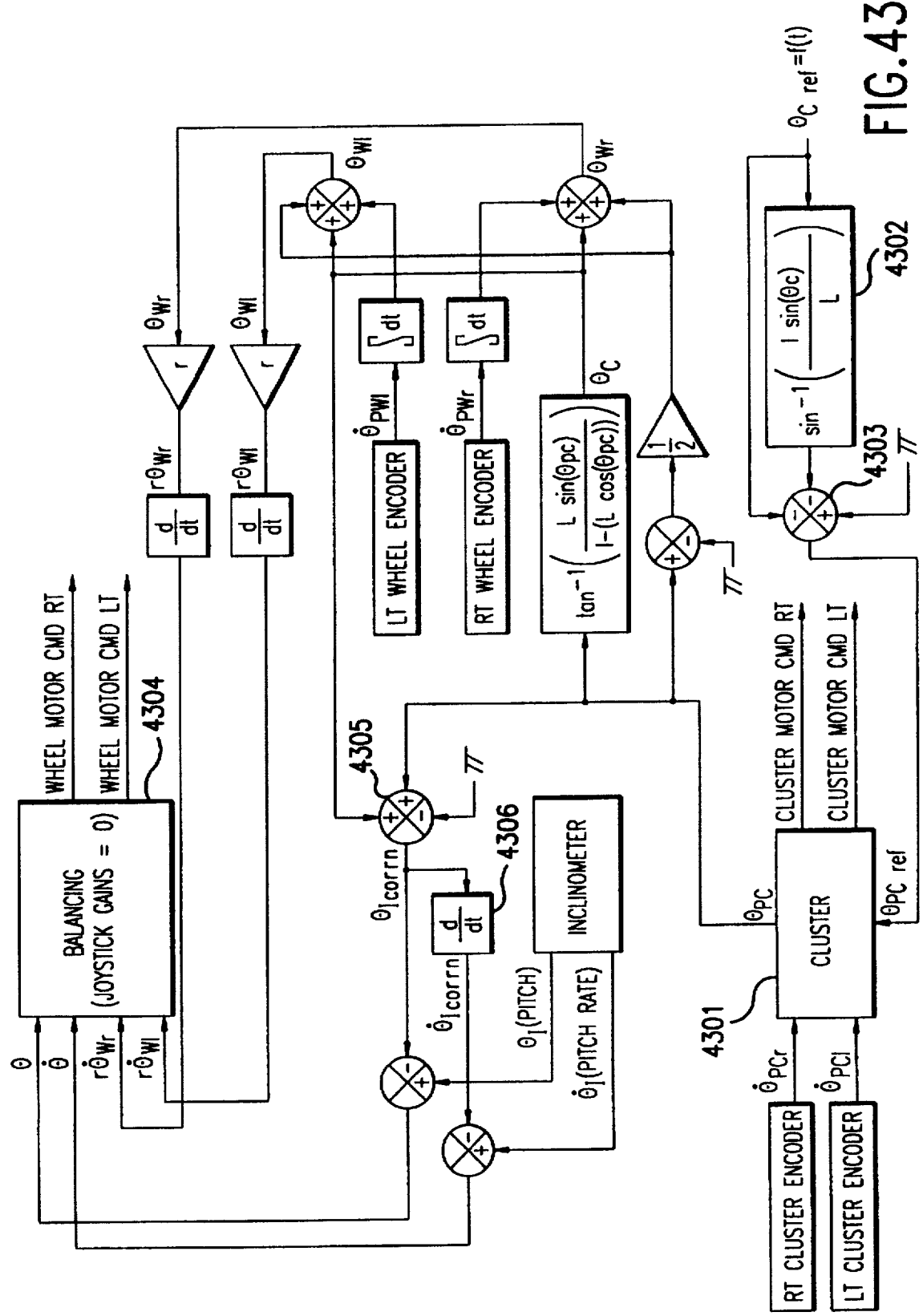
FIG. 43 is a schematic for the control arrangement for the wheel and cluster motors during the start sequence of FIGS. 39A and 39B.
Figure 45:
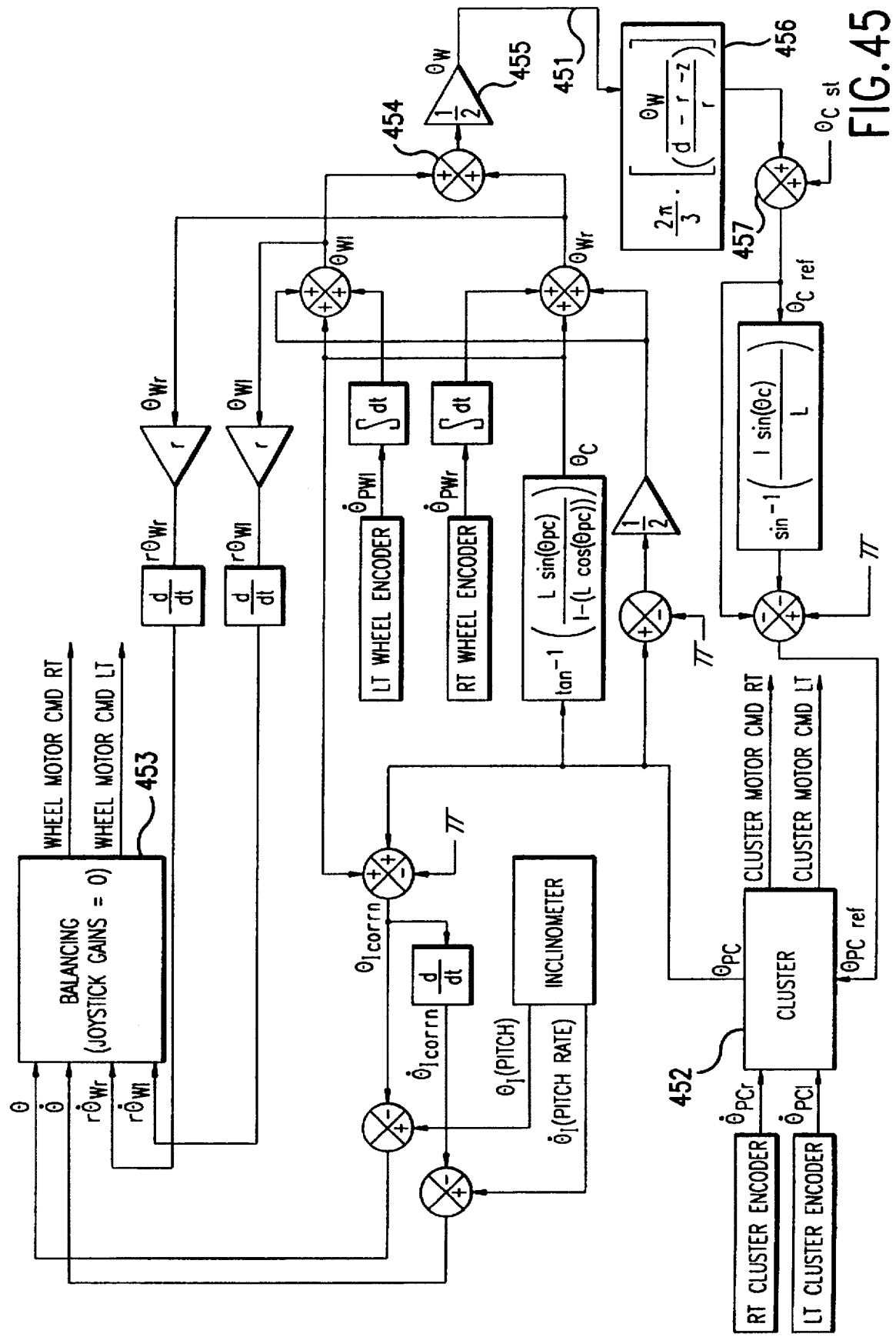
FIG. 45 is a schematic for the control arrangement during the climb sequence of FIGS. 42A, 42B, and 42C.

FIGS. 42A, 42B, and 42C illustrate orientation of the cluster in the climb sequence. In this sequence, the wheel of the vehicle is rotated in a forward direction toward the next stair riser while simultaneously rotating the cluster to position the next balancing wheel on the next stair tread. The cluster rotation $\theta_C$ is proportional to the distance traveled by the wheel on the stair tread. In this sequence, there is no reference position input. The subject leans or pulls on the hand rail in order to cause the vehicle to move forward. The cluster rotates automatically as a result of the feedback from $\theta_C$ to $\theta_{PC}$ over path 451 in FIG. 45. At the beginning of the climb sequence, x is set to 0. The control algorithm in this sequence needs to monitor either $\theta_C$ or $\theta_{PC}$ and move to the transfer weight sequence when this angle reaches its final value. On the last stair, instead of stopping at the finishing angles shown in FIG. 42C, the process must be stopped at $\theta_C=0$ or $\theta_{PC}=\pi$. Then the vehicle should return to normal balancing mode. The balancing block 453 and the cluster block 452 are as described above in connection with FIGS. 33 and 34 respectively. The derivation of inputs $\theta$, $\dot{\theta}$, $r\dot{\theta}_{wl}$ and $r\dot{\theta}_{wr}$ to the balancing block 453 is as described above in connection with FIGS. 43 and 35. Indeed, the configuration of FIG. 45 is substantially similar to that of FIG. 43, with the singular difference that $\theta_{C\ ref}$ is no longer independently varied, but instead is made a function of $\theta_w$, which is derived by taking the average, via summer 454 and divider 455, of $\theta_{wl}$ and $\theta_{wr}$. Accordingly, the $\theta_w$ value on line 451 is run through processor 456 to determine the quantity $$\frac{2\pi}{3} \cdot \left\{ \frac{\theta_w}{\left[\frac{D-r-z}{r}\right]} \right\},$$

which causes the correct amount of cluster rotation in relation to wheel rotation for the stair geometry and is provided as an input to summer 457 along with the initial value of $\theta_C$, namely $\theta_{C\ sr}$. The output of summer 457 is $\theta_{C\ ref}$.

Although the FIGS. 33–45 show analog control algorithms, they have been implemented in a number of embodiments using microprocessor programmed digital control. However, it is wholly within the scope of the present invention to use direct analog controls as well as a hybrid of analog and digital controls. Analog controls have been successfully implemented, for example, in a version of the vehicle of FIG. 21, using a pair of laterally disposed wheels in lieu of clusters.

Speed Limiting

In a further embodiment, any of the foregoing embodiments of a vehicle in accordance with the present invention may be provided with speed limiting to maintain balance and control, which may otherwise be lost if the wheels (or arcuate elements) were permitted to reach the maximum speed of which they are currently capable of being driven.

Speed limiting is accomplished by pitching the vehicle back in the direction opposite from the current direction of travel, which causes the vehicle to slow down. In this embodiment, the vehicle is pitched back by adding a pitch modification to the inclinometer pitch value. Speed limiting occurs whenever the vehicle velocity of the vehicle exceeds a threshold that is the determined speed limit of the vehicle. The pitch modification is determined by looking at the difference between the vehicle velocity and the determined speed limit, integrated over time. The pitch modification sequence is maintained until the vehicle slows to the desired dropout speed (some speed slightly below the speed limit), and then the pitch angle is smoothly returned to its original value.

One method for determining the speed limit of the vehicle is to monitor the battery voltage, which is then used to estimate the maximum velocity the vehicle is currently capable of maintaining. Another method is to measure the voltages of the battery and the motor and to monitor the difference between the two; the difference provides an estimate of the amount of velocity margin currently available to the vehicle.

Use of Sensors in Stair-Climbing

As described in connection with FIG. 37 above, stair climbing and other obstacle traversal may be effectuated utilizing a lean mode, and the climb ratio may be selected manually or automatically. This section describes how sensors may be utilized in a further embodiment to achieve automatic adjustment of the climb ratio. In the lean mode, clusters are the "masters" and wheels are "slaves." The climb ratio expresses the ratio between cluster rotation and wheel rotation. For example:

i) A climb ratio of zero means that the wheels do not move at all when the clusters move.
ii) A climb ratio of 0.25 means that the wheel makes ¼ rotation in the same direction as the cluster for each cluster rotation.
iii) A climb ratio of −0.5 means that the wheel makes ½ rotation in the direction opposite to the cluster for each cluster rotation.

Figure 46:
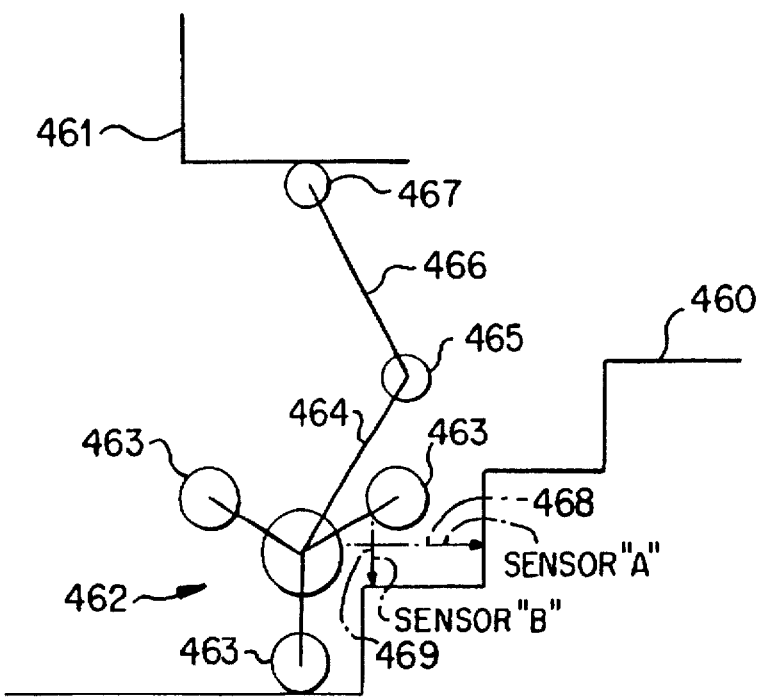
FIGS. 46 and 47 show schematically a vehicle in accordance with an embodiment of the present invention equipped with sensors for ascent and descent of stairs and other similar obstacles.
Figure 47:
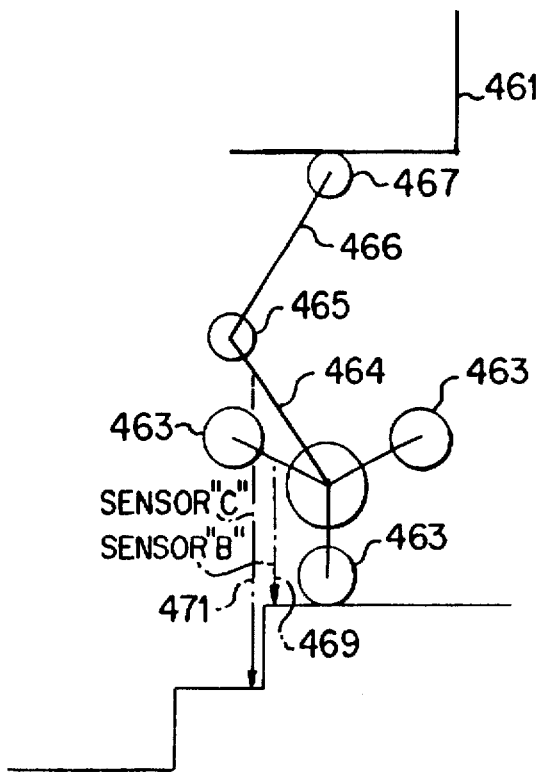

Referring now to FIGS. 46 and 47, there is shown a vehicle having an arrangement such as a chair 461 for supporting a human subject. The chair 461 has associated with it a ground-contacting module in the form of a pair of clusters 462, each motor-driven and each having a plurality (here three) of wheels 463. The wheel set of each cluster is also motor-driven. The clusters 462 are linked in this case by a tube in which may be housed the cluster motors. The clusters 462 are part of an assembly that includes the chair 461, which is mounted to the cluster tube via thigh and calf linkages 466 and 464 respectively and motor-driven hip and knee joints 467 and 465 respectively. The hip, knee, and cluster drives function in concert to affect a height change of the seat 461. Note that the cluster drive is acting as an ankle in this case, as it rotates the calf about the cluster. The cluster attitude is maintained by the balancing algorithm. The vehicle of this embodiment is provided with a sensor A, looking in a forward direction along path 468 and mounted just above the cluster tube, far enough above level ground to sense the riser of the second step of stairs 460 to be climbed. (Note that if a curb is being climbed, no riser would be sensed.) Sensor A is used only when ascending stairs. The vehicle of this embodiment is also provided with sensor B, looking in a downward direction along path 469 and mounted to the cluster tube. It senses the distance from its face to the ground below. It is placed in front of the tube, far enough above level ground to sense the tread of the step about to be climbed. Sensors A and B may be of any type known in the art, including ultrasonic, for sensing distance.

As shown in FIG. 47, when the vehicle is descending, sensor B senses the end of the step that the device is currently on, by detecting the change in height. Sensor C is mounted to the footrest of chair 461, and looks in a downward direction along path 471. It senses the distance from its face to the ground below. This sensor is only used when descending. It is placed far enough above ground and far enough ahead of the cluster tube to see the edge of the upper landing when preparing to descend.

In this embodiment, to ascend stairs, the driver of the vehicle issues a "climb up" command via the driver's interface while in balance mode. The seat is then automatically raised to full height, allowing the driver's feet to clear the steps in front of the driver. The vehicle is then driven towards the stairs. When sensor B senses a step (as a change in distance from the sensor to the ground), the vehicle enters lean mode, causing it to "fall" onto the first step (two wheels on the lower landing, two on the first step). Once the vehicle is in lean mode, the center-of-gravity (CG) is automatically shifted forward. This shift makes it easier for the driver to lean forward. The driver leans forward to create a pitch error. As a result, the cluster balancing algorithm applies a torque to the cluster motors. This torque rotates the clusters and causes the device to ascend the stair.

An algorithm is employed to adjust dynamically the climb ratio at the instant the transition is made from four wheels on two steps to two wheels on one step. This pertinent instant is determined not by a sensor, but by looking for the following information to be true:

i) the vehicle was told to ascend, ii) shift is done, iii) clusters have made 2 π/3 rotations since the last climb ratio adjustment, iv) cluster position is within a certain window, v) the cluster torque command was below a certain threshold and the derivative of the command was negative (corresponding to setting wheels down on the step), and vi) the cluster torque command is above a certain threshold and the derivative of the command is positive (corresponding to lifting wheels off the step). At the pertinent instant above, the algorithm uses sensor A to determine the distance to the next step, the fact that it will take 2 π/3 rotations of the cluster to get to the next step, and the wheel radius to calculate the climb ratio. If sensor A reads out-of-range (no riser, ready to step onto a landing), or a distance beyond a certain threshold (too far to riser, must go to balance mode first), it is noted that this is the last step; then the control goes to last step processing. This procedure is repeated for each successive step until the last step..

At the last step, the CG is shifted back to center, and the height is lowered. Although this makes it more difficult to lean-up the last step, it makes the vehicle more stable once on the landing. A large climb ratio is selected to push the vehicle well onto the landing for the transition to balance mode. The driver again leans forward. When it is determined that a zero crossing (defined above in connection with FIG. 38) has occurred, the vehicle switches to balance mode. It is now balancing on the upper landing using its wheels.

Descent is handled in a manner analogous to ascent. The driver issues a "climb down" command via the driver's interface while in balance mode. The seat is automatically lowered to minimum height (if not already there). This is primarily to increase the feeling of security in the driver. Sensor C is quite far out front of the wheels, so that the vehicle does not need to be too close to the edge of the step while in balance mode. Since the vehicle will be so far from the edge when lean mode is entered, the climb ratio is adjusted to a fairly high value. This allows the vehicle to reach the edge of the step once lean mode is entered. When sensor C senses a step (as a change in distance to the ground), the vehicle enters lean mode. Once in lean mode, the center-of-gravity (CG) is shifted rearward. This shift makes it easier for the driver to lean back to control descent. To descend, the driver first leans forward to create a pitch error, causing the vehicle to descend the stairs. Approximately half-way through the rotation, the driver must lean back slightly to slow the descent onto the next stair. The climb ratio is adjusted by using down-looking sensor B to sense the end of the step the wheels are currently on. The climb ratio is adjusted to a large positive value when no edge is sensed (cluster command signal positive, climb ratio either negative or nominal, and sensor B below a certain threshold). The large positive climb ratio causes relatively rapid rolling of the wheels, so that the vehicle soon reaches the edge of the current step. This action establishing the large positive climb ratio will be overridden, however, if it causes the vehicle to get too close to the edge:

i) The climb ratio is set to a nominal positive value when sensor B senses the edge (distance greater than a specified threshold and the climb ratio is positive). Once this value is set, it should suffice to get the vehicle into the proper position.

ii) The climb ratio is adjusted to a small negative value if it is determined that the vehicle is too close to the edge (cluster signal positive, climb ratio either negative or nominal, and sensor B above a certain threshold). The negative climb ratio rolls the wheels back as the cluster rotates, keeping the vehicle safely on the current step.

The descent pattern is repeated for each step. Once the vehicle reaches the landing at the bottom of the stairs, both sensors B and C sense no more steps (sensor readings below certain thresholds). When this occurs, the vehicle transfers to the balance mode.

Mode Transitions

Although transitions between lean mode and balance mode of the vehicle of FIGS. 46 and 47 may be managed as described in connection with FIG. 38, in a further embodiment of a vehicle in accordance with the present invention, the transition between modes may be managed on a more active and continuous basis. This embodiment utilizes joints 465 and 467 to control height of seat 461 and joint 467 in particular to control tilt of the seat 461. In lean mode, the vehicle has four wheels on the ground (two on the ground from each cluster) so that it may climb stairs or move over obstacles. The cluster motor output is adjusted according to the inclinometer pitch and pitch rate, and cluster encoder velocity. Transition to balance mode occurs when the Lean/Balance switch is pressed.

In transition to balance mode, the center of gravity is shifted over the front ground-contacting wheel of each cluster. To accomplish this, an artificial pitch error is created by gradually increasing an offset added to the inclinometer reading. This artificial pitch error causes the cluster balancing algorithm to apply a torque to the cluster motors, causing rotation of the clusters. This torque pitches the seat forward, moving the seat over the front wheels, in proportion to the artificial pitch error. (Simultaneously, the same offset may be used to command a new desired position in the seat tilt, determined by joint 467 of FIG. 46, thereby keeping the seat level.) When the cluster position is greater than the prescribed cluster transition angle (which may be based upon the amount of CG shift), the transition velocity of the cluster is initialized to the speed at which the cluster is currently moving, and balance mode is entered.

At the time balance mode is entered, the clusters have been rotated only partially, and the rear pair of wheels are typically about 2-5 cm above the ground. When entering balance mode, each of the clusters must be rotated from its current position until its "leg" (as defined in item 2 following Table 1) and "post" (also as defined in item 2) are vertical as in FIG. 46. This is accomplished by rotating the cluster at a prescribed velocity, gradually adjusted from the initialized transition velocity of the cluster. In this manner, cluster rotation continues smoothly on entry into the balance mode until the cluster reaches its target position. During this cluster rotation, the artificial pitch error is reduced to keep the CG over the ground contacting elements until it is entirely removed entirely from the inclinometer reading. If this were not done, the device would translate (in balance mode) because of the artificial pitch error.

Cluster position may be used to command seat tilt, thereby keeping the seat level as the seat post moves rearward. Once the cluster leg and post are vertical (clusters have stopped rotating) and the seat is level, the transition to balance mode from lean mode is complete.

If the Lean/Balance switch is pressed when the vehicle is in balance mode, transition to lean mode is entered. The desired cluster position is gradually changed from the initial position (where the cluster leg and post are vertical) to a final desired position (where the front pair of wheels are at a prescribed distance above the ground). Simultaneously, an artificial pitch error is introduced to keep the CG over the balancing wheels. Again, cluster position may be used to command seat tilt, thereby keeping the seat level as the seat post moves rearward.

Once the cluster has rotated to a position where the second pair of wheels are within a prescribed distance above the ground, lean mode is entered, causing the device to drop onto four wheels. Once the vehicle is in lean mode, the artificial pitch error that kept the cluster post pitched rearward and the seat tilted forward is promptly, but smoothly, removed. As a result, the applied cluster torque causes the cluster post to rotate forward to its vertical position. Simultaneously, the torque may be applied to the seat tilt to keep the seat level. Once the cluster post is vertical and the seat level, the transition from balance mode to lean mode is complete.

Configuration Using Harmonic Drives

In a further embodiment of the invention, the embodiment of FIGS. 46 and 47 has been realized mechanically in a configuration, similar that of FIGS. 9–12, utilizing harmonic drives. This configuration is shown in FIGS. 48–52.

Figure 48:
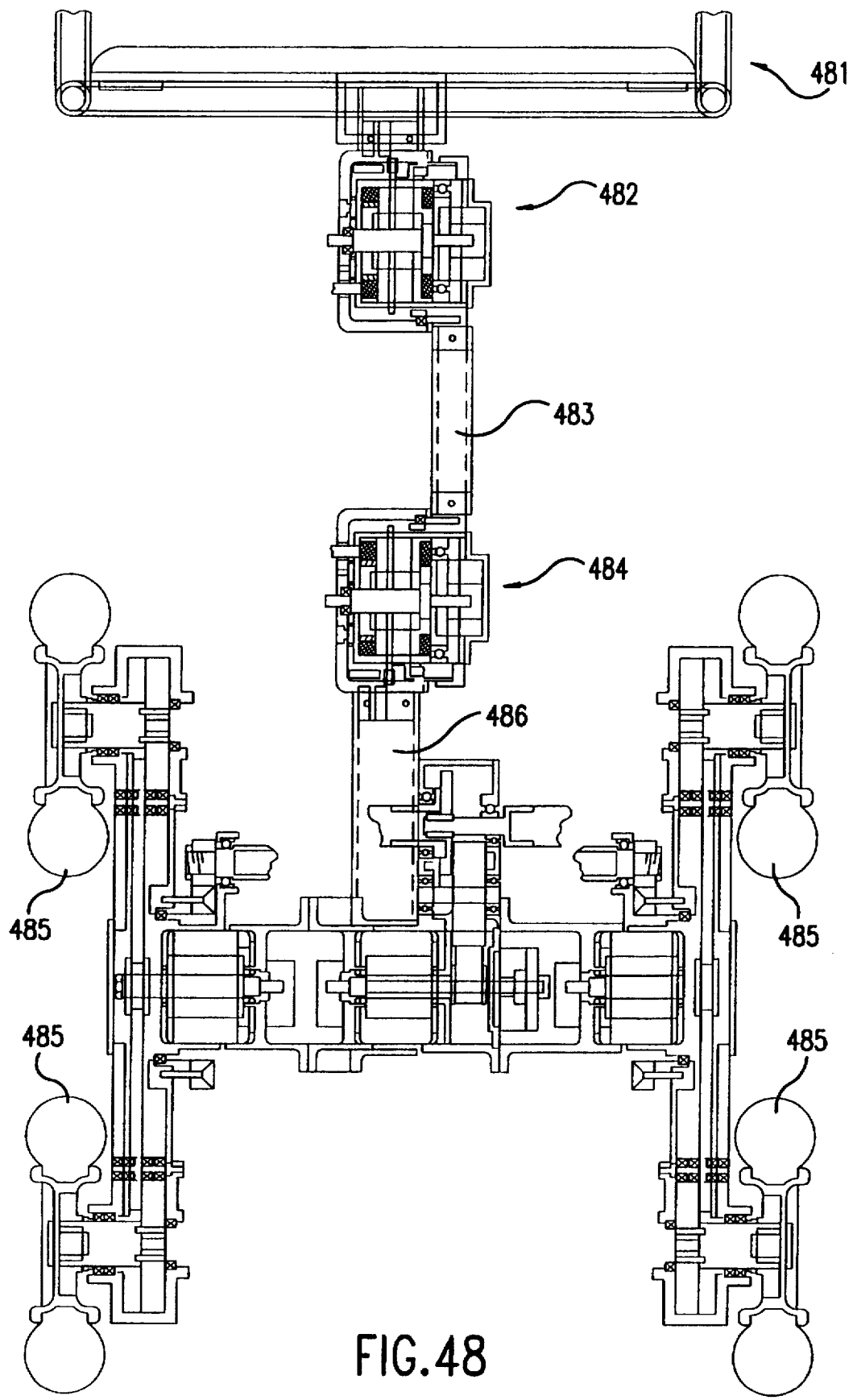
FIG. 48 shows a vertical section of an embodiment of the invention in a configuration, similar that of FIGS. 9–12, utilizing harmonic drives.

FIG. 48 is a partially cut away vertical section viewed from the front showing the overall mechanical layout of the vehicle of this embodiment. In this view can be seen, among other things, the seat frame 481, the hip assembly 482, the thigh linkage 483, the knee assembly 484; the calf linkage 486, and the wheels 485.

Figure 49:
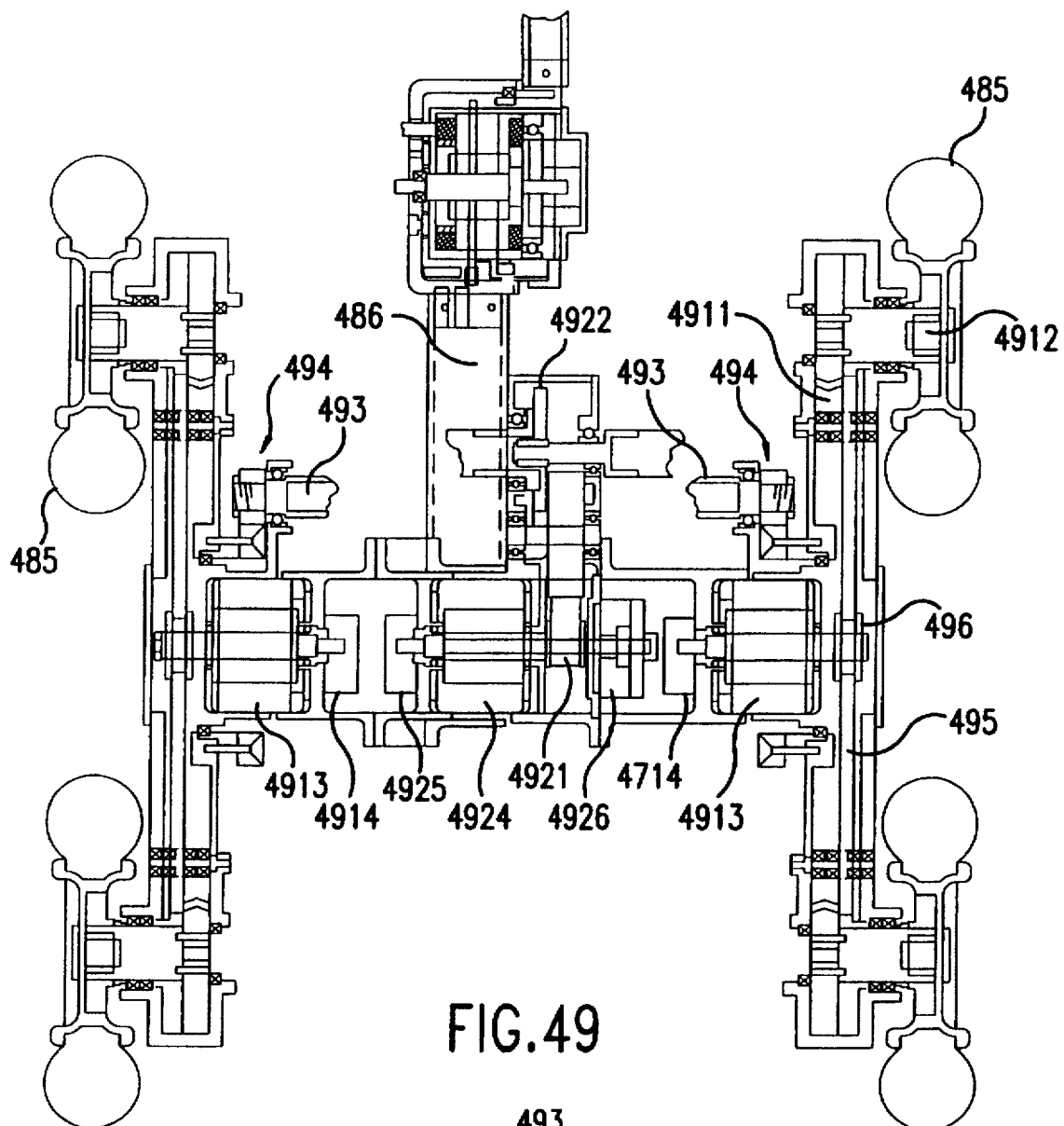
FIG. 49 shows detail of the cluster portion of the vehicle of FIG. 48.
Figure 50:
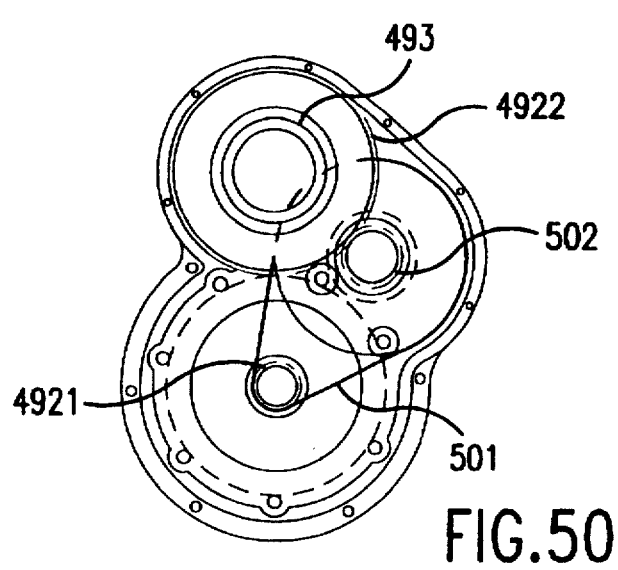
FIG. 50 shows detail of the cluster drive arrangement of the vehicle of FIG. 48.

FIG. 49 is an expanded view of a part of FIG. 48, showing mechanical details of the cluster portion of the vehicle. Wheel motors 4913 on left and right sides drive the wheels 485 on left and right sides respectively; the wheels on any given side are powered synchronously. The wheels are driven via a two-stage reduction. In the first stage, the motor 4913 turns wheel drive pulley 496 to move timing belt 495. In the second stage are employed three sets 4911 of herringbone gears, one for each wheel, to drive the wheel drive shaft 4912. The side of each of the motors 4913 that is not coupled to the wheel drive pulley is coupled to a shaft encoder 4914. Both clusters in this embodiment are driven by the same motor 4924 via a three-stage reduction. In the first stage, the motor 4924 turns cluster drive pulley 4921. The pulley 4921 causes motion of a timing belt. The timing belt is best seen as item 501 in FIG. 50, which shows detail of the cluster drive arrangement. The timing belt 501 drives a second stage of helical gears, including first gear 502 and second gear 4922. The second gear 4922 drives a pair of intermediate shafts 493, which drive a final set 494 of helical gears at each cluster. The side of the cluster motor 4924 that is not coupled to the cluster drive pulley 4921 is coupled to a shaft encoder 4925. The far side of the shaft turning the cluster drive pulley 4921 is coupled to cluster brake assembly 4926, which may be used to lock the clusters in position when the vehicle is parked or in the balance mode. The housings of the two wheel motors 4913 and the cluster motor 4924 are bolted together to form a tube, which provides the structure joining the cluster assemblies. The calf 486 is rigidly affixed to this structure.

Figure 51:
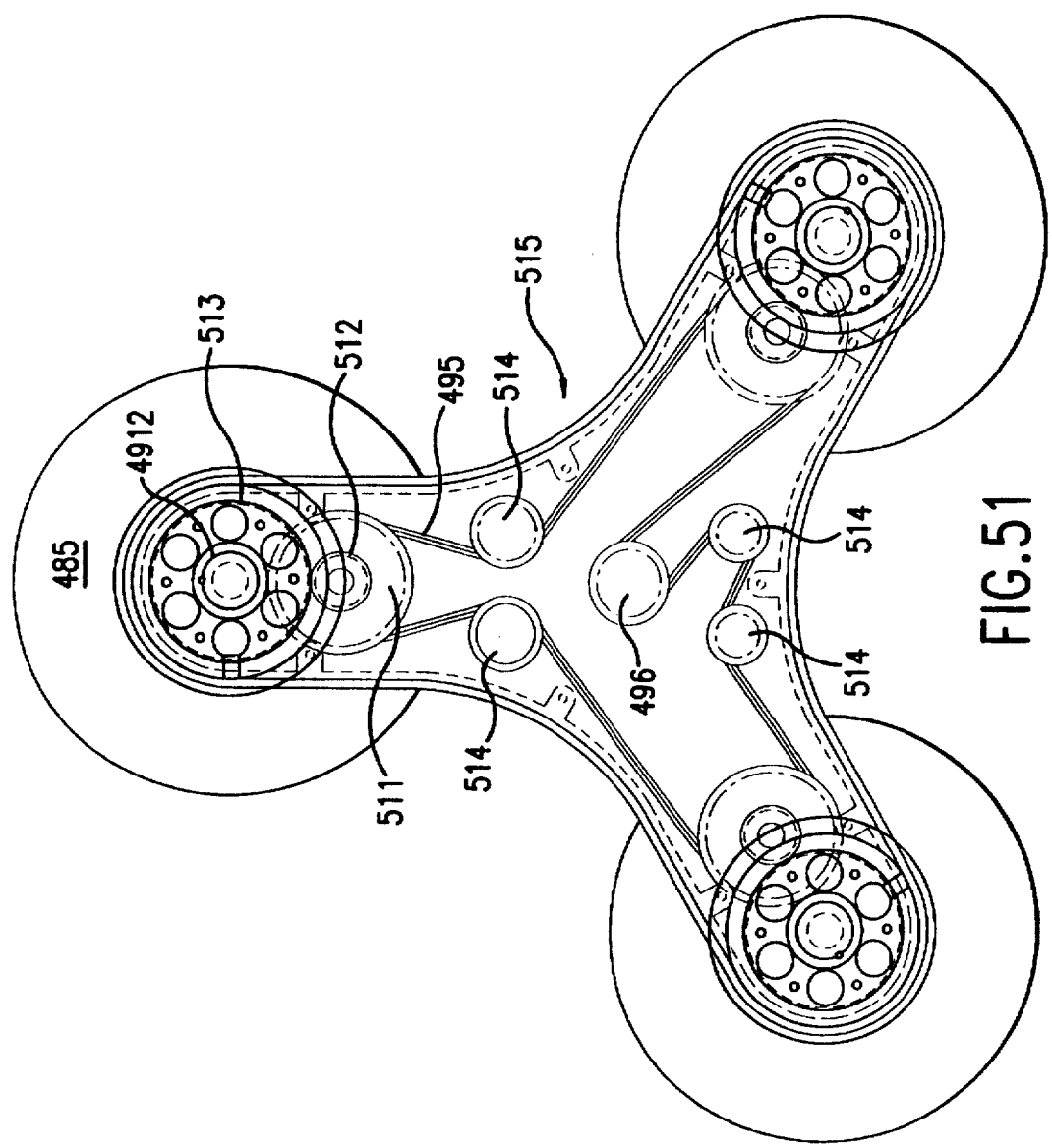
FIG. 51 shows an end view of a cluster of the vehicle of FIG. 48.

FIG. 51 shows an end view of a cluster. The single timing belt 495 of FIG. 49 is shown driven by wheel drive pulley 496 in the center of the cluster. The timing belt 495 drives a larger pulley 511 on each of the three legs. This larger pulley 511 drives a gear set including pinion gear 512 and output gear 513 which drives the wheel 485. The four idler pulleys 514 keep the belt 49 from interfering with the cluster housing 515 and also provide maximum wrap angle around the drive pulley.

Figure 52:
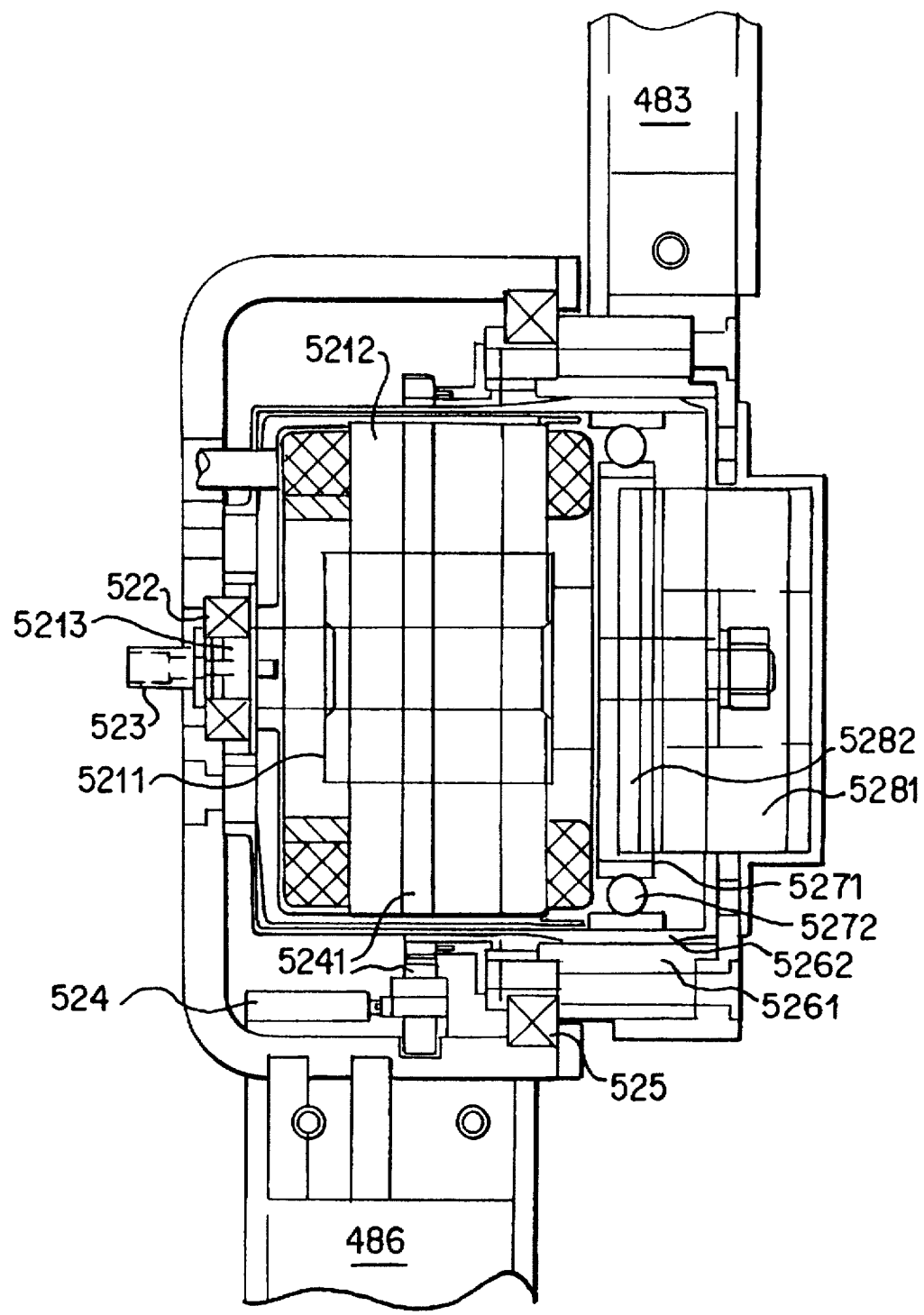
FIG. 52 shows the mechanical details of the hip and knee joints of the vehicle of FIG. 48.

FIG. 52 shows the mechanical details of the hip and knee joints. Both joints are mechanically identical. The motor magnet rotor 5211, acted on by stator 5212, turns a shaft 5213, mounted in bearings 522 and 5272. The shaft 5213 rotates the wave generator 5271, which is an approximately elliptically shaped piece, rotating within bearing 5272. The wave generator 5271 causes the harmonic drive cup 5262 to incrementally engage and disengage its teeth with the harmonic drive spline 5261. This process causes the thigh 483 to move with respect to the calf 486 or seat frame 481 with a very high reduction ratio. An electromagnetic power off brake having electromagnet 5281 and brake pad 5282 can be applied to the wave generator 5271 to prevent the joint from rotating. This allows the motor to be turned off when the joint is not being actuated. A potentiometer 524 is geared through gear train 5241 to the harmonic drive cup 5262 to give absolute position feedback, while an encoder (not shown) is fixed to the motor shaft at position 523 to provide incremental position information.

Multiple Processors

Although the embodiment of FIG. 27 shows use of a single micro controller board 272, we have found it advantageous in some embodiments to utilize a number of microprocessors operating in parallel. In a further embodiment, for example, applicable to the mechanical design discussed in connection with FIGS. 48–52, there are employed four different microprocessors operating in parallel, each of which posts messages to a communications bus, allowing the microprocessors to monitor each other. There is also a technician's interface (TI) which allows the technician to change gains, reprogram the processor etc. The four different microprocessors control the different components of the system as follows: microprocessor 1 controls the button, the knee and hip, and the joystick (x and y axes); microprocessor 2 controls distance measurement, presence checking (for a person), battery monitoring, and user interface (thereby controlling modes of the vehicle); microprocessor 3 controls the cluster balancing algorithm; microprocessor 4 controls wheel balancing algorithms. Additional processors may be desirably employed, depending on the complexity of the distance measurement and other issues. This will not necessarily limit the number of processors.

The advantages of the parallel processing realized by this embodiment are: safety (each microprocessor operates independently, so that failure of one microprocessor will not mean failure of all functions); ability to more easily develop redundant systems; reduced power requirements (multiple less powerful microprocessors which together are as powerful as a PC); and simultaneous operations (multiple slower microprocessors can operate at the same processing speed as the PC).

Further embodiments

The present invention may also be implemented in a number of further embodiments. We have found that a vehicle in accordance with the invention may act suitably as a prosthetic device for persons who have an impairment, caused by disease (such as Parkinson's Disease or ear disorders) or defect, in their ability to maintain balance or to achieve locomotion. The prosthetic device achieved by the vehicle functions as an extension of the person's own balance system and locomotion system, since the vehicle has a feedback loop that takes into account changes in the vehicle's center of gravity attributable to motion of the person relative to the vehicle. Providing a vehicle to such a handicapped person is thus a method of fitting a prosthesis that permits locomotion and balance control when these would otherwise be unavailable. We have observed a dramatic restoration of balance and locomotion control to a person suffering from Parkinson's Disease who utilized a vehicle in accordance with embodiments of the present invention.

Figure 53:
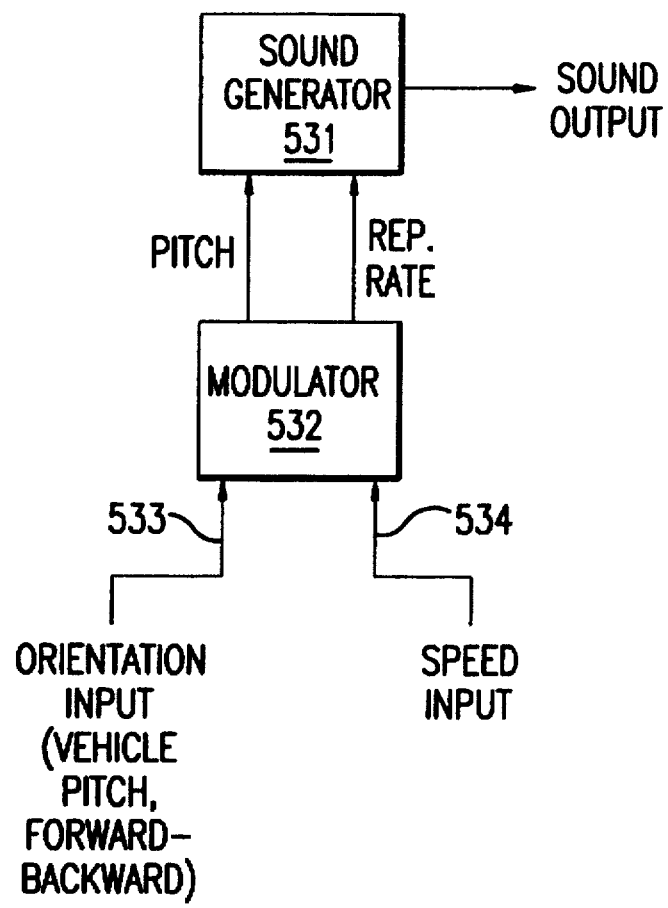
FIG. 53 illustrates an embodiment of the invention providing non-visual outputs useful for a subject in control of a vehicle.

Given the complex contributions from the human driver in utilizing various embodiments of the vehicle of the present invention to achieve locomotion over varied conditions, it is not surprising that visual orientation and displacement information is typically of great importance in general and in utilization of these embodiments. Nevertheless, there may be circumstances when the visual information is either impaired (owing to darkness or disability) or insufficient. In a further embodiment of the present invention, the vehicle is provided with one or more non-visual outputs to indicate orientation or direction and velocity. Such outputs may be tactile, for example, or sonic; the outputs are modulated by a modulator to reflect the vehicle's speed and orientation. Shown in FIG. 53, for example, is the case of a sonic output generated by generator 531, and modulated by modulator 532 having orientation and speed inputs 533 and 534 respectively. In this case, a repeated tone may be employed: the rate of repetition of the tone may be used to indicate speed and the pitch of the tone may be used to indicate direction of motion and orientation (forward, for example, with a higher pitch; backward with a lower pitch; upright with a center pitch), and the degree of change in pitch indicative of the extent of lean, i.e., vehicle pitch angle (with the effect that here sound pitch is equated with vehicle pitch).

What is claimed is:

1. An indication system for a vehicle operated by a human subject, the vehicle having a speed and an orientation, the system comprising:

means for generating a sound output having a pulse sequence, a pitch, and a repetition rate; and a modulator for modulating one of the pitch and the repetition rate in accordance with speed and the other as a continuous function of orientation.

2. A system according to claim 1 wherein the pitch is modulated as a continuous function of orientation and the repetition rate is modulated in accordance with speed.

3. A vehicle, for transporting a human subject over ground having a surface that may be irregular, the vehicle comprising:

(a) a support for supporting the subject;

(b) a ground-contacting module, movably attached to the support, for suspending the subject in the support over the surface, the orientation of the ground-contacting module defining fore-aft and lateral planes; the support and the ground-contacting module being components of an assembly;

(c) a motorized drive, mounted to the assembly, for causing locomotion of the assembly and the subject over the surface;

(d) a control loop, in which the motorized drive is included, for dynamically enhancing stability in the fore-aft plane by operation of the motorized drive;

(e) a means for generating a non-visual output having a pulse sequence, a pitch, and a repetition rate; and (f) a modulator for modulating the pitch and the repetition rate of the output in accordance with at least one of speed and orientation.

4. A vehicle according to claim 3, wherein the means for generating a non-visual output includes a means for generating a sound having a pitch and a repetition rate and the modulator is configured to modulate the pitch and repetition rate of the sound.

5. A vehicle according to claim 4, wherein one of pitch and repetition rate is modulated in accordance with speed and the other is modulated in accordance with orientation.

6. A vehicle according to claim 4, wherein the ground-contacting module includes a pair of ground-contacting members, laterally disposed with respect to one another.

7. A vehicle according to claim 6, wherein each ground-contacting member includes a cluster of wheels for contacting the ground, each cluster being rotatably mounted on and motor-driven about a laterally disposed central axis, and each of the wheels in each cluster being rotatably mounted about an axis parallel to the central axis, the wheels being capable of being motor-driven independently of the cluster.

8. A vehicle according to claim 3, wherein the means for generating a non-visual output includes means for generating a tactile vibration having a pitch and a repetition rate, and the modulator is configured to modulate the pitch and repetition rate of the tactile vibration.

9. A vehicle according to claim 8, wherein one of pitch and repetition rate is modulated in accordance with speed and the other is modulated in accordance with orientation.

10. A vehicle according to claim 8, wherein the ground-contacting module includes a pair of ground-contacting members, laterally disposed with respect to one another.

11. A vehicle according to claim 10, wherein each ground-contacting member includes a cluster of wheels for contacting the ground, each cluster being rotably mounted on and motor-driven about a laterally disposed central axis, and each of the wheels in each cluster being rotably mounted about an axis parallel to the central axis, the wheels being capable of being motor-driven independently of the cluster.

* * * * *